(12) United States Patent
Ohba

(10) Patent No.: US 6,677,946 B1
(45) Date of Patent: Jan. 13, 2004

(54) METHOD OF, AN APPARATUS FOR, AND A RECORDING MEDIUM COMPRISING A PROGRAM FOR, PROCESSING AN IMAGE

(75) Inventor: Akio Ohba, Tokyo (JP)

(73) Assignee: Sony Computer Entertainment Inc. (JP)

(*) Notice: Subject to any disclaimer, the term of this patent is extended or adjusted under 35 U.S.C. 154(b) by 0 days.

(21) Appl. No.: 09/516,950

(22) Filed: Mar. 1, 2000

(30) Foreign Application Priority Data

Mar. 8, 1999 (JP) .......................................... 11-060884

(51) Int. Cl.[7] ............................................... G06T 15/00
(52) U.S. Cl. ...................................................... 345/426
(58) Field of Search .................................. 345/426, 427, 345/428, 582, 586, 619, 629, 630

(56) References Cited

U.S. PATENT DOCUMENTS

| | | | |
|---|---|---|---|
| 5,537,638 A | 7/1996 | Morita et al. | 395/125 |
| 5,742,749 A | 4/1998 | Foran et al. | 395/126 |
| 5,870,098 A * | 2/1999 | Gardiner | 345/426 |

FOREIGN PATENT DOCUMENTS

| | | |
|---|---|---|
| EP | 0 358 493 A2 | 3/1990 |
| EP | 0 725 367 A1 | 8/1996 |
| EP | 0 948 978 A2 | 10/1999 |
| WO | WO97/50060 | 12/1997 |

OTHER PUBLICATIONS

Robert Rivlin (The Algorithmic Image : 1986: Microsoft Press).*
3D Studio Max: vol. 2: Rendering and Animation: ISBN: 120801–000000–5030.*
Weinhaus et al ("Texture Mapping 3D Models of real–World Scenes": 1997 ACM 0360–0300/97/1200–0325).*
Hsu, P.C. et al.., "Superimposing Images With Shadow Casting", Proceedings of the First IEEE Conference on Visualization '90, San Francisco, California, Oct. 23–26, 1990, pp. 298–306.

* cited by examiner

*Primary Examiner*—Almis R. Jankus
(74) *Attorney, Agent, or Firm*—Lerner, David, Littenberg, Krumholz & Mentlik, LLP

(57) ABSTRACT

A method of processing an image, includes the steps of orienting at least one virtual plane among a plurality of objects representing three-dimensional objects; projecting a shadow of a first one of the objects onto the virtual plane based on a viewpoint representing a light source; and mapping the projected shadow onto at least one other of the objects that is farther from the viewpoint representing the light source than the first object.

40 Claims, 30 Drawing Sheets

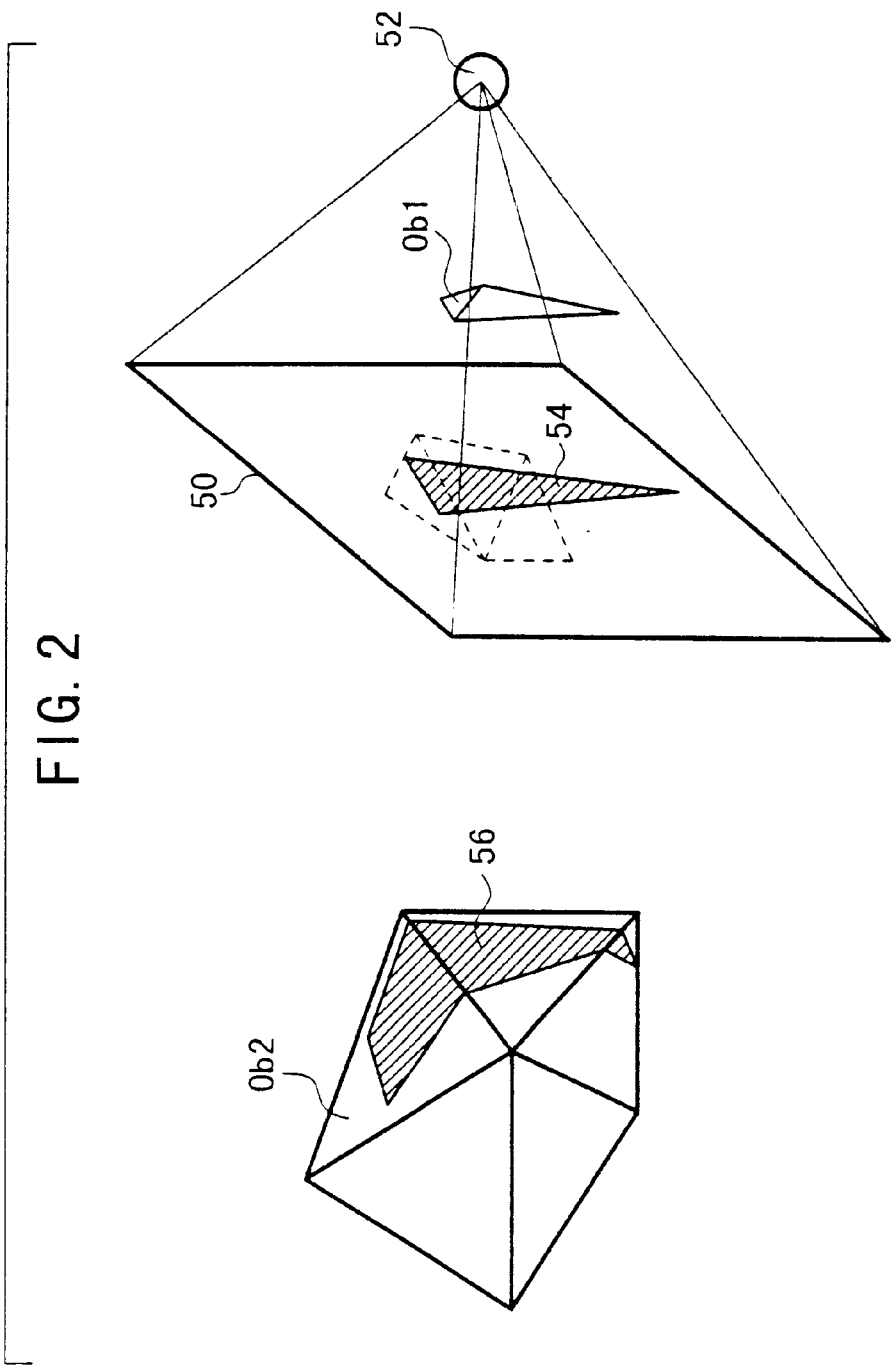

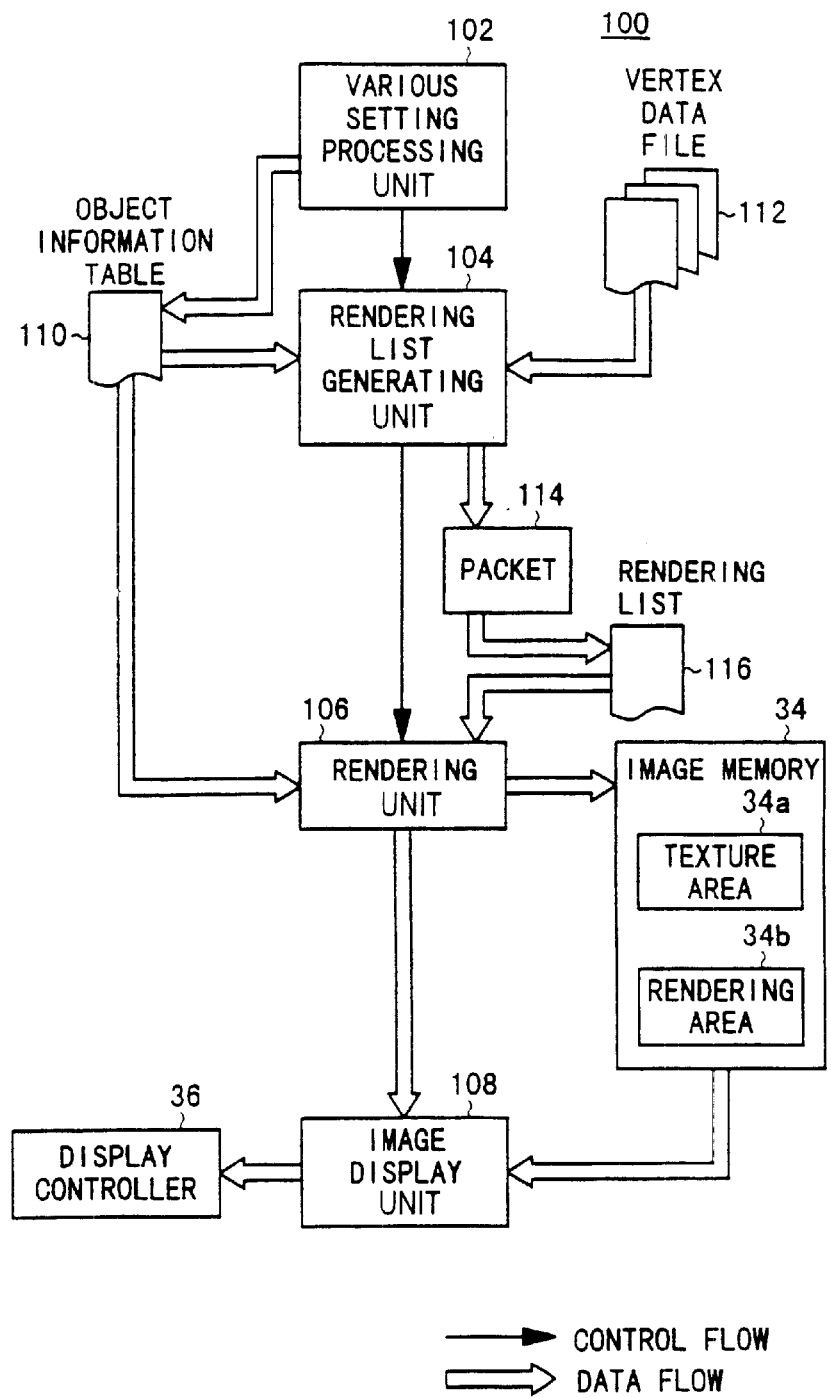

FIG. 4

RECORD 0
- INITIAL ADDRESS OF VERTEX DATA FILE
- NUMBER M OF POLYGONS
- INITIAL ADDRESS OF TEXTURE TABLE
- SHADING ATTRIBUTE INFORMATION: GOURAUD SHADING, ETC.
- TOPOLOGY INFORMATION: MESH, ETC.
- LIGHT SOURCE PROCESSING ATTRIBUTE: POLYGON SHADE TO BE DISPLAYED (TO BE DISPLAYED/NOT TO BE DISPLAYED = 1/0)
- OBJECT LAYOUT INFORMATION

RECORD 1
- INITIAL ADDRESS OF VERTEX DATA FILE
- NUMBER M OF POLYGONS
- INITIAL ADDRESS OF TEXTURE TABLE
- SHADING ATTRIBUTE INFORMATION: GOURAUD SHADING, ETC.
- TOPOLOGY INFORMATION: MESH, ETC.
- LIGHT SOURCE PROCESSING ATTRIBUTE: POLYGON SHADE TO BE DISPLAYED (TO BE DISPLAYED/NOT TO BE DISPLAYED = 1/0)
- OBJECT LAYOUT INFORMATION

RECORD 2
- INITIAL ADDRESS OF VERTEX DATA FILE
- NUMBER M OF POLYGONS
- INITIAL ADDRESS OF TEXTURE TABLE
- SHADING ATTRIBUTE INFORMATION: GOURAUD SHADING, ETC.
- TOPOLOGY INFORMATION: MESH, ETC.
- LIGHT SOURCE PROCESSING ATTRIBUTE: POLYGON SHADE TO BE DISPLAYED (TO BE DISPLAYED/NOT TO BE DISPLAYED = 1/0)
- OBJECT LAYOUT INFORMATION

| OBJECT NO. | Z-SORTING POINTER |
|---|---|

| SCREEN COORDINATES OF POLYGON |
|---|
| $SP_{ij0} = (X_{sij0}, Y_{sij0}, Z_{sij0})$ |
| $SP_{ij1} = (X_{sij1}, Y_{sij1}, Z_{sij1})$ |
| $SP_{ij2} = (X_{sij2}, Y_{sij2}, Z_{sij2})$ |

| LIGHT SOURCE COORDINATES OF POLYGON |
|---|
| $UP_{ij0} = (X_{uij0}, Y_{uij0}, Z_{uij0})$ |
| $UP_{ij1} = (X_{uij1}, Y_{uij1}, Z_{uij1})$ |
| $UP_{ij2} = (X_{uij2}, Y_{uij2}, Z_{uij2})$ |

| PROJECTED COORDINATES OF POLYGON ONTO VIRTUAL PLANE |
|---|
| $UV_{ij0} = (U_{ij0}, V_{ij0})$ |
| $UV_{ij1} = (U_{ij1}, V_{ij1})$ |
| $UV_{ij2} = (U_{ij2}, V_{ij2})$ |

AREA WHERE DROP SHADOWING
PROCESS IS EFFECTIVE

METHOD OF, AN APPARATUS FOR, AND A RECORDING MEDIUM COMPRISING A PROGRAM FOR, PROCESSING AN IMAGE

BACKGROUND OF THE INVENTION

1. Field of the Invention

The present invention relates to a method of and an apparatus for processing an image to express the shadow of an object which is created by the radiation of light from a light source, cast on another object disposed therebehind, based on the layout of a plurality of objects generated by three-dimensional modeling, a recording medium which stores a program for performing such image processing, and a program for performing such image processing.

2. Description of the Related Art

Recently, various computer graphics (CG) processing techniques including hidden line processing, hidden surface removal, smooth shading, texture mapping, etc. have been making rapid progress in combination with growing hardware advances.

According to one general CG processing procedure, a plurality of three-dimensional figures (objects) are generated according to three-dimensional modeling of CAD, and colors and shades are applied to the generated objects. Then, optical characteristics including mirroring, diffuse reflection, refraction, transparency, etc. are added to the objects, and surface patterns are applied to the objects. Furthermore, surrounding situations are rendered, e.g., windows and scenes are reflected and light rays are introduced.

Shading is governed by the directions of lines normal to polygons that make up an object and the viewpoint for light rays. There is a process of expressing the shadow of an object cast on another object positioned therebehind based on the layout of a light source and a plurality of objects. The latter process, rather than the shading, cannot be performed by techniques other than a highly costly rendering approach such as ray tracing.

If no high cost should be incurred such as for real-time rendering, then it has heretofore been customary to approximate such a shadow with perspective projection onto a simple plane or the rendering of a simple figure such as a circle.

In addition, if the light source has a certain size such as a flame, it is extremely difficult to express shadows produced by the light source.

SUMMARY OF THE INVENTION

It is therefore an object of the present invention to provide a method of and an apparatus for processing an image to express shadows with respect to a plurality of objects arranged in a complex layout or a shadow with respect to an object having a complex shape, a recording medium which stores a program capable of simply expressing such a shadow or shadows, and a program for expressing such a shadow or shadows.

Another object of the present invention is to provide a method of and an apparatus for processing an image so as to be able to selectively express a shadow with respect to an object, a recording medium which stores a program capable of selectively expressing a shadow with respect to an object, and a program for selectively expressing a shadow with respect to an object.

Still another object of the present invention is to provide a method of and an apparatus for processing an image so as to be able to easily apply various effects such as blurring in expressing a shadow with respect to an object, a recording medium which stores a program capable of easily applying various effects in expressing a shadow with respect to an object, and a program for easily applying various effects in expressing a shadow with respect to an object.

Yet another object of the present invention is to provide a method of and an apparatus for processing an image so as to be able to easily control shadow blurring among various effects on shadows for easily expressing a more realistic shadow, a recording medium which stores a program capable of easily expressing a more realistic shadow, and a program for easily expressing a more realistic shadow.

Yet still another object of the present invention is to provide a method of and an apparatus for processing an image so as to be able to easily express a projected image of an extended light source such as a flame and a shadow produced by such an extended light source, a recording medium which stores a program capable of easily expressing a projected image of an extended light source such as a flame and a shadow produced by such an extended light source, and a program for easily expressing a projected image of an extended light source such as a flame and a shadow produced by such an extended light source.

A method of processing an image according to the present invention comprises the steps of establishing at least one virtual plane from the layout of a plurality of objects to generated by three-dimensional modeling, and expressing a shadow of the object projected onto the virtual plane by a light source as a viewpoint, on the object that is farther from the light source than the object.

With the above method, it is possible to express easily a shadow on a plurality of objects arranged in a complex layout or a shadow with respect to an object having a complex shape.

The method may further comprise the steps of defining a shadow expression attribute as to whether the shadow is to be expressed on the objects in light source processing attributes of the objects, and selectively expressing the shadow on the object based on the shadow expression attribute. In this manner, the shadow may selectively be expressed with respect to the object.

Specifically, the method may further comprise the steps of establishing a shadow plane which serves as a texture plane corresponding to the virtual plane, rendering the shadow of the object formed by projection onto the virtual plane on the shadow plane, and mapping the shadow rendered on the shadow plane onto the other object by way of texture mapping.

The step of mapping the shadow onto the other object by way of texture mapping may comprise the step of mapping the shadow onto the other object by way of texture mapping based on projected coordinates of the other object onto the virtual plane, or with respect to each of polygons of the other object.

The method may further comprise the steps of determining coordinates of the objects with the light source as a viewpoint, determining projected coordinates of the objects onto the virtual plane successively in a direction away from the light source, and rendering the shadow formed by the object on the shadow plane based on the projected coordinates each time texture mapping onto one of the objects is finished.

The method may further comprise the steps of determining the coordinates of the objects and the projected coordinates of the objects onto the virtual plane with respect to each of polygons of the objects, registering the determined coordinates in a rendering list successively in the direction away from the light source, and successively reading the registered coordinates from the rendering list for rendering the shadow on the shadow plane.

It is preferable to effect low-pass filtering on the shadow rendered on the shadow plane depending on at least the distance from the light source for thereby applying a blur to the shadow depending on at least the distance from the light source. In this manner, various effects, such as blurring, etc., can easily be applied to a shadow expressed with respect to an object.

The method may further comprise the steps of interpolating the shadow rendered on the generating shadow plane when it is expressed on the object, according to rendering depending on the shadow before it is subject to low-pass filtering, the shadow after it is subject to low-pass filtering, and the light source coordinates of the object to be processed, for thereby controlling the blur of the shadow. Thus, blurring can easily be controlled for easily expressing a more realistic shadow.

The method may further comprise the steps of preparing a reference shadow plane and a generating shadow plane as the shadow plane, and, each time the objects to be processed switch from one to another, copying the shadow rendered on the generating shadow plane onto the reference shadow plane, and, each time the shadow on the reference shadow plane is mapped by way of texture mapping with respect to each of polygons of one object, rendering a projected image of the polygon onto the virtual plane as a new combined shadow on the generating shadow plane.

Each time the shadow rendered on the generating shadow plane is copied onto the reference shadow plane, low-pass filtering may be effected on the shadow rendered on the generating shadow plane. In this manner, various effects, such as blurring, etc., can easily be applied to a shadow expressed with respect to an object.

The method may further comprise the steps of preparing, in addition to the reference shadow plane and the generating shadow plane as the shadow plane, a background shadow plane which is a texture plane corresponding to a background virtual plane disposed behind the object to be processed, with the light source as a viewpoint, rendering a shadow formed by projecting a shadow projected onto the virtual plane onto the background virtual plane, on the background shadow plane, and mapping a shadow expressed on the object to be processed by way of texture mapping, while interpolating the shadow according to rendering based on the shadow rendered on the reference shadow plane, the shadow rendered on the background shadow plane, and light source coordinates of the object. Thus, blurring can easily be controlled for easily expressing a more realistic shadow.

The method may further comprise the steps of establishing an extended light source as an initial value for the shadow plane, and reflecting the extended light source and forming a shadow thereof on the object.

An apparatus for processing an image according to the present invention comprises a first unit operable to establish at least one virtual plane from the layout of a plurality of objects generated by three-dimensional modeling, and second unit operable to express and a shadow of the object projected onto the virtual plane by a light source as a viewpoint, on the object that is farther from the light source than the object.

The first unit may define a shadow expression attribute as to whether the shadow is to be expressed on the objects in light source processing attributes of the objects, and wherein the second means may comprising expressing selectively express the shadow on the object based on the shadow expression attribute.

The second unit may have a rendering unit operable to establish a shadow plane which serves as a texture plane corresponding to the virtual plane, rendering the shadow of the object formed by projection onto the virtual plane on the shadow plane, and mapping the shadow rendered on the shadow plane onto the other object by way of texture mapping.

The rendering unit may comprise mapping mapping the shadow onto the other object by way of texture mapping based on projected coordinates of the other object onto the virtual plane, or with respect to each of polygons of the other object.

The second unit may comprise a coordinate calculating means for determining coordinates of the objects with the light source as a viewpoint, and determine projected coordinates of the objects onto the virtual plane successively in a direction away from the light source, and the rendering unit may be further operable to render the shadow formed by the object on the shadow plane based on the projected coordinates each time texture mapping onto one of the objects is finished.

The second unit may comprise a rendering list generating unit operable to determine the coordinates of the objects and the projected coordinates of the objects onto the virtual plane with respect to each of polygons of the objects, and registering the determined coordinates in a rendering list successively in the direction away from the light source, and the rendering unit may be further operable to successively read the registered coordinates from the rendering list for rendering the shadow on the shadow plane.

The rendering unit may be further operable to low-pass filter the shadow rendered on the shadow plane depending on at least the distance from the light source for thereby applying a blur to the shadow depending on at least the distance from the light source. The rendering unit may be further operable to interpolate the shadow rendered on the generating shadow plane when it is expressed on the object, according to rendering depending on the shadow before it is subject to low-pass filtering, the shadow after it is subject to low-pass filtering, and the light source coordinates of the object to be processed, for thereby controlling the blur of the shadow.

The rendering unit may be further operable to prepare a reference shadow plane and a generating shadow plane as the shadow plane, and, each time the objects to be processed switch from one to another, copying the shadow rendered on the generating shadow plane onto the reference shadow plane, and, each time the shadow on the reference shadow plane is mapped by way of texture mapping with respect to each of polygons of one object, rendering a projected image of the polygon onto the virtual plane as a new combined shadow on the generating shadow plane.

The rendering unit may be further operable to each time the shadow rendered on the generating shadow plane is copied onto the reference shadow plane effect low-pass filtering on the shadow rendered on the generating shadow plane.

The rendering unit may be further operable to prepare in addition to the reference shadow plane and the generating shadow plane as the shadow plane, a background shadow plane which is a texture plane corresponding to a background virtual plane disposed behind the object to be processed, with the light source as a viewpoint, render a shadow formed by projecting a shadow projected onto the virtual plane onto the background virtual plane, on the background shadow plane, and map a shadow expressed on the object to be processed by way of texture mapping, while interpolating the shadow according to rendering based on the shadow rendered on the reference shadow plane, the shadow rendered on the background shadow plane, and light source coordinates of the object.

The rendering unit may be further operable to establish an extended light source as an initial value for the shadow plane, and reflect the extended light source and forming a shadow thereof on the object.

A recording medium according to the present invention stores a program comprising the steps of (a) establishing at least one virtual plane from the layout of a plurality of objects generated by three-dimensional modeling, and (b) expressing a shadow of the object projected onto the virtual plane by a light source as a viewpoint, on the object that is farther from the light source than the object.

The recording medium with the stored program makes it possible to express easily a shadow on a plurality of objects arranged in a complex layout or a shadow with respect to an object having a complex shape.

The step (a) may comprises the step of defining a shadow expression attribute as to whether the shadow is to be expressed on the objects in light source processing attributes of the objects, and the step (b) may comprise the step of selectively expressing the shadow on the object based on the shadow expression attribute.

The step (b) may comprises the steps of (c) establishing a shadow plane which serves as a texture plane corresponding to the virtual plane, rendering the shadow of the object formed by projection onto the virtual plane on the shadow plane, and mapping the shadow rendered on the shadow plane onto the other object by way of texture mapping.

The steps (c) may further comprise the step of mapping the shadow onto the other object by way of texture mapping based on projected coordinates of the other object onto the virtual plane, or with respect to each of polygons of the other object.

The step (b) may further comprise the steps of determining coordinates of the objects with the light source as a viewpoint, and determining projected coordinates of the objects onto the virtual plane successively in a direction away from the light source, and the steps (c) may further comprise the step of rendering the shadow formed by the object on the shadow plane based on the projected coordinates each time texture mapping onto one of the objects is finished.

The step (b) may further comprise the steps of determining the coordinates of the objects and the projected coordinates of the objects onto the virtual plane with respect to each of polygons of the objects, and registering the determined coordinates in a rendering list successively in the direction away from the light source, and the steps (c) may further comprise the step of successively reading the registered coordinates from the rendering list for rendering the shadow on the shadow plane.

The steps (c) may further comprise the step of effecting low-pass filtering on the shadow rendered on the shadow plane depending on at least the distance from the light source for thereby applying a blur to the shadow depending on at least the distance from the light source.

The steps (c) may further comprise the step of interpolating the shadow rendered on the generating shadow plane when it is expressed on the object, according to rendering depending on the shadow before it is subject to low-pass filtering, the shadow after it is subject to low-pass filtering, and the light source coordinates of the object to be processed, for thereby controlling the blur of the shadow.

The steps (c) may further comprise the steps of preparing a reference shadow plane and a generating shadow plane as the shadow plane, and, each time the objects to be processed switch from one to another, copying the shadow rendered on the generating shadow plane onto the reference shadow plane, and, each time the shadow on the reference shadow plane is mapped by way of texture mapping with respect to each of polygons of one object, rendering a projected image of the polygon onto the virtual plane as a new combined shadow on the generating shadow plane.

The steps (c) may further comprise the step of, each time the shadow rendered on the generating shadow plane is copied onto the reference shadow plane, effecting low-pass filtering on the shadow rendered on the generating shadow plane.

The steps (c) may further comprise the steps of preparing, in addition to the reference shadow plane and the generating shadow plane as the shadow plane, a background shadow plane which is a texture plane corresponding to a background virtual plane disposed behind the object to be processed, with the light source as a viewpoint, rendering a shadow formed by projecting a shadow projected onto the virtual plane onto the background virtual plane, on the background shadow plane, and mapping a shadow expressed on the object to be processed by way of texture mapping, while interpolating the shadow according to rendering based on the shadow rendered on the reference shadow plane, the shadow rendered on the background shadow plane, and light source coordinates of the object.

The steps (c) may further comprise the steps of establishing an extended light source as an initial value for the shadow plane, and reflecting the extended light source and forming a shadow thereof on the object.

A program according to the present invention comprises the steps of (a) establishing at least one virtual plane from the layout of a plurality of objects generated by three-dimensional modeling, and (b) expressing a shadow of the object projected onto the virtual plane by a light source as a viewpoint, on the object that is farther from the light source than the object.

When the above program is executed, it is possible to express easily a shadow on a plurality of objects arranged in a complex layout or a shadow with respect to an object having a complex shape.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a diagram illustrative of a drop shadowing process according to the present invention;

FIG. 3 is a functional block diagram of a drop shadowing unit according to the present invention;

FIG. 4 is a diagram showing details of an object information table;

FIG. 6 is a diagram showing details of a packet;

DESCRIPTION OF THE PREFERRED EMBODIMENTS

Embodiments in which an image processing method, an image processing apparatus, a recording medium, and a program according to the present invention are applied to an entertainment apparatus for performing three-dimensional CG processing will be described below with reference to FIGS. 1 through 30.

Figure 1:
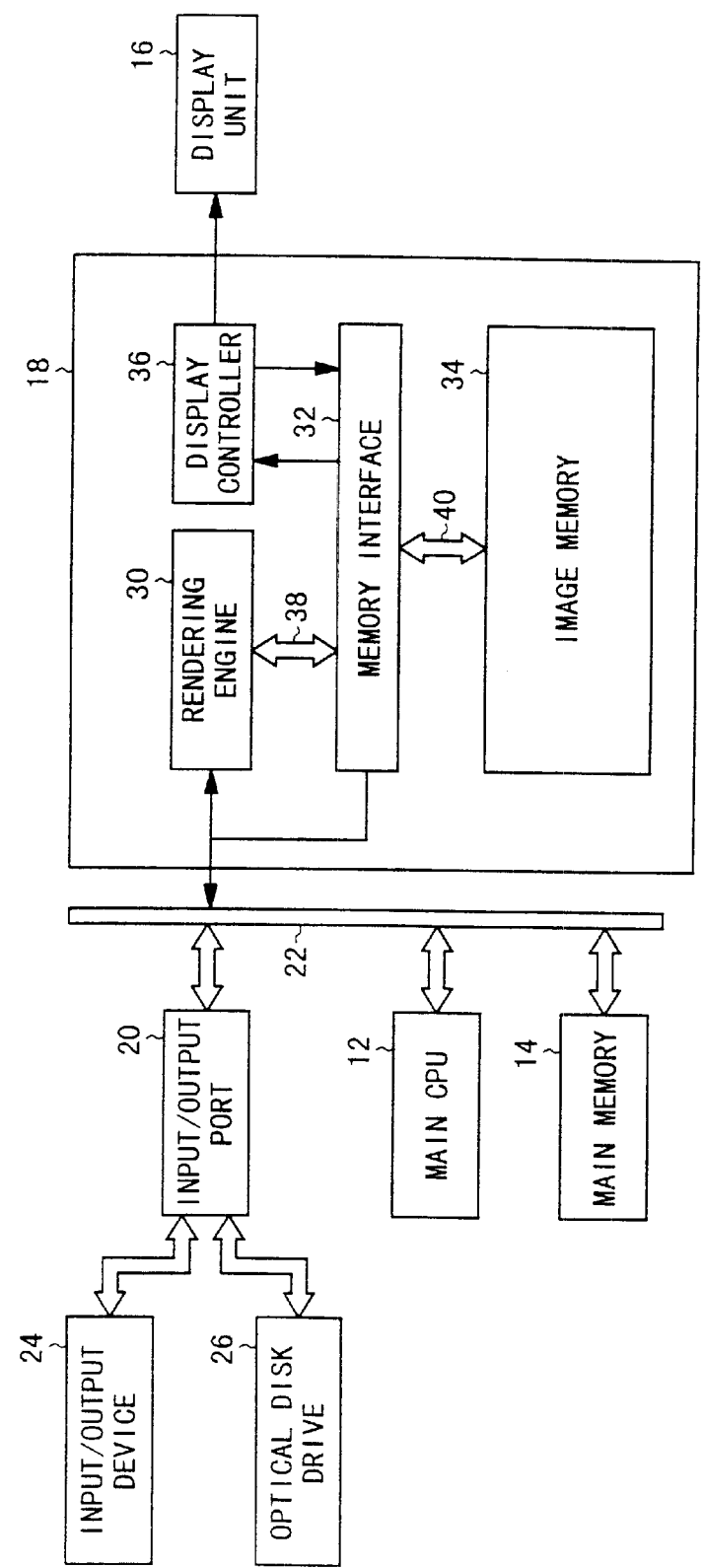
FIG. 1 is a block diagram of an entertainment apparatus according to the present invention.

As shown in FIG. 1, an entertainment apparatus 10 comprises a main CPU 12 for controlling the overall operation of the entertainment apparatus 10, a main memory 14 for storing various programs and various data, an image processor 18 for generating image data under the control of the main CPU 12 and outputting the generated image data to a display unit (e.g., CRT) 16, and an input/output port 20 for sending data to and receiving data from external devices.

The main memory 14, the image processor 18, and the input/output port 20 are connected to the main CPU 12 by a bus 22. To the input/output port 20, there are connected, for example, an input/output device 24 for entering data (key entry data, coordinate data, etc.) into the entertainment apparatus 10, and an optical disk drive 26 for playing back an optical disk, such as a CD-ROM, which stores various programs and data (object-related data, texture data, etc.).

The image processor 18 comprises a rendering engine 30, a memory interface 32, an image memory 34, and a display controller 36 such as a programmable CRT controller, for example.

The rendering engine 30 renders image data in the image 1(E memory 34 via the memory interface 32 in response to rendering commands supplied from the main CPU 12.

A first bus 38 is connected between the memory interface 32 and the rendering engine 30, and a second bus 40 is connected between the memory interface 32 and the image memory 34. The first and second buses 38, 40 each have a bus width of 128 bits, for example, for allowing the rendering engine 30 to render image data rapidly in the image memory 34.

The rendering engine 30 is capable of rendering image data of 320×240 pixels according NTSC or PAL or image data of 640×480 pixels on a real-time basis a plurality of times, ranging from more than ten to several tens, per 1/60 to 1/30 second.

The image memory 34 is of a unified memory structure capable of specifying a texture area 34a and a rendering area 34b (see FIG. 3) in one area.

The display controller 36 writes texture data read by the optical disk drive 26 and texture data generated in the main memory 14 into the texture area of the image memory 34 via the memory interface 32, and reads image data rendered in the rendering area of the main memory 14 via the memory interface 32, and outputs the image data to the display unit 16 for display on its display screen.

The function of a characteristic feature of the entertainment apparatus 10, i.e., the function of a process of dropping a shadow on an object (hereinafter referred to as a "drop shadowing process"), will be described in detail below.

According to the drop shadowing process, as shown in FIG. 2, at least one virtual plane 50 is established from the layout of a plurality of objects Ob1, Ob2 generated by three-dimensional modeling, and a projected image 54 of the object Ob1 projected onto the virtual plane 50 by a light source 52 is expressed as a shadow 56 on the object Ob2 that is farther from the light source 52 than the object Ob1.

A program for performing the drop shadowing process, may be used in a drop shadowing unit, the program 100 (see FIG. 3), is downloaded from a CD-ROM that is played back by the optical disk drive 26 into the main memory 14 of the entertainment apparatus 10. Then, the downloaded program for performing the drop shadowing process is run on the entertainment apparatus 10.

The drop shadowing unit 100 will be described below with reference to FIGS. 3 through 9. As shown in FIG. 3, the drop shadowing unit 100 has a various setting processing unit 102, a rendering list generating unit 104, a rendering unit 106, and an image display unit 108.

The various setting processing unit 102 generates an object information table 110, makes layout settings for objects Ob1, Ob2, . . . , a screen, and a light source 52, and establishes at least one virtual plane 50 from the layout of the objects Ob1, Ob2, . . . .

As shown in FIG. 4, the object information table 110 registers as many records as the number of generated objects. Each of the records contains an initial address of a data file (vertex data file) of vertex data (object coordinates) of polygons that make up the corresponding object, the number M of polygons, an initial address of a texture table that is used, shading attribute information (such as Gouraud shading), topology information (such as mesh), a light source processing attribute, and object layout information.

The light source processing attribute defines information as to whether a polygon shadow is to be displayed or not (to be displayed/not to be displayed =1/0).

The rendering list generating unit 104 determines a screen coordinate system, a light source coordinate system, and projected coordinates on the virtual plane 50 (coordinates of a polygon shadow) of each of the polygons of objects based on vertex data files 112 of the objects and the layout of the light source 52, etc., registers the determined coordinate systems and projected coordinates in packets 114, and effects Z-sorting on the packets 114 in a direction away from the light source 52, and registers the packets 114 in a rendering list 116.

Figure 5:
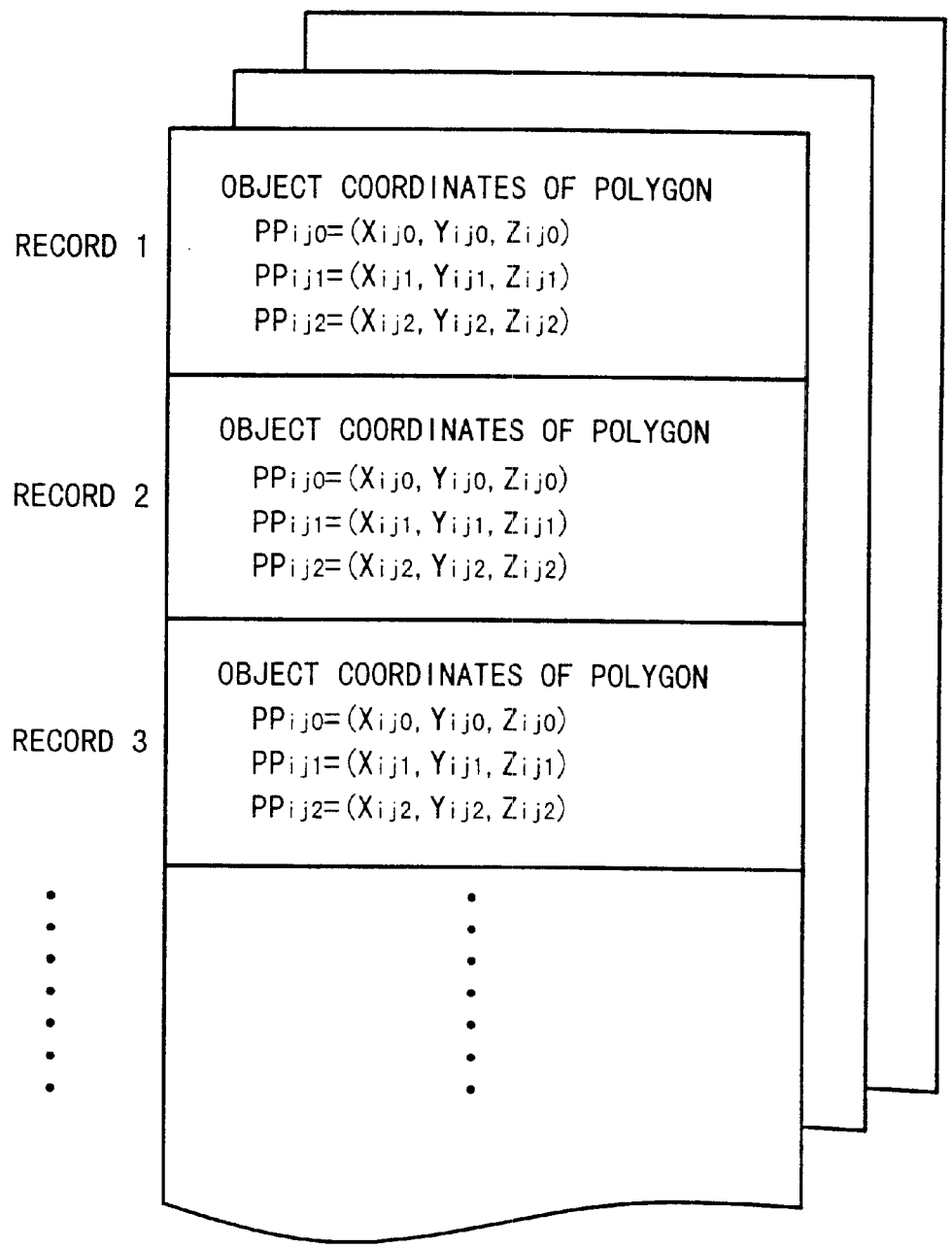
FIG. 5 is a diagram showing details of a vertex data file.

As shown in FIG. 5, the vertex data files 112 comprise as many files as the number of generated objects. Each of the files registers in each record object coordinates $PP_{ij0}=(X_{ij0}, Y_{ij0}, Z_{ij0})$ $PP_{ij1}=(X_{ij1}, Y_{ij1}, Z_{ij1})$ $PP_{ij2}=(X_{ij2}, Y_{ij2}, Z_{ij2})$ of a polygon of the object.

As shown in FIG. 6, each of the packets 114 stores therein the number of an object (object number) to which the polygon belongs, a Z-sorting pointer for use as a pointer when the packet 114 is registered in the rendering list 116, screen coordinates $SP_{ij0}=(X_{sij0}, Y_{sij0}, Z_{sij0})$, $SP_{ij1}=(X_{sij1}, Y_{sij1}, Z_{sij1})$ $SP_{ij2}=(X_{sij2}, Y_{sij2}Z_{sij2})$ of the polygon, light source coordinates $UP_{ij0}=(X_{uij0}, Y_{uij0}, Z_{uij0})$, $UP_{ij1}=(X_{sij1}, Y_{sij1}, Z_{uij1})$, $UP_{ij2}=(X_{uij2}, Y_{uij2}, Z_{uij2})$ of the polygon, and projected coordinates $UV_{ij0}=(U_{ij0}, V_{ij0})$, $UV_{ij1}=(U_{ij1}, V_{ij1})$, $UV_{ij2}=(U_{ij2}, V_{ij2})$ of the polygon onto the virtual plane 50.

The rendering unit 106 successively takes the packets 114 from the rendering list 116, and, based on the various data of the polygons registered in the packets 114, renders the polygons and performs texture mapping on polygon shadows of the polygons.

The image display means 108 reads image data stored in the rendering area 34b of the image memory 34 and outputs the read image data to the display controller 36.

Figure 7:
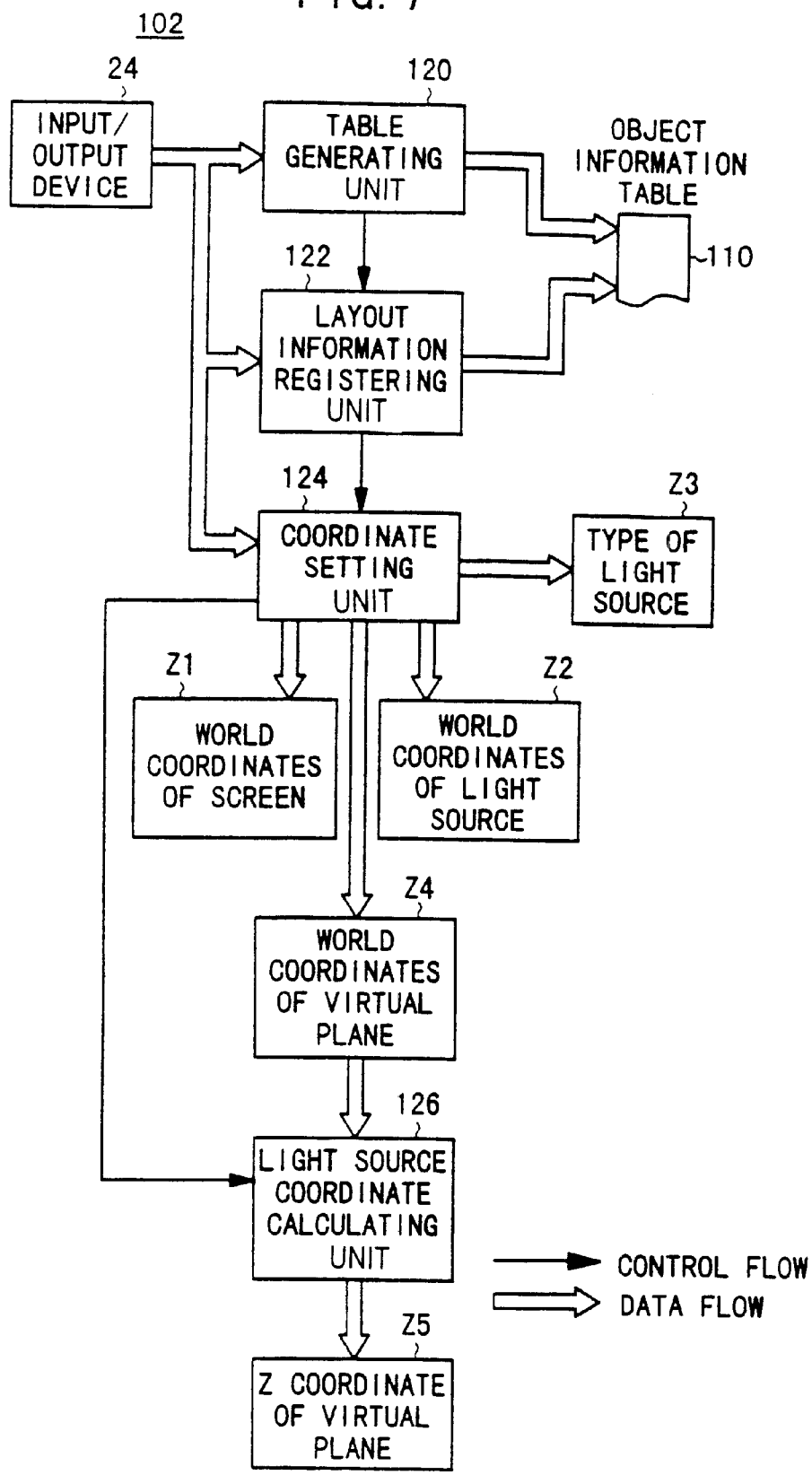
FIG. 7 is a functional block diagram of a various setting processing unit in a drop shadowing process according to a first embodiment of the present invention.

As shown in FIG. 7, the various setting processing unit 102 has a table generating unit 120 for generating an object information table 110 based on data entered via the input/output device 24, a layout information registering unit 122 for registering information relative to the layout of objects entered via the input/output device 24 in the object information table 110, a coordinate setting unit 124 for determining world coordinates of a screen, the light source 52, and the virtual plane 50 from information relative to the layout of the screen, the light source 52, and the virtual plane 50, and registering the determined world coordinates in predetermined array variable areas Z1–Z4, and a light source coordinate calculating unit 126 for determining light source coordinates of the virtual plane 50 based on the world coordinates of the virtual plane 50, and registering the Z coordinate in a predetermined array variable area Z5.

Figure 8:
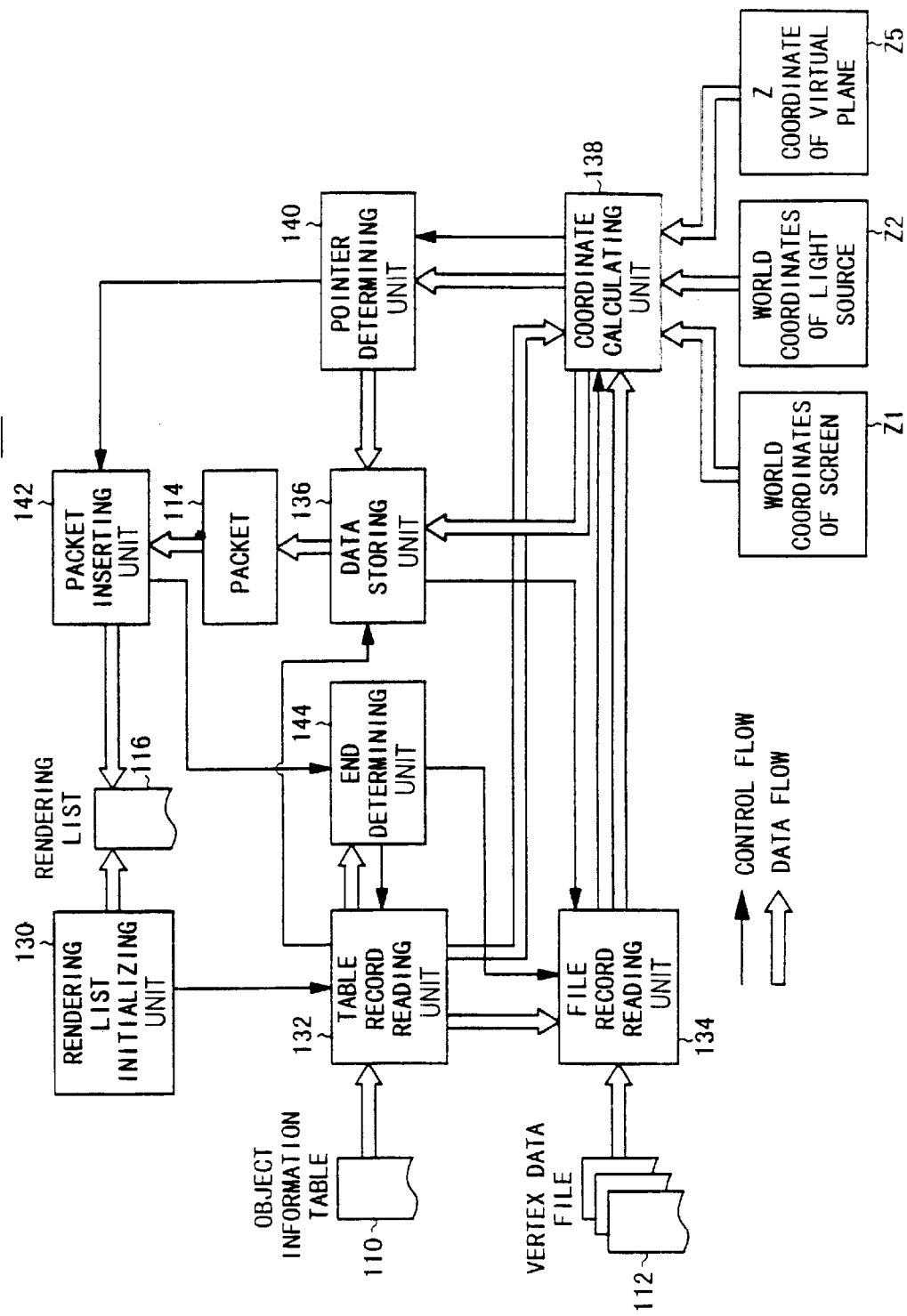
FIG. 8 is a functional block diagram of a rendering list generating unit in the drop shadowing process according to the first embodiment of the present invention.

As shown in FIG. 8, the rendering list generating means 104 comprises a rendering list initializing means 130 for initializing the rendering list 116, a table record reading means 132 for reading records of information from the object information table 110, a file record reading means 134 for reading records of information from the corresponding vertex data file 112, a data storing means 136 for storing data in packets 114, a coordinate calculating means 138 for calculating screen coordinates, light source coordinates, and projected coordinates onto the virtual plane 50, of the polygons registered in the vertex data files 112, a pointer determining means 140 for determining an insertion pointer (Z-sorting pointer) with respect to the rendering list 116 based on the light source coordinates of the polygons, a packet inserting means 142 for inserting a packet 114 into the record corresponding to the pointer, and an end determining means 144 for determining whether the processing on the polygons that make up the object to be processed has all been ended or not.

Figure 9:
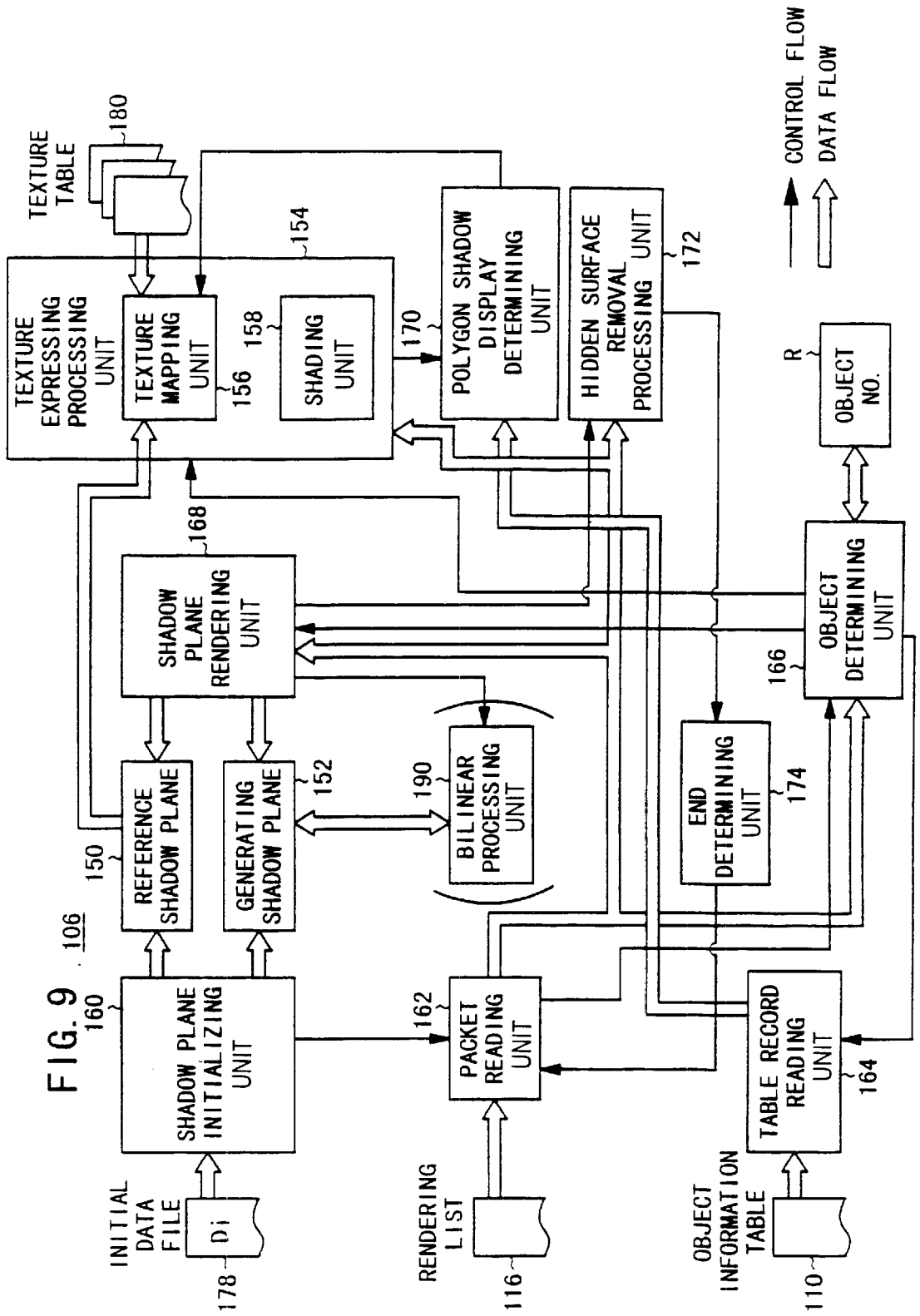
FIG. 9 is a functional block diagram of a rendering unit in the drop shadowing process according to the first embodiment of the present invention.

As shown in FIG. 9, the rendering means 106 is arranged to use a reference shadow plane 150 and a generating shadow plane 152 which correspond to the virtual plane 50. The shadow planes 150, 152 are logically assigned to the texture area 34a of the image memory 34.

The rendering means 106 issues a command for operating a texture expressing processing means 154 incorporated in the rendering engine 30. The texture expressing processing means 154 comprises a texture mapping means 156 and a shading means 158.

The rendering means 106 has a shadow plane initializing means 160 for writing initial data Di read from an initial data file 178 into the reference shadow plane 150 and the generating shadow plane 152 to initialize the reference shadow plane 150 and the generating shadow plane 152, a packet reading means 162 for successively reading packets 114 from the rendering list 116, a table record reading means 164 for reading records of information from the object information table 110, an object determining means 166 for determining whether objects to be processed have switched from one to another or not, a shadow plane rendering means 168 for rendering data in the reference shadow plane 150 and the generating shadow plane 152, a polygon shadow display determining means 170 for determining whether a polygon shadow is to be displayed or not based on light source processing attributes registered in the object information table 110, a hidden surface removal processing means 172 for rendering generated polygon data (polygon data after texture expression and drop shadowing) in the rendering area 34b while carrying out hidden surface removal according to Z-buffering, for example, and an end determining means 174 for determining whether the processing on the packets 114 registered in the rendering list 116 has all been ended or not.

A drop shadowing process according to a first embodiment of the present invention, which is carried out by the drop shadowing means 100, will be described below. Prior to the description of the drop shadowing process, the concept of operation of the drop shadowing means 100 will first be described with reference to FIGS. 2, 10 through 12.

FIG. 2 shows the concept of the drop shadowing process using the virtual plane 50. In FIG. 2, the virtual plane 50 is located between the object Ob1 which casts a shadow and the object Ob2 on which the shadow is cast. The position of the virtual plane 50 is determined by its size and the extent of a space covered by the drop shadowing process.

In the first embodiment, the object Ob1 is projected onto the virtual plane 50 according to perspective transformation with the light source 52 as the viewpoint, and is written as a polygon shadow on a shadow plane (the reference shadow plane 150 and the generating shadow plane 152) which is a texture plane corresponding to the virtual plane 50. The drop shadowing process for dropping a shadow on the object Ob2 is carried out by performing texture mapping onto each of the polygons of the object Ob2 from the reference shadow plane 150 that serves as a texture pattern.

The texture coordinates of each of vertexes of a polygon can be determined according to perspective transformation with the light source 52 as the viewpoint. Formulas of perspective transformation will be described below with reference to FIG. 11.

Figure 11:
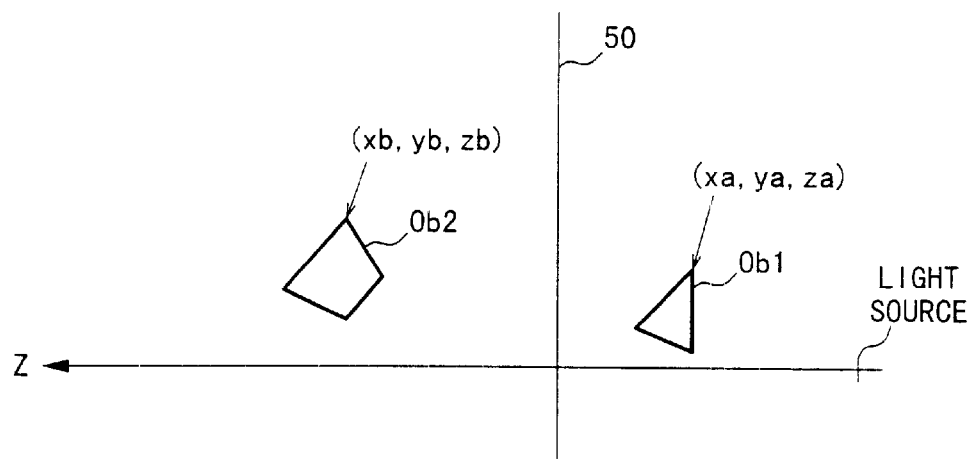
FIG. 11 is a diagram illustrative of perspective transformation of an object onto a virtual plane.

In FIG. 11, if the light source 52 is a point light source, then the perspective transformation of each of the vertexes of the object Ob1 to the virtual plane 50 is represented by:

$$Xa=(xa*ScrZ)/za$$

$$Ya=(ya*ScrZ)/za$$

and the texture coordinates (Ub, Vb) of the shadow of each of the vertexes of the object Ob2 are similarly represented according to perspective transformation by:

$$Ub=(xb*ScrZ)/zb$$

$$Vb=(yb*ScrZ)/zb$$

If the light source 52 is a parallel light source, then $$(Xa, Ya)=(xa, ya)$$

$$(Xb, Yb)=(xb, yb)$$

Figure 12:
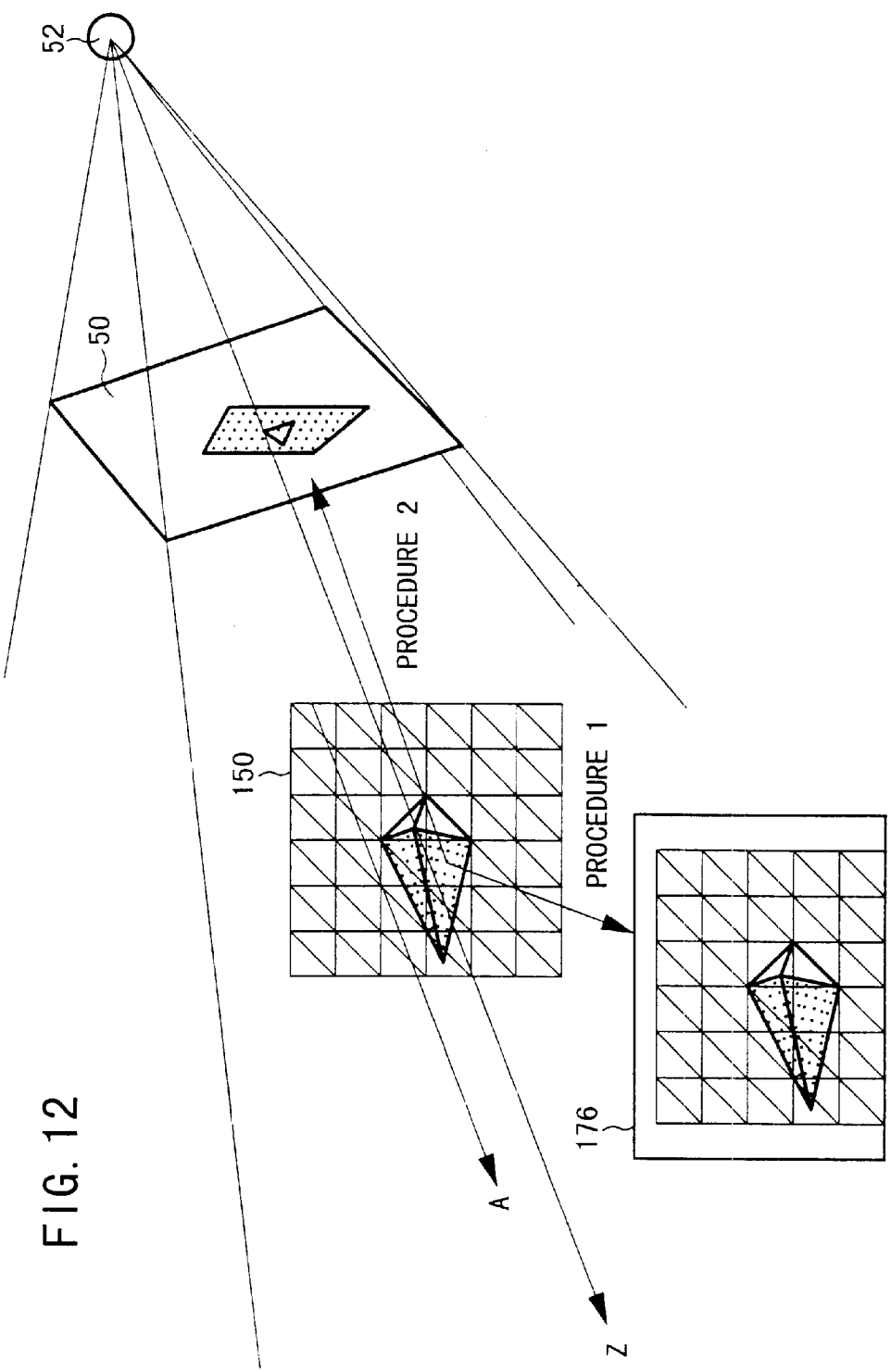
FIG. 12 is a diagram showing a conceptual representation of the drop shadowing process according to the first embodiment of the present invention.

FIG. 12 shows a conceptual representation of the drop shadowing process according to the first embodiment of the present invention. According to the drop shadowing process shown in FIG. 12, which is applied to each object, a polygon shadow rendered on a shadow plane (the reference shadow plane 150) is subjected to texture mapping onto an object and rendered on a screen 176 (procedure 1), and thereafter the polygon shadow formed on the object is rendered on the shadow plane 150 (procedure 2). The above drop shadowing process is carried out by Z-sorting with the light source 52 as the viewpoint, as indicated by the arrow A.

A sequence of the drop shadowing process according to the first embodiment of the present invention will be described below with reference to FIG. 13.

In step S1, the various setting processing means 102 generates an object information table 110, makes layout settings for the object, the screen 176, and the light source 52, and sets up at least one virtual plane 50 from the lay-out of a plurality of objects (various setting processing).

Then, in step S2, the rendering list generating means 104 determines a screen coordinate system, a light source coordinate system, and projected coordinates on the virtual plane 50 (coordinates of a polygon shadow) of each of the polygons of objects based on vertex data files 112 of the objects and the layout of the light source 52, etc., registers the determined coordinate systems and projected coordinates in packets 114, and registers the packets 114 successively in a direction away from the light source 52 in a rendering list 116 (rendering list generation processing).

Thereafter, in step S3, the rendering means 106 successively takes the packets 114 from the rendering list 116, and, based on the various data of the polygons registered in the packets 114, renders the polygons and performs texture mapping on polygon shadows of the polygons (rendering processing).

Then, in step S4, the image display means 108 reads image data stored in the rendering area 34b of the image memory 34 and outputs the read image data via the display controller 36 to the display unit 16. In this manner, as shown in FIG. 2, the shadow of the object Ob1 produced by the light source 52 is cast on the object Ob2 which is positioned behind the object Ob1 with respect to the light source 52.

After step S4, the drop shadowing process according to the first embodiment is ended.

Sequences of operation of the various setting processing means 102, the rendering list generating means 104, and the rendering means 106 will be described below with reference to FIGS. 14 through 19.

First, a sequence of operation of the various setting processing means 102 will be described below with reference to FIG. 14.

Figure 14:
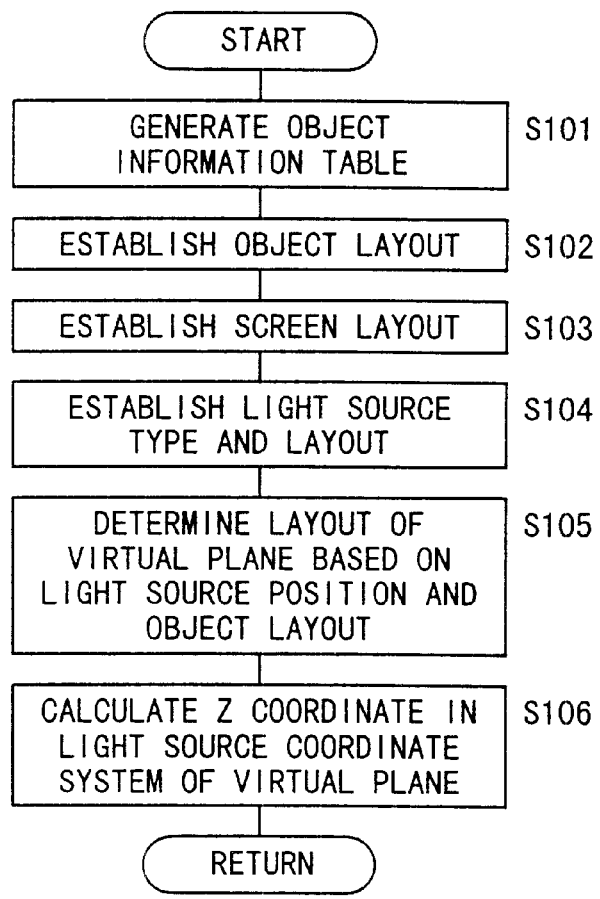
FIG. 14 is a flowchart of a sequence of operation of the various setting processing unit in the drop shadowing process according to the first embodiment of the present invention.

In step S101 shown in FIG. 14, the table generating means 120 of the various setting processing means 102 generates an object information table 110 based on data entered via the input/output device 24.

As shown in FIG. 4, items of information registered in the object information table 110 include shading attribute information (such as Gouraud shading), topology information (such as mesh), and a light source processing attribute, among others. The light source processing attribute defines information as to whether a polygon shadow is to be displayed or not (to be displayed/not to be displayed=⅙).

In the object information table 110, an initial address of a vertex data file 112, the number of polygons, an initial address of a texture table that is used, etc. are registered when an object is generated according to CAD.

In step S102, the layout information registering means 122 registers information relative to the layout of objects entered via the input/output device 24 in the object information table 110.

In step S103, the coordinate setting means 124 calculates world coordinates of the screen 176 based on information relative to the layout of the screen 176, and stores the calculated world coordinates in a predetermined array variable area Z1.

In step S104, the coordinate setting unit 124 calculates world coordinates of the light source 52 based on information relative to the layout of the light source 52, and stores the calculated world coordinates in a predetermined array variable area Z2. The coordinate setting unit 124 also stores the type of the light source 52 entered via the input/output device 24 in a predetermined array variable area Z3.

In step S105, the coordinate setting unit 124 sets up the layout of the virtual plane 50 based on the position of the light source 52 stored in the array variable area Z2 and the layout information of objects registered in the object information table 110, calculates world coordinates of the virtual plane 50, and stores the calculated world coordinates in a predetermined array variable area Z4.

In step S106, the light source coordinate calculating unit 126 calculates light source coordinates of the virtual plane 50 based on the world coordinates of the virtual plane 50 stored in the array variable area Z4 and the position of the light source 52, and stores the Z coordinate of the calculated world coordinates in a predetermined array variable area Z5.

After step S105, the sequence of operation of the various setting processing unit 102 is ended.

A sequence of operation of the rendering list generating unit 104 will be described below with reference to FIGS. 15 and 16.

Figure 15:
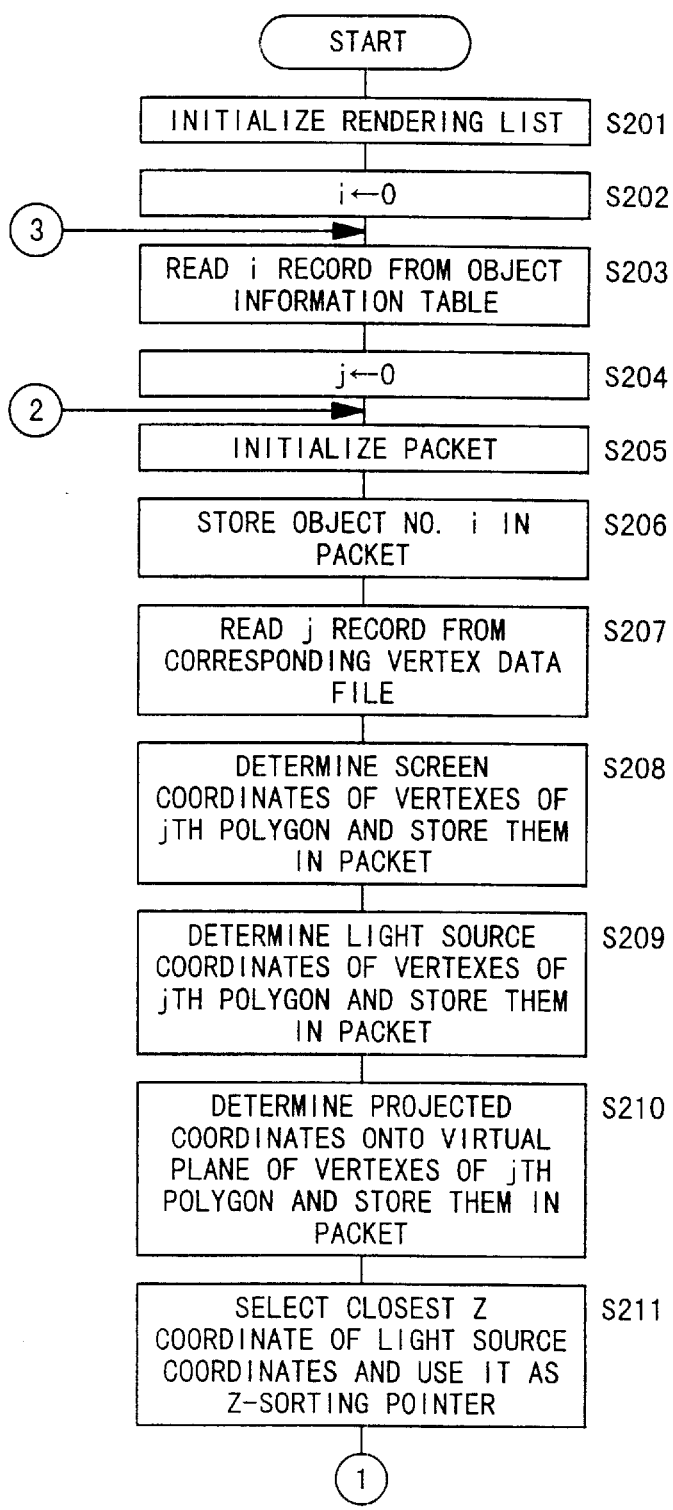
FIGS. 15 and 16 are a flowchart of a sequence of operation of the rendering list generating unit in the drop shadowing process according to the first embodiment of the present invention.

In step S201 shown in FIG. 15, the rendering list initializing unit 130 initializes the rendering list 116.

Then, in step S202, the rendering list generating unit 104 stores an initial value "0" in an index register i used to search for an object, thereby initializing the index register i.

In step S203, the table record reading unit 132 reads a record (i record) indicated by the index register i from the object information table 110.

In step S204, the rendering list generating unit 104 stores an initial value "0" in an index register j used to search for a polygon, thereby initializing the index register j.

In step S205, the data storing unit 136 stores an initial value in a packet 114, thereby initializing the packet 114.

In step S206, the data storing unit 136 stores an object number i (the value of the index register i) in the packet 114.

In step S207, the file record reading means 134 reads a record (j record) indicated by the index register j from the corresponding vertex data file 112, i.e., reads vertex data of a jth polygon. The corresponding vertex data file 112 is a vertex data file corresponding to the initial address of the vertex data file 112 that is registered in the i record read from the object information table 110.

In step S208, the coordinate calculating unit 138 determines screen coordinates $SP_{ij0}=(X_{sij0}, Y_{sij0}, Z_{sij0})$, $SP_{ij1}=(X_{sij1}, Y_{sij1}, Z_{sij1})$, $SP_{ij2}=(X_{sij2}, Y_{sij2}, Z_{sij2})$ of the vertexes of the jth polygon based on the layout information of the object registered in the i record in the object information table 110, the world coordinates of the screen 176 registered in the array variable area Z1, and the vertex data of the jth polygon, and the data storing unit 136 stores the determined screen coordinates in the packet 114.

In step S209, the coordinate calculating unit 138 determines light source coordinates $UP_{ij0}=(X_{uij0}, Y_{uij0}, Z_{uij0})$, $UP_{ij1}=(X_{uij1}, Y_{uij1}, Z_{uij1})$, $UP_{ij2}=(X_{uij2}, Y_{uij2}, Z_{uij2})$ of the vertexes of the jth polygon based on the layout information of the object, the world coordinates of the light source 52 registered in the array variable area Z2 and the vertex data of the jth polygon, and the data storing unit 136 stores the determined light source coordinates in the packet 114.

In step S210, the coordinate calculating unit 138 determines projected coordinates $UV_{ij0}=(U_{ij0}, V_{ij0})$, $UV_{ij1}=(U_{ij1}, V_{ij1})$, $UV_{ij2}=(U_{ij2}, V_{ij2})$ of the vertexes of the jth polygon based on the layout information of the object, the Z coordinate (light source coordinate) of the virtual plane 50 registered in the array variable area Z5, and the vertex data of the jth polygon, and the data storing unit 136 stores the determined projected coordinates in the packet 114.

In step S211, the pointer determining means 140 selects the Z coordinate which is closest to the light source, of those Z coordinates of the light source coordinates $UP_{ij0}=(X_{uij0}, Y_{uij0}, Z_{uij0})$, $UP_{ij1}=(X_{uij1}, Y_{uij1}, Z_{uij1})$, $UP_{ij2}=(X_{uij2}, Y_{uij2}, Z_{uij2})$ of the vertexes that have been determined in step S209, and uses the selected Z coordinate as a Z-sorting pointer for the jth polygon.

Figure 16:
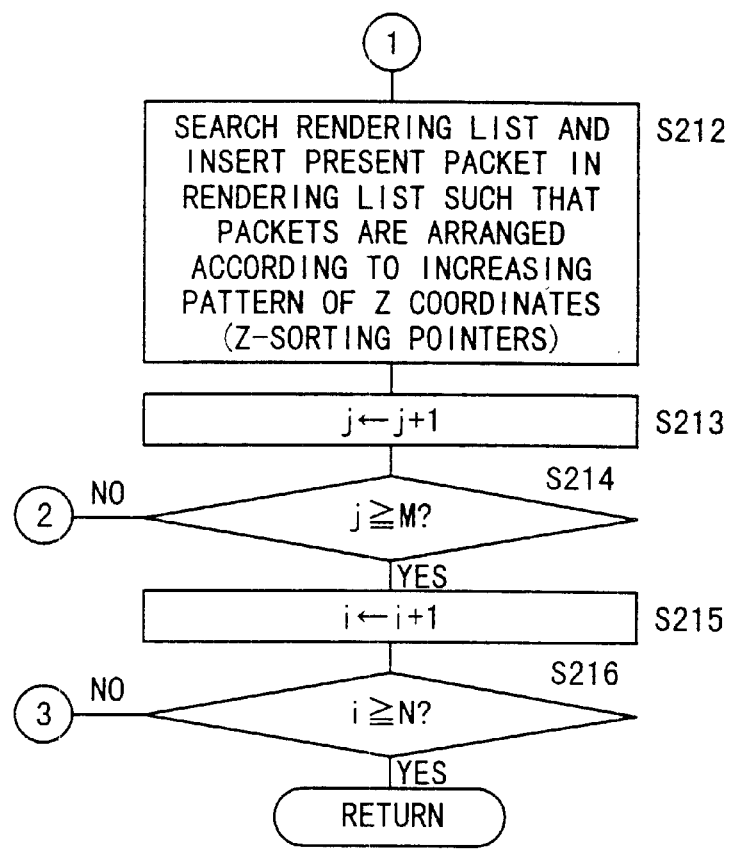
Figure 17:
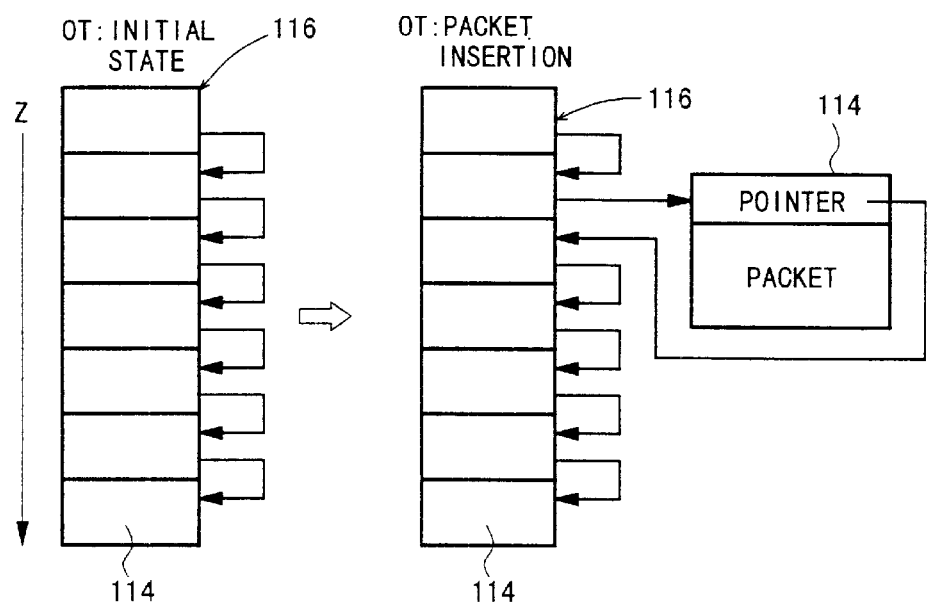
FIG. 17 is a diagram illustrative of the insertion of a packet into a rendering list.

In step S212 shown in FIG. 16, the packet inserting unit 142 searches the rendering list 116, and inserts the present packet 114 into the rendering list 116 such that the packets 114 are arranged therein according to an increasing pattern of Z coordinates (Z-sorting pointers), as shown in FIG. 17.

In step S213, the end determining unit 144 increments the value of the index register j by "+1". In step S214, the end determining unit 144 determines whether the processing on all the polygons that make up the ith object has been ended or not, by determining whether or not the value of the index register j is equal to or greater than the number M of polygons registered in the i record in the object information table 110.

If the processing on all the polygons that make up the ith object has not ended, then control goes back to step S205 shown in FIG. 15 to calculate the various coordinates relative to a next polygon, store the calculated coordinates in a packet 114, and insert the packet 114 in the rendering list 116.

If the processing on all the polygons that make up the ith object has ended in step S214, then control proceeds to step S215 in which the end determining unit 144 increments the value of the index register i by "+1". In step S216, the end determining unit 144 determines whether the processing on all the objects has ended or not, by determining whether or not the value of the index register i is equal to or greater than the number N of records registered in the object information table 110.

If the processing on all the objects has not been ended, then control goes back to step S203 shown in FIG. 15 to calculate the various coordinates relative to all polygons of a next object, store the calculated coordinates in respective packets 114, and insert the packets 114 in the rendering list 116 according to an increasing pattern of z-sorting If the processing on all the objects has ended in step S216, then the sequence of operation of the rendering list generating unit 104 is brought to an end.

An sequence of operation of the rendering unit 106 will be described below with reference to FIGS. 18 and 19.

Figure 18:
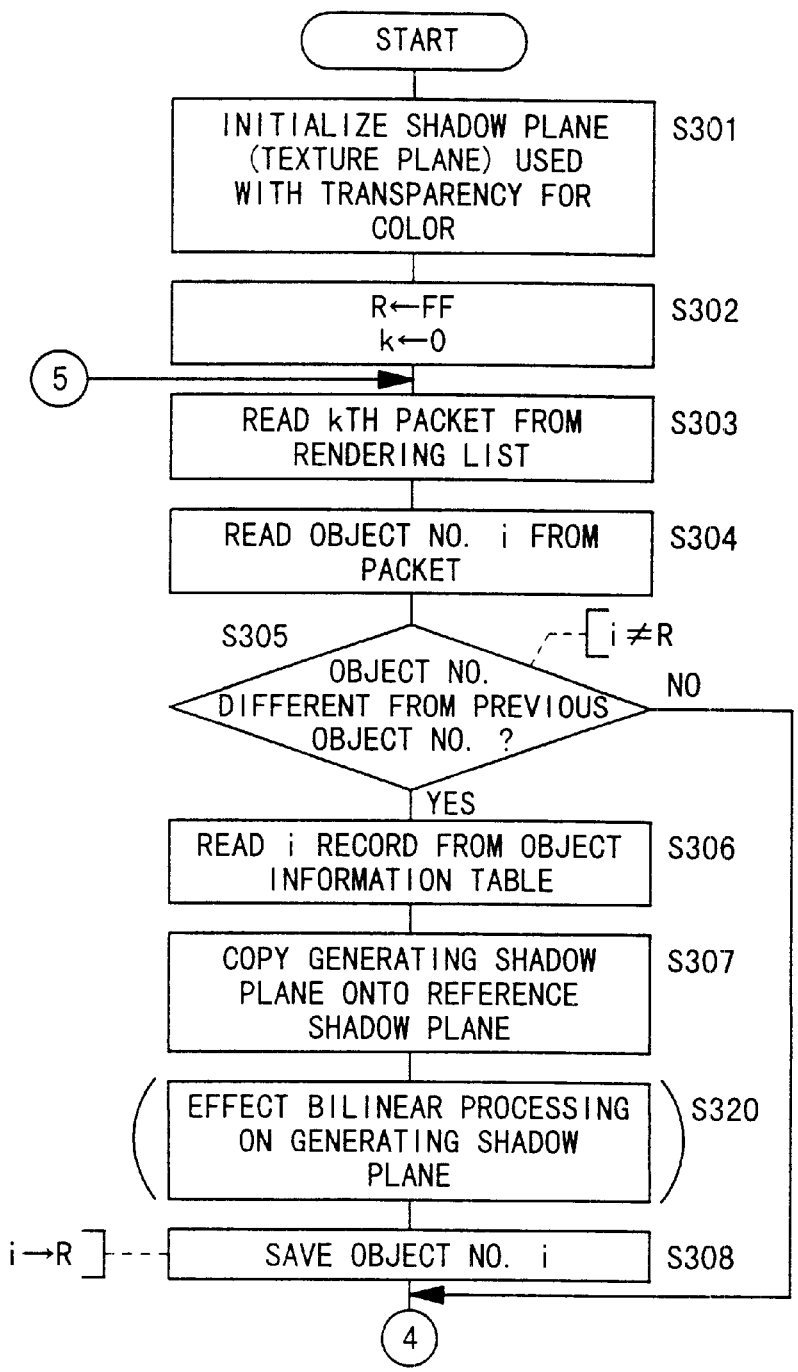
FIGS. 18 and 19 are flowchart of sequences of operation of the rendering unit in the drop shadowing process according to the first embodiment of the present invention.

In step S301 shown in FIG. 18, the shadow plane initializing unit 160 reads initial data Di from the initial data file 178, and renders the initial data Di in the shadow plane that is used (the reference shadow plane 150 and the generating shadow plane 152) to initialize the reference shadow plane 150 and the generating shadow plane 152.

In step S302, the rendering unit 106 stores an initial value "FF" in a register R which is used to save the object number i, and an initial value "0" in an index register k which is used to search the packets 114, for thereby initializing the register R and the index register k.

In step S303, the packet reading unit 162 reads a packet 114 at a (kth) indicated by the index register k from the rendering list 116. In step S304, the packet reading unit 162 reads the object number i from the read packet 114.

In step S305, the object determining unit 166 determines whether the present object number i is the same as the previous object number or not, by determining whether the value of the index register i is the same as the value of the register R or not.

If the present object number i is different from the previous object number, then control proceeds to step S306 in which the table record reading unit 164 reads the i record from the object information table 110.

In step S307, the shadow plane rendering means 168 copies texture data (or the initial data Di) relative to a polygon shadow rendered in the generating shadow plane 152 onto the reference shadow plane 150.

In step S308, the object determining unit 166 stores the object number i in the register R.

Figure 19:
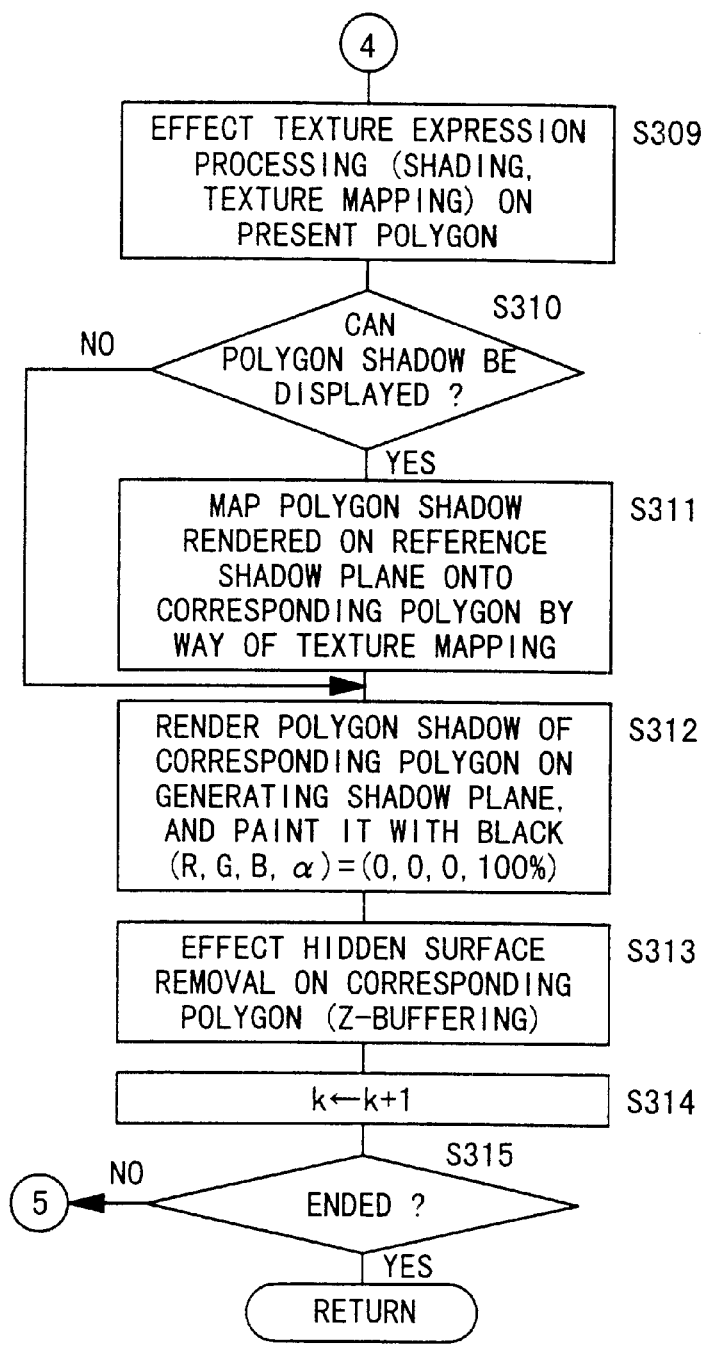

After the processing in step S308 is finished or if the present object number i is the same as the previous object number in step S305, control goes to step S309 shown in FIG. 19 in which the texture expressing processing unit 154 performs a normal texture expressing process. Specifically, the texture expressing processing unit 154 performs a texture expressing process such as shading, texture mapping, etc. based on the screen coordinates of the present polygon and the initial address of a texture table 180.

In step S310, the polygon shadow display determining unit 170 determines whether a polygon shadow can be displayed on the object or not based on a polygon shadow display attribute of the light source processing attributes registered in the corresponding record in the object information table 110.

If a polygon shadow can be displayed, then control goes to step S311 in which the texture mapping unit 156 of the texture expressing processing unit 154 maps the polygon shadow rendered in the reference shadow plane 150 onto the polygon to be processed by way of texture mapping, while referring to the projected coordinates $UV_{ij0}=(U_{ij0}, V_{ij0})$, $UV_{ij1}=(U_{ij1}, V_{ij1})$, $UV_{ij2}=(U_{ij2}, V_{ij2})$ of the polygon to be processed onto the virtual plane 50. If only the initial data is rendered in the reference shadow plane 150, then the initial data Di is mapped by way of texture mapping.

After the processing in step S311 is finished or if the a polygon shadow cannot be displayed in step S310, then control goes to step S312 in which the shadow plane rendering unit 168 renders the polygon shadow of the present polygon in combination with the previous polygon shadow on the generating shadow plane 152, based on the projected coordinates of the present polygon onto the virtual plane 50, and paints the combined shadow with black (R, G, B, α)=(0, 0, 0, 100%).

In step S313, the hidden surface removal processing unit 172 writes the data of the present polygon in the rendering area 34b while carrying out hidden surface removal according to Z-buffering, based on the screen coordinates of the present polygon.

In step S314, the rendering unit 106 increments the value of the index register k by "+1". Then, in step S315, the end determining unit 174 determines whether the processing on all the packets 114 has ended or not. If the processing on all the packets 114 has not ended, then control goes back to step S303 to perform the normal texture expressing process, the texture mapping of the polygon shadow, and the hidden surface removal with respect to the polygon registered in a next packet 114.

If the processing on all the packets 114 registered in the rendering list 116 has ended in step S315, then the sequence of operation of the rendering means 106 comes to an end.

The processing in steps S303–S313 is repeated to offer the following advantages: With respect to the polygons of the object Ob1 that is positioned mostly closely to the light source 52, only the initial data Di is written on the reference shadow plane 150. If the initial data Di represents transparency, then no polygon shadow is rendered on the polygons of the object Ob1.

On the polygons of the object Ob2 that is the second object from the light source 52, there is rendered a polygon shadow of all the polygon shadows of the first object Ob1 from the light source, which is present in the range represented by the projected coordinates of the polygon of the object Ob1. When the processing on the second object Ob2 is finished, the polygon shadow of the first object Ob1 is rendered on the second object Ob2.

Similarly, on an object Ob3 that is the third object from the light source 52, there is rendered a combination of the polygon shadow of the first object Ob1 and the polygon shadow of the second object Ob2.

In the drop shadowing process according to the first embodiment, as described above, one virtual plane 50 is established from the layout of a plurality of objects generated by three-dimensional modeling, and a polygon shadow of one of the objects which is formed by projection onto the virtual plane by a light source as a viewpoint is expressed as on another one of the objects that is farther from the light source 52 than the object.

Specifically, a reference shadow plane 150 and a generating shadow plane 152 which are texture planes corresponding to the virtual plane 50 are set up, the shadow of an object which is formed by projection onto the virtual plane 50 is rendered on the reference shadow plane 150 via the generating shadow plane 152, and the shadow rendered on the reference shadow plane 150 is mapped onto a next object by way of texture mapping.

In this manner, it is easy to express shadows with respect to a plurality of objects arranged in a complex lay-out or a shadow with respect to an object having a complex shape.

In this embodiment, since a shadow expression attribute as to whether a polygon shadow is to be expressed on an object or not is defined in the light source processing attribute in each record in the object information table 110, the process of expressing a polygon shadow on an object can selectively be performed. Therefore, the facial expression of a principal character in a game, for example, may be prevented from being hidden by the shadow of another object.

A drop shadowing process according to a second embodiment of the present invention will be described below with reference to FIGS. 9, 20 through 22.

The drop shadowing process according to the second embodiment is essentially the same as the drop shadowing process according to the first embodiment except that the rendering unit in the drop shadowing process has a bilinear processing unit 190 for blurring a polygon shadow depending on the distance from the light source 52, as indicated in parentheses in FIG. 9.

Figure 20:
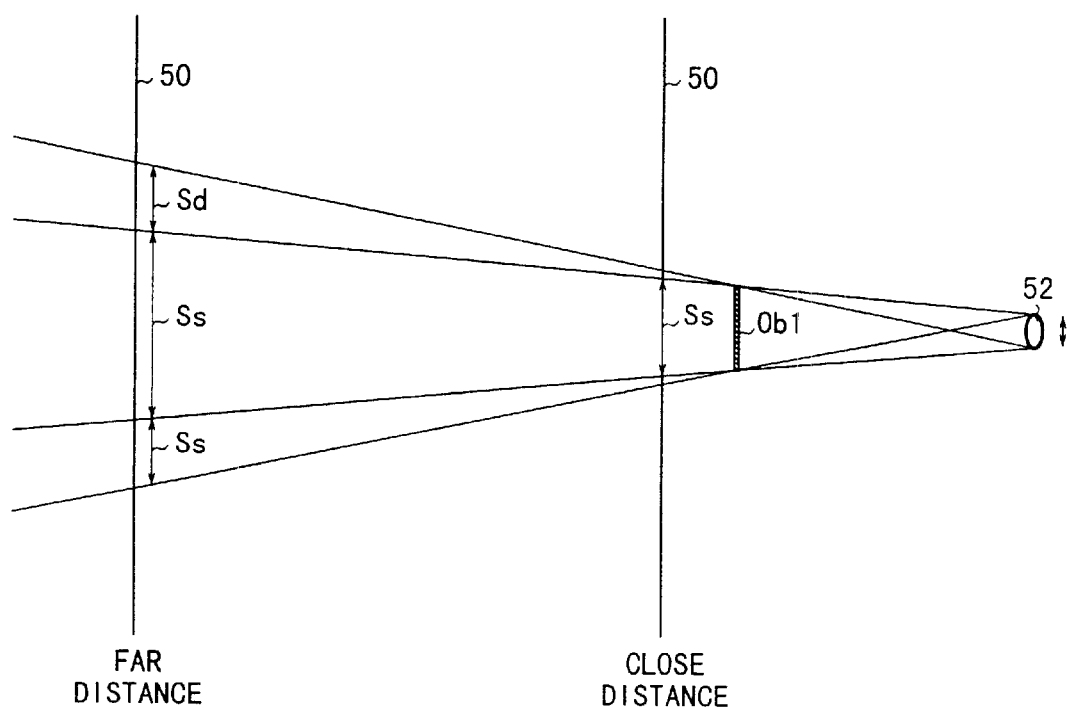
FIG. 20 is a diagram illustrative of the formation of umbra and penumbra regions on a virtual plane by a distributed light source in a drop shadowing process according to a second embodiment of the present invention.

As shown in FIG. 20, if the light source 52 is not a point light source, but an extended light source, then when the virtual plane 50 is located in a position close to the object Ob1, the object Ob1 casts an umbra Ss on the virtual plane 50.

When the virtual plane 50 is located in a position far from the object Ob1, the object Ob1 casts the umbra Ss and also a penumbra Sd, which is a blurred shadow that surrounds the umbra Ss, on the virtual plane 50. The degree of a blur of the penumbra Sd increases depending on the distance from the light source 52 to the virtual plane 50.

The drop shadowing process according to the second embodiment is arranged to realize the characteristics of the penumbra Sd.

Specifically, as shown in FIG. 18, after the shadow plane rendering unit 168 has copied texture data relative to a polygon shadow rendered in the generating shadow plane 152 onto the reference shadow plane 150 in step S307, the bilinear processing means 190 effects low-pass filtering on the texture data relative to the polygon shadow rendered in the generating shadow plane 152 in step S320 indicated in parentheses in FIG. 18.

Figure 21:
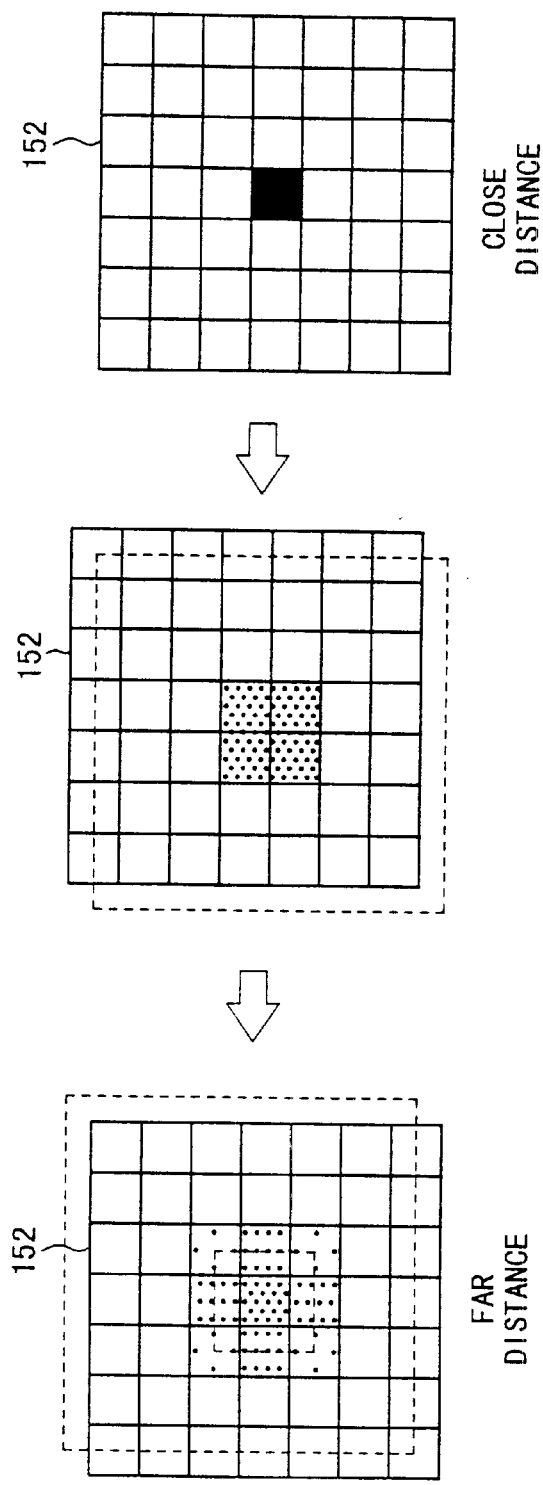
FIG. 21 is a diagram illustrative of the manner in which a generating shadow plane is subjected to low-pass filtering depending on the distance from a light source to express the extent of a blur (penumbra) depending on the distance, in the drop shadowing process according to the second embodiment of the present invention.

FIG. 21 shows the manner in which the texture data relative to the polygon shadow rendered in the generating shadow plane 152 is subjected to low-pass filtering depending on the distance from the light source 52 to express the degree of a blur (penumbra) depending on the distance. A review of FIG. 21 indicates that the projected shadow is clearer at a distance close to the light source 52 and more blurred at a distance far from the light source 52. According to the second embodiment, if the present object number i is different from the previous object number in step S305 shown in FIG. 5, then the texture data relative to the polygon shadow rendered in the generating shadow plane 152 is subjected to low-pass filtering in step S320.

Figure 22:
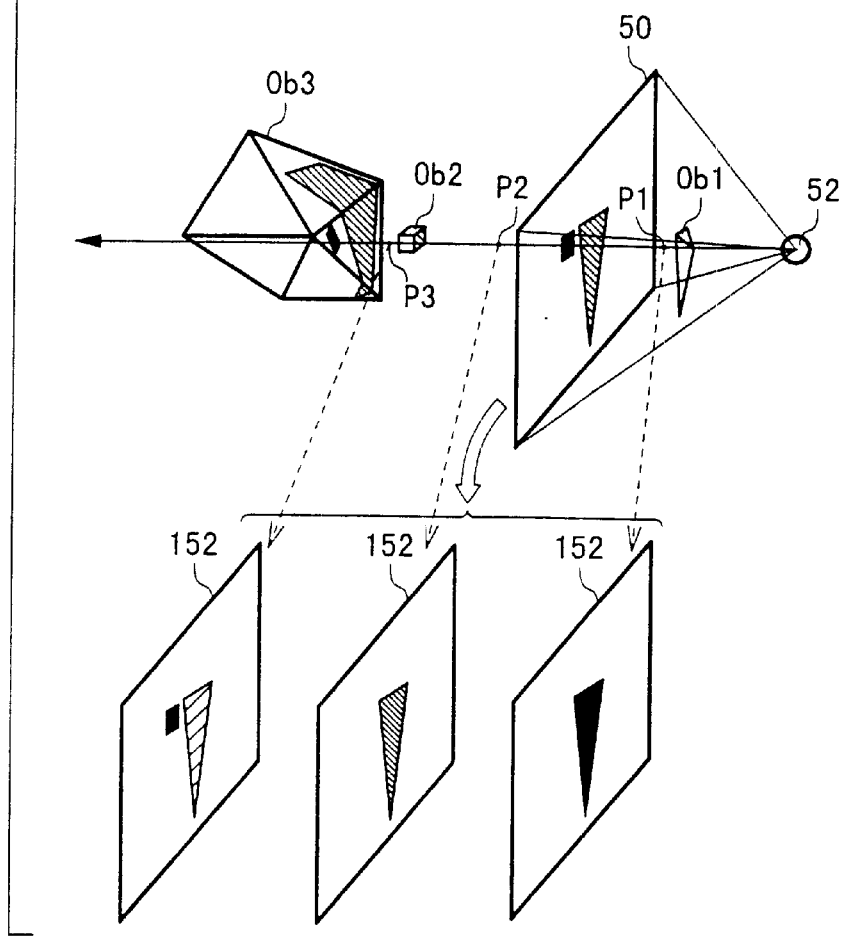
FIG. 22 is a diagram illustrative of the manner in which a generating shadow plane is subjected to low-pass filtering each time an object is processed and a generating shadow plane is subjected to low-pass filtering at every constant distance, in the drop shadowing process according to the second embodiment of the present invention.

In this manner, as shown in FIG. 22, when the object Ob1 is processed at a stage P1, the polygon shadow (umbra only) of the object Ob1 is rendered on the generating shadow plane 152, and when the object Ob2 is processed at a stage P3, the polygon shadow (umbra and penumbra) of the object Ob1 and the polygon shadow (umbra only) of the object Ob2 are rendered on the generating shadow plane 152.

Farther from the light source 52 and each time objects are changed, the polygon shadow rendered on the generating shadow plane 152 is gradually blurred depending on the distance from the light source 52.

The polygon shadow rendered on the generating shadow plane 152 may be subject to low-pass filtering each time a certain distance is reached while monitoring the light source coordinates. In FIG. 22, the polygon shadow rendered on the generating shadow plane 152 is subject to low-pass filtering at stages or points P1, P2, P3.

In the drop shadowing process according to the second embodiment, inasmuch as the polygon shadow rendered on the generating shadow plane 152 is subject to low-pass filtering depending on the distance from the light source 52, the polygon shadow is blurred depending on the distance from the light source 52 and hence is expressed in a realistic manner.

A drop shadowing process according to a third embodiment of the present invention will be described below with reference to FIGS. 23 through 29.

In the drop shadowing process according to the third embodiment, when a polygon shadow rendered on the generating shadow plane 152 is expressed on an object via the reference shadow plane 150, it is interpolated according to rendering (in a narrow sense) depending on the polygon shadow before it is subject to low-pass filtering, the polygon shadow after it is subject to low-pass filtering, and the light source coordinates of the object to be processed, for thereby controlling the blur of the polygon shadow.

Figure 23:
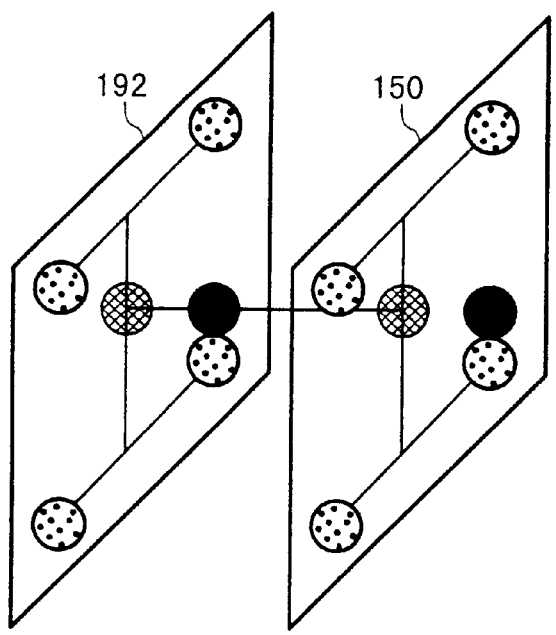
FIG. 23 is a diagram illustrative of a trilinear process in a drop shadowing process according to a third embodiment of the present invention.

As shown in FIG. 23, the polygon shadow is rendered using two shadow planes, i.e., the reference shadow plane 150 and a background shadow plane 192.

The reference shadow plane 150 and the background shadow plane 192 are shadow planes on which the polygon shadow is subject to low-pass filtering at different times. The polygon shadow is rendered by a trilinear texture mapping process which effects interpolation between the two shadow planes 150, 192 depending on the Z coordinate of the light source coordinates. As a result, the blur of the shadow depending on the distance from the light source 52 to the object can be controlled within the polygon for better shadow approximation.

An arrangement for carrying out the drop shadowing process according to the third embodiment and operation of the drop shadowing process will be described below.

The drop shadowing process according to the third embodiment is essentially the same as the drop shadowing process according to the first embodiment except that the various setting processing unit 102 and the rendering unit 106 have partly different functions.

Figure 24:
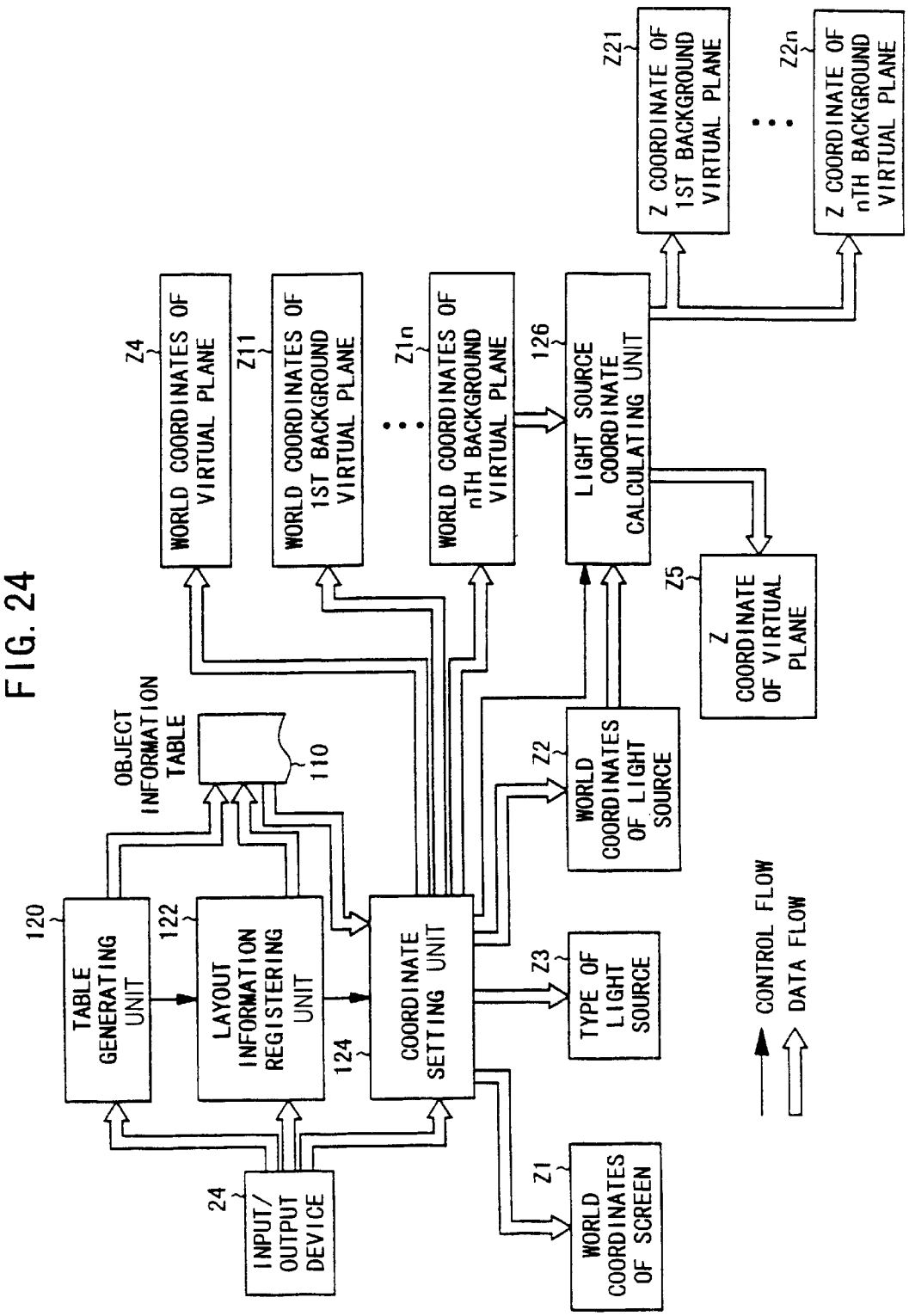
FIG. 24 is a functional block diagram of a various setting processing unit in the drop shadowing process according to the third embodiment of the present invention.

Specifically, as shown in FIG. 24, the various setting processing unit 102 has the table generating unit 120, the layout information registering unit 122, the coordinate setting unit 124, and the light source coordinate calculating means 126 which has different functions from those described above.

The light source coordinate calculating unit 126 determines light source coordinates of the virtual plane 50 based on the world coordinates of the virtual plane 50, and registers the Z coordinate in a predetermined array variable area Z5. The light source coordinate calculating unit 126 also determines light source coordinates of 1st–nth background virtual planes that are virtually disposed behind respective objects based on the layout information of the objects, and registers Z-coordinates of the determined light source coordinates in respective predetermined array variable areas Z11–Z1n.

Figure 25:
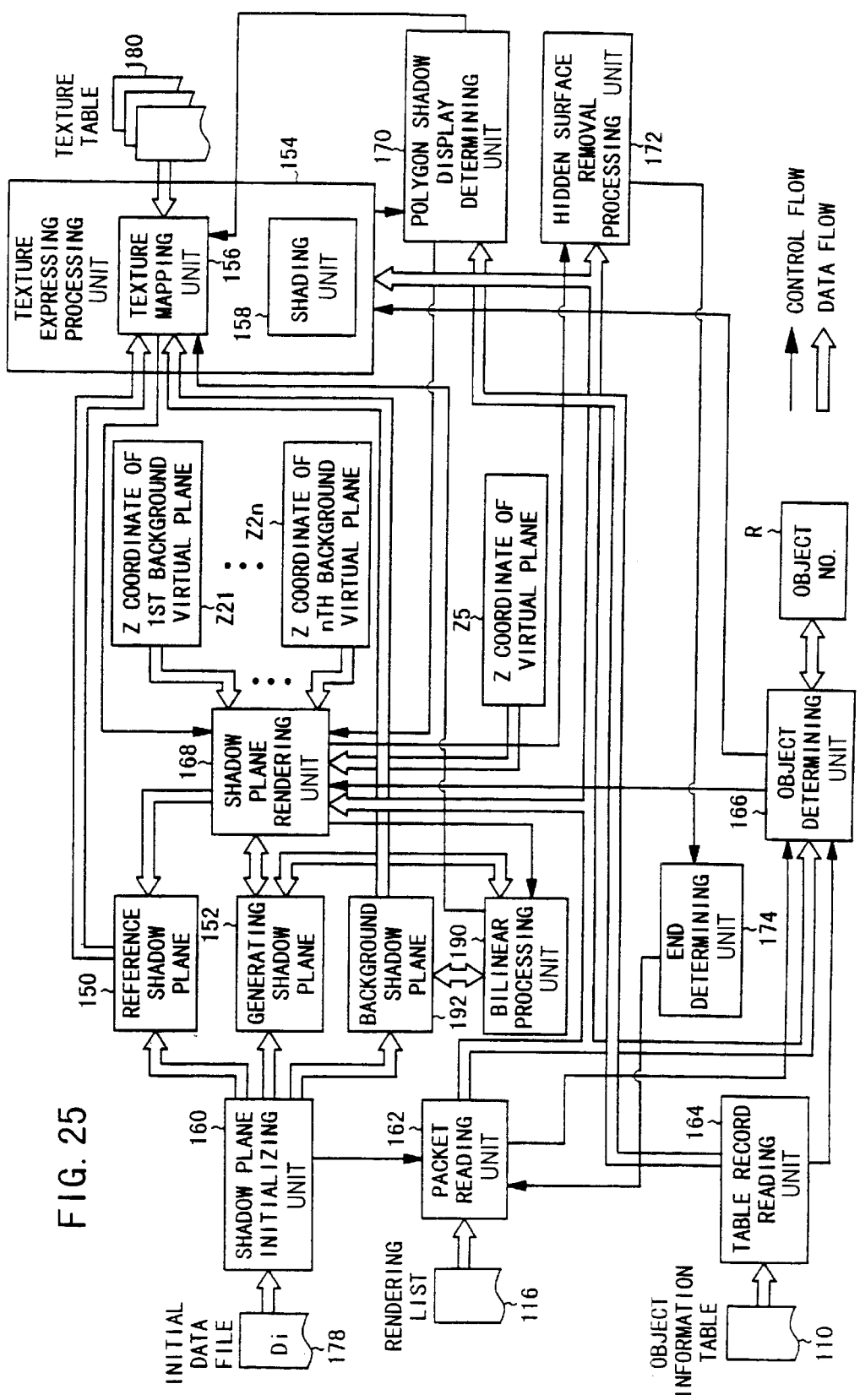
FIG. 25 is a functional block diagram of a rendering unit in the drop shadowing process according to the third embodiment of the present invention.

As shown in FIG. 25, the rendering unit 106 is arranged to use, in addition to the reference shadow plane 150 and the generating shadow plane 152, one background shadow plane 192 logically assigned to the texture area 34a of the image memory 34 in association with the 1st–nth background virtual planes.

The rendering unit 106 has the shadow plane initializing unit 160, the packet reading unit 162, the table record reading unit 164, the object determining unit 166, the shadow plane rendering 168, the polygon shadow display determining unit 170, the hidden surface removal processing unit 172, and the end determining unit 174. The shadow plane initializing unit 160, the shadow plane rendering means 168, and the bilinear processing unit 190 have different functions from those described above.

The shadow plane initializing unit 160 writes initial data Di into the background shadow plane 192, as well as the reference shadow plane 150 and the generating shadow plane 152, to initialize these shadow planes 150, 152, 192.

The shadow plane rendering unit 168 renders, on the background shadow plane 192, a polygon shadow formed when a polygon shadow projected onto the virtual plane 50 (a polygon shadow rendered on the reference shadow plane 150) is projected onto either one of the 1st–nth background virtual planes virtually disposed behind the object, based on the distance from the light source 52 to the virtual plane 50 (the Z coordinate of the virtual plane 50) and the distance from the light source 52 to the corresponding background virtual plane (the Z coordinate of either one of the 1st–nth background virtual planes).

The bilinear processing unit 190 effects low-pass filtering on the polygon shadow rendered on the background shadow plane 192, as well as the polygon shadow rendered on the generating shadow plane 152.

Operation of the drop shadowing process according to the third embodiment will be described below with reference to FIGS. 26 through 28.

Figure 26:
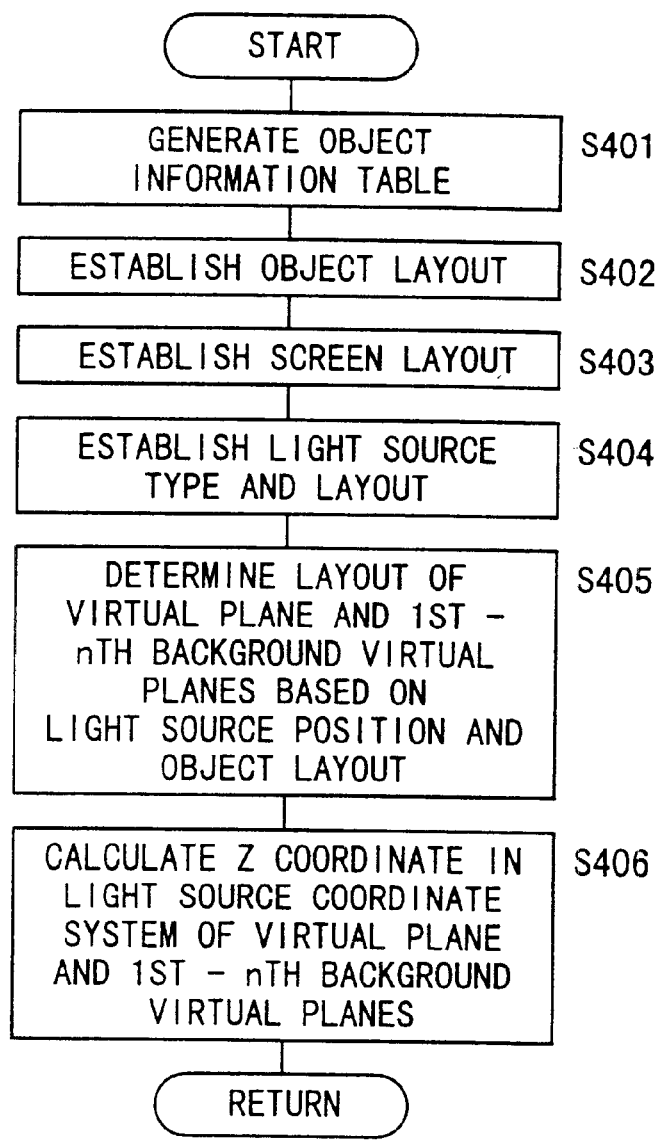
FIG. 26 is a flowchart of a sequence of operation of the various setting processing unit in the drop shadowing process according to the third embodiment of the present invention.

In steps S401–S404 shown in FIG. 26, the various setting processing unit 102 generates an object information table 110, registers information relative to the layout of objects in the object information table 110, registers the world coordinates of the screen 176, and registers the type of the light source 52 and the world coordinates of the light source 52, as with steps S101–S104 carried out by the various setting processing unit 102 in the drop shadowing process according to the first embodiment.

In step S405, the coordinate setting unit 124 sets up the layout of the virtual plane 50 and the 1st–nth background virtual planes based on the position of the light source 52 stored in the array variable area Z2 and the lay-out information of objects registered in the object information table 110, calculates world coordinates of the virtual plane 50 and the 1st–nth background virtual planes, and stores the calculated world coordinates in predetermined array variable areas Z4, Z11–Z1n.

In step S406, the light source coordinate calculating unit 126 calculates light source coordinates of the virtual plane 50 and the 1st–nth background virtual planes based on the world coordinates of the light source 52 and the virtual plane 50 stored in the array variable areas Z2, Z4, and stores the Z coordinates of the calculated world coordinates in predetermined array variable areas Z5, Z21–Z2n.

The rendering list generating unit 104 performs the same processing as with the drop shadowing process according to the first embodiment. Therefore, the processing performed by the rendering list generating unit 104 will not be described below.

Figure 27:
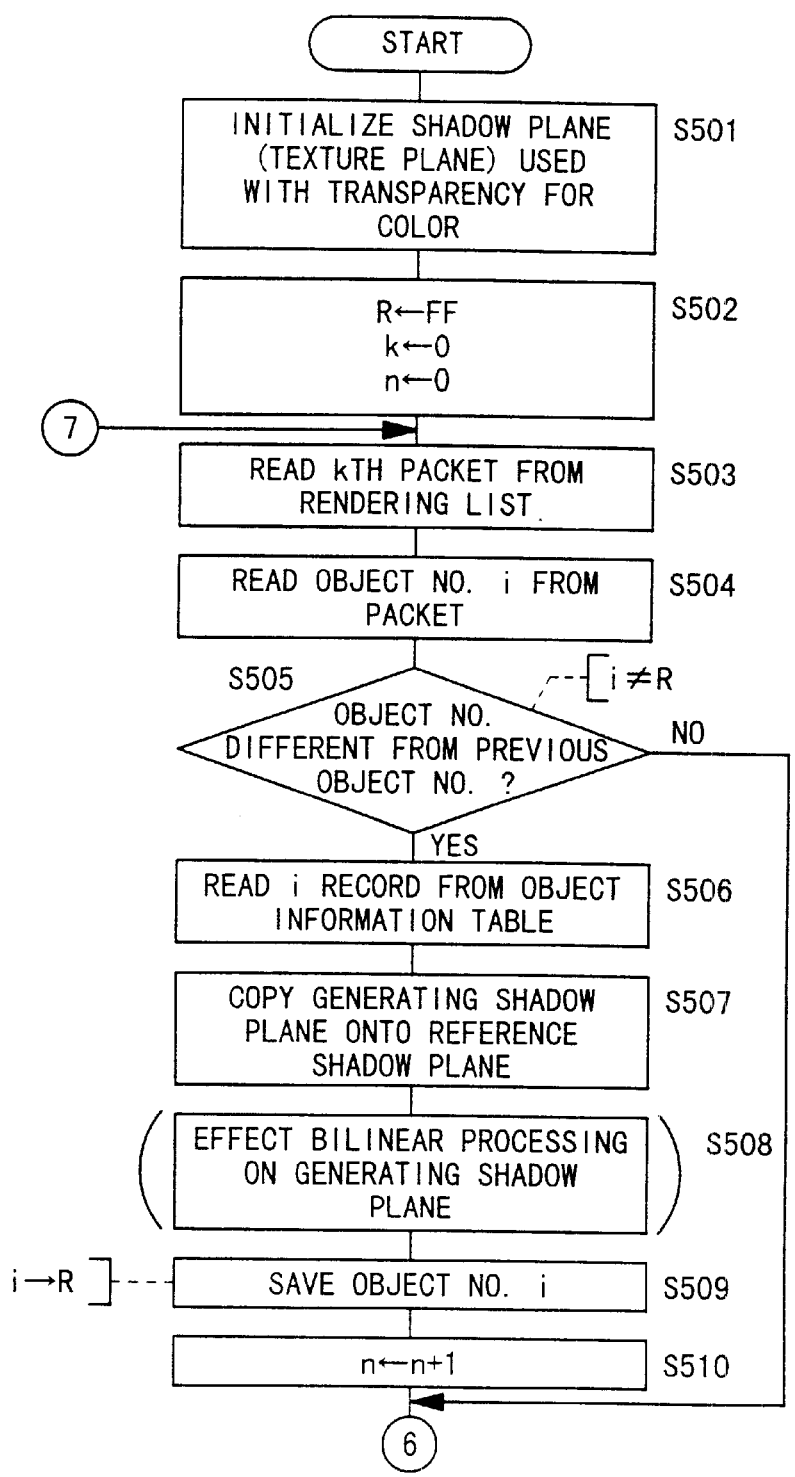
FIGS. 27 and 28 are flowchart of a sequence of operation of the rendering unit in the drop shadowing process according to the third embodiment of the present invention.

Then, in step S501 shown in FIG. 27, the shadow plane initializing unit 160 of the rendering unit 106 reads initial data Di from the initial data file 178, and renders the initial data Di in the shadow plane that is used (the reference shadow plane 150, the generating shadow plane 152, and the background shadow plane 192) to initialize these shadow planes 150, 152, 192.

In step S502, the rendering unit 106 stores an initial value "FF" in a register R which is used to save the object number i, an initial value "0" in an index register k which is used to search the packets 114, and an initial value "0" in an index register n which is used to search the background virtual planes, for thereby initializing the register R and the index registers k, n.

In step S503, the packet reading unit 162 reads a packet 114 at a point (kth) indicated by the index register k from the rendering list 116. In step S504, the packet reading unit 162 reads the object number i from the read packet 114.

In step S505, the object determining unit 166 determines whether the present object number i is the same as the previous object number or not, by determining whether the value of the index register i is the same as the value of the register R or not.

If the present object number i is different from the previous object number, then control proceeds to step S506 in which the table record reading unit 164 reads the i record from the object information table 110.

In step S507, the shadow plane rendering unit 168 copies texture data relative to a polygon shadow rendered in the generating shadow plane 152 onto the reference shadow plane 150.

In step S508, the bilinear processing unit 190 effects low-pass filtering on the texture data relative to the polygon shadow rendered in the generating shadow plane 152.

In step S509, the object determining unit 166 stores the object number i in the register R. Thereafter, the rendering unit 106 increments the value of the index register n by "+1".

Figure 28:
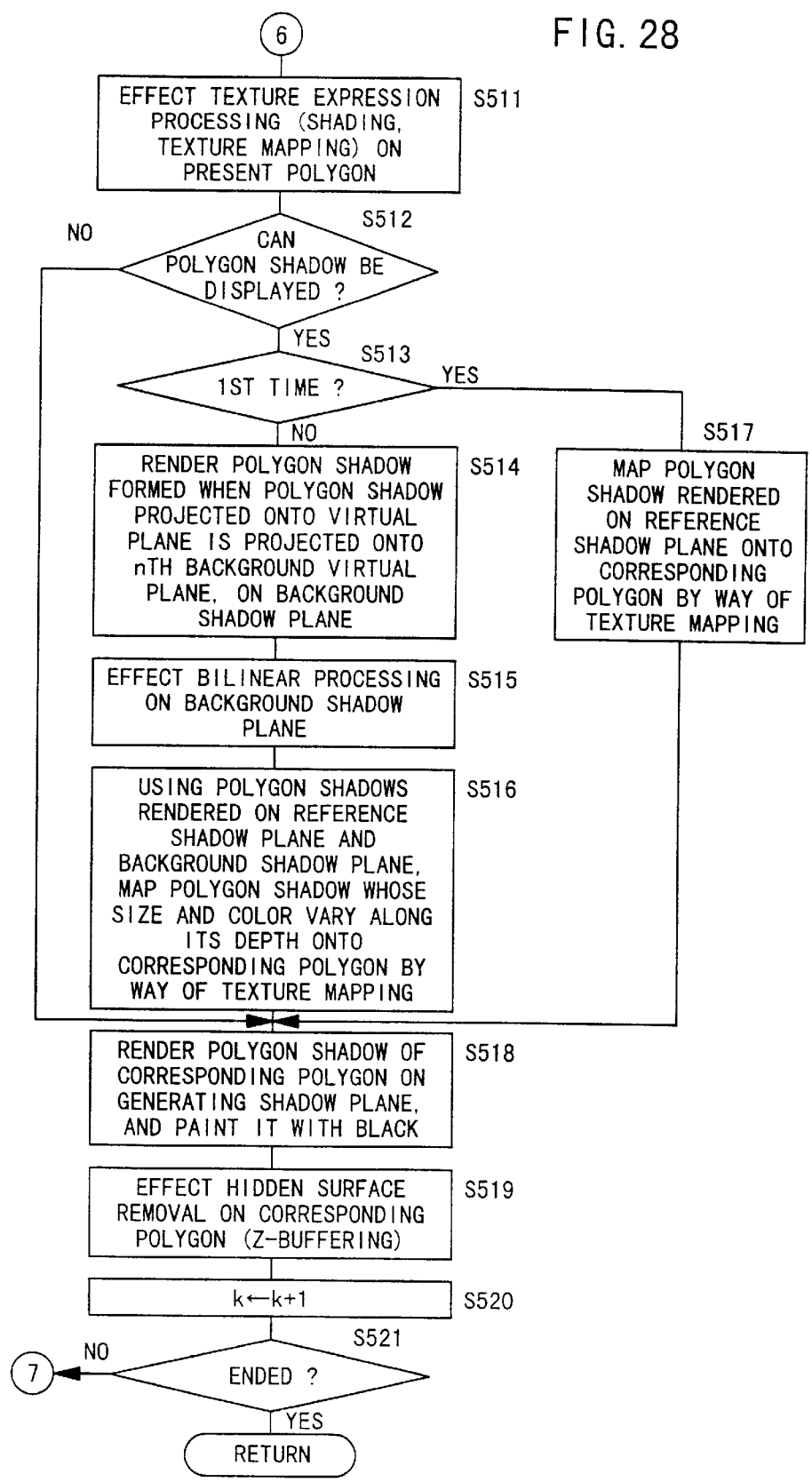

After the processing in step S510 is finished or if the present object number i is the same as the previous object number in step S505, control goes to step S511 shown in FIG. 28 in which the texture expressing processing unit 154 performs a normal texture expressing process. Specifically, the texture expressing processing unit 154 performs a texture expressing process such as shading, texture mapping, etc. based on the screen coordinates of the present polygon and the initial address of a texture table 180.

In step S512, the polygon shadow display determining unit 170 determines whether a polygon shadow can be displayed on the object or not based on a polygon shadow display attribute of the light source processing attributes registered in the corresponding record in the object information table 110.

If a polygon shadow can be displayed, then control goes to step S513 in which the polygon shadow display determining unit 170 determines whether the polygon shadow is displayed for the first time or not, based on whether the object number i is "0" or not.

If not for the first time, then control goes to step S514 in which the shadow plane rendering unit 168 renders, on the background shadow plane 192, a polygon shadow formed when a polygon shadow projected onto the virtual plane 50 (a polygon shadow rendered on the reference shadow plane 150) is projected onto the nth background virtual plane virtually disposed behind the object, based on the Z coordinate of the virtual plane 50 and the Z coordinate of the nth background virtual planes.

In step S515, the bilinear processing unit 190 effects low-pass filtering on the polygon shadow rendered on the background shadow plane 192, thereby blurring the polygon shadow depending on the distance from the light source 52.

In step S516, the texture mapping unit 156 of the texture expressing processing unit 154 carries out interpolation according to rendering based on the polygon shadow rendered on the reference shadow plane 150, the polygon shadow rendered on the background shadow plane 192, and the light source coordinates of the vertexes of the polygon, and maps the polygon shadow projected onto the polygon by way of texture mapping.

Figure 29:
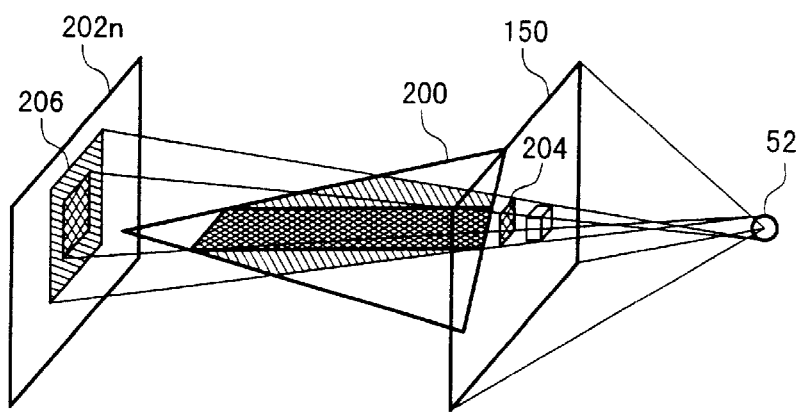
FIG. 29 is a diagram illustrative of an expression of a shadow whose shape and color vary gradually along the depth of a polygon in the drop shadowing process according to the third embodiment of the present invention.

At this time, as shown in FIG. 29, texture mapping is carried out such that the shape of the polygon shadow gradually changes, along the depth of a polygon 200, from the shape of a polygon shadow 204 rendered on the reference shadow plane 150 to the shape of a polygon shadow 206 rendered on the nth background shadow plane 202n, and the color of the shadow on the polygon 200 gradually changes, along the depth of the polygon 200, from the color of the polygon shadow 204 rendered on the reference shadow plane 150 to the color of the polygon shadow 206 rendered on the nth background shadow plane 202n.

If for the first time in step S513, then control goes to step S517 in which the texture mapping unit 156 maps the polygon shadow rendered on the reference shadow plane 150 onto the polygon to be processed, by way of texture mapping, while referring to the projected coordinates of the polygon onto the virtual plane 50.

After the processing in step S516 or step S517 or if a polygon shadow cannot be displayed, then control goes to step S518 in which the shadow plane rendering unit 168 renders the polygon shadow of the present polygon in combination with the previous polygon shadow on the generating shadow plane 152, based on the projected coordinates of the present polygon onto the virtual plane 50, and paints the combined shadow with black (R, G, B, α)=(0, 0, 0, 100%).

In step S519, the hidden surface removal processing means 172 writes the data of the present polygon in the rendering area 34b while carrying out hidden surface removal according to Z-buffering, based on the screen coordinates of the present polygon.

In step S520, the rendering unit 106 increments the value of the index register k by "+1". Then, in step S521, the end determining unit 174 determines whether the processing on all the packets 114 has been ended or not. If the processing on all the packets 114 has not been ended, then control goes back to step S503 to perform the normal texture expressing process, the texture mapping of the polygon shadow, and the hidden surface removal with respect to the polygon registered in a next packet 114.

If the processing on all the packets 114 registered in the rendering list 116 has been ended in step S521, then the sequence of operation of the rendering unit 106 comes to an end.

The processing in steps S503–S519 is repeated to offer the following advantages: With respect to the polygons of the object Ob1 that is positioned closest the light source 52, only the initial data Di is written on the reference shadow plane 150. If the initial data Di represents transparency, then no polygon shadow is rendered on the polygons of the object Ob1.

On the polygons of the object Ob2 that is the second object from the light source 52, there is rendered a polygon shadow of all the polygon shadows of the first object Ob1 from the light source, which is present in the range represented by the projected coordinates of the polygon of the object Ob1. When the processing on the second object Ob2 is finished, the polygon shadow of the first object Ob1 is rendered on the second object Ob2. At this time, the color of the polygon shadow projected onto the object Ob2 is expressed as gradually changing along the depth of the object Ob2 by the rendering (trilinear processing) in step S516.

Similarly, on an object Ob3 that is the third object from the light source 52, there is rendered a combination of the polygon shadow of the first object Ob1 and the polygon shadow of the second object Ob2. The color of the polygon shadow is also expressed as gradually changing along the depth of the object Ob3.

In the drop shadowing process according to the third embodiment, as described above, when a polygon shadow rendered on the generating shadow plane 152 is expressed on an object, the polygon shadow before it is subject to low-pass filtering and the polygon shadow after it is subject to low-pass filtering are interpolated according to rendering depending on the light source coordinates of the object to be processed, for thereby controlling the blur of the polygon shadow. Therefore, the polygon shadow can easily be expressed in a more realistic manner.

A drop shadowing process according to a fourth embodiment of the present invention will be described below with reference to FIG. 30.

Figure 30:
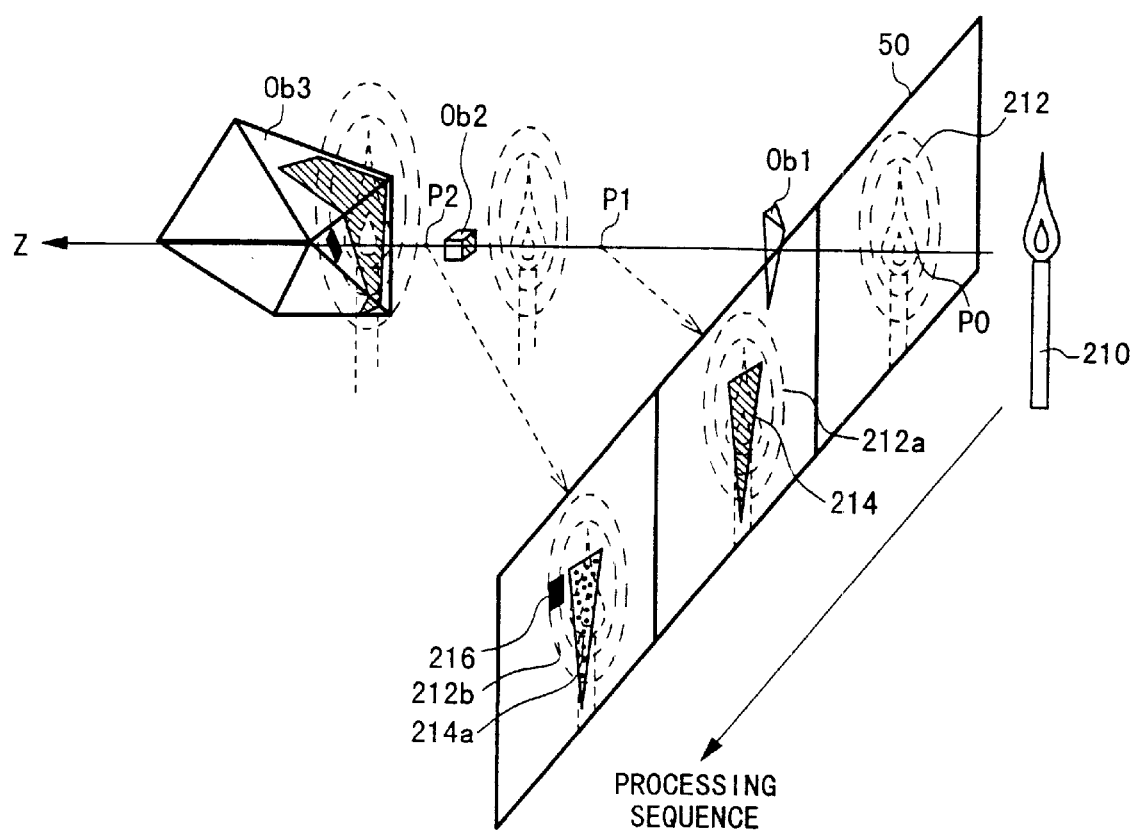
FIG. 30 is a diagram illustrative of an expression of a projected shadow of an extended light source such as a flame and a shadow cast by the extended light source on an object, in a drop shadowing process according to a fourth embodiment of the present invention.

In the drop shadowing process according to the fourth embodiment, as shown in FIG. 30, an extended light source 210 such as a flame is expressed on objects Ob1, Ob2, Ob3. Such an expression is realized by projecting, in advance, the extended light source 210 onto the virtual plane 50.

Specifically, a projected image 212 of the extended light source 210 may be preset as the initial data Di which is used by the rendering unit 106 according to the first and second embodiments shown in FIG. 9 or the rendering if unit 106 according to the third embodiment shown in FIG. 25.

In the rendering unit 106 in the drop shadowing process according to the third embodiment, for example, the shadow plane initializing unit 160 renders the initial data Di on the reference shadow plane 150, the generating shadow plane 152, and the background shadow plane 192 in step S501 shown in FIG. 27, and then paints the polygon shadow on the object with black, thus modulating the extended light source 210 as light, in steps S503–S519. The polygon shadow and the extended light source 210 are subject to low-pass filtering depending on the distance from the extended light source 210 in step S515.

In an initial stage P0, only the projected image 212 of the extended light source 210 is rendered on the generating shadow plane 152. When the processing of the object Ob1 is finished at a stage P1, a projected image 212a of the extended light source 210 which has been subjected to low-pass filtering and an umbra 214 of the object Ob1 are rendered on the generating shadow plane 152. When the processing of the object Ob2 is finished at a stage P2, a projected image 212b of the extended light source 210 which has been subjected to low-pass filtering twice, a shadow 214a of the object Ob1 which has been subjected to low-pass filtering once, and an umbra 216 of the object Ob2 are rendered on the generating shadow plane 152.

Modulating the extended light source 210 as light signifies multiplying the polygon color after light source calculations based on the tilt of an ordinary normal line and texture mapping, by the extended color rendered on the reference shadow plane 150.

In the drop shadowing process according to the fourth embodiment, since the projected image 212 of the extended light source 210, such as a flame, is preset as the initial data Di for the shadow planes 150, 152, 192, and the extended light source 210 is reflected and shadows are cast on an object, the projected image of the extended light source 210 and shadows produced by the extended light source 210 can easily be expressed.

In the above embodiments, the hidden surface removal is carried out by Z-buffering. However, the hidden surface removal may be carried out by Z-sorting based on a screen coordinate system.

The image processing method, the image processing apparatus, the recording medium, and the program according to the present invention offer the following advantages:

(1) It is possible to express easily shadows with respect to a plurality of objects arranged in a complex layout or a shadow with respect to an object having a complex shape.

(2) The expression of a shadow with respect to an object can selectively be performed.

(3) Various effects, such as blurring, etc., can easily be applied to a shadow expressed with respect to an object.

(4) Of various effects on shadows, blurring can easily be controlled for easily expressing a more realistic shadow.

(5) A projected image of an extended light source such as a flame and a shadow produced by the extended light source can easily be expressed.

Although certain preferred embodiments of the present invention have been shown and described in detail, it should be understood that various changes and modifications may be made therein without departing from the scope of the appended claims.

What is claimed is:

1. A method of processing an image, comprising:
   orienting at least one virtual plane among a plurality of objects representing three-dimensional objects;
   projecting a shadow of a first one of the objects onto the virtual plane based on a viewpoint representing a light source; and
   mapping the projected shadow onto at least one other of the objects that is farther from the viewpoint representing the light source than the first object.

2. A method according to claim 1, further comprising defining an attribute indicating whether to permit the shadow of the first object to be mapped onto the at least one other object, and selectively mapping the shadow of the first object onto the at least one other object based on the attribute.

3. A method according to claim 1, further comprising:
   establishing a shadow plan to serve as a texture plane in correspondence with the virtual plane;
   rendering the shadow of the first object on the shadow plane; and
   mapping the shadow rendered on the shadow plane onto the at least one other object by way of texture mapping.

4. A method according to claim 3, wherein the step of mapping the shadow rendered on the shadow plane onto the at least one other object is performed by way of texture mapping onto the virtual plane based on projected coordinates of the at least one other object.

5. A method according to claim 3, wherein the step of mapping the shadow rendered on the shadow plane onto the at least one other object is performed by way of texture mapping with respect to each of a plurality of polygons defining the at least one other object.

6. A method according to claim 3, further comprising:
   determining coordinates of the objects with respect to the viewpoint representing the light source;
   determining projected coordinates of the objects onto the virtual plane successively in accordance with a direction away from the viewpoint representing the light source; and
   rendering the shadow formed by the first object on the shadow plane based on the projected coordinates each time texture mapping onto the at least one other object is finished.

7. A method according to claim 6, further comprising:
   determining the coordinates of the objects and the projected coordinates of the objects onto the virtual plane with respect to each of a plurality of polygons defining the objects;
   registering the determined coordinates in a rendering list successively in accordance with the direction away from the viewpoint representing the light source; and
   successively reading the registered coordinates from the rendering list for rendering the shadow of the first object on the shadow plane.

8. A method according to claim 6, further comprising low-pass filtering the shadow of the first object rendered on the shadow plane depending on at least a distance of the first object from the light source to apply a blur to the shadow rendered on the shadow plane.

9. A method according to claim 8, further comprising interpolating the shadow of the first object rendered on the shadow plane when it is mapped on the at least one other object to control the blur thereof, the step of interpolating being performed based on: (i) the shadow of the first object before it is subject to the low-pass filtering step; (ii) the shadow of the first object after it is subject to the low-pass filtering step and (iii) the coordinates of the objects with respect to the viewpoint representing the light source.

10. A method according to claim 6, wherein the step of establishing a shadow plane includes the steps of establishing a reference shadow plane and a generating shadow plane, and the step of rendering the shadow the first object onto the shadow planes includes the step of rendering the shadow of the first object onto the generating shadow plane, the method further comprising:
   copying the shadow of the first object rendered on the generating shadow plane onto the reference shadow plane when a shadow of a second object is to be processed;
   mapping the shadow of the first object on the reference shadow plane by way of texture mapping onto each of a plurality of polygons defining the at least one other object; and
   rendering the shadow of the second object on the generating shadow plane based on the projected coordinates of the objects on the virtual plane.

11. A method according to claim 10, further comprising low-pass filtering the shadow of the second object rendered on the generating shadow plane after the shadow of the first object is copied onto the reference shadow plane.

12. A method according to claim 11, further comprising:
   orienting a background virtual plane behind the at least one other object with respect to the viewpoint representing the light source;
   establishing a background shadow plane to serve as a texture plane corresponding to the background virtual plane;
   projecting a shadow of a given object onto the virtual plane and projecting the shadow of the virtual plane onto the background virtual plane;
   rendering the shadow of the background virtual plane onto the background shadow plane;
   mapping the shadow of the given object on the at least one other object by way of texture mapping; and
   interpolating the shadow of the given object based on the shadow of the given object rendered on the reference shadow plane, the shadow of the given object rendered on [said] the background shadow plane, and the coordinates of the objects with respect to the viewpoint representing the light source.

13. A method according to claim 3, further comprising:
   establishing an extended light source;
   projecting reflections of the extended light source onto the virtual plane;
   rendering the reflections of the extended light source onto the shadow plane; and
   mapping the reflections of the extended light source to form a shadow on the at least one other object.

14. An apparatus for processing an image, comprising:
   a setting unit operable to establish at least one virtual plane among a plurality of objects representing three-dimensional objects; and
   a rendering unit operable to project a shadow of a first one of the objects onto the virtual plane based on a viewpoint representing a light source, and to map the projected shadow onto at least one other of the objects that is farther from the viewpoint representing the light source than the first object.

15. An apparatus according to claim 14, wherein the setting unit is further operable to define an attribute indicating whether to permit the shadow of the first object to be mapped onto the at least one other object the, and the rendering unit is further operable to selectively map the shadow of the first object onto the at least one other object based on the attribute.

16. An apparatus according to claim 14, wherein the rendering unit is further operable to establish a shadow plane to serve as a texture plane in correspondence with the virtual plane, to render the shadow of the first object on the shadow plane, and to map the shadow rendered on the shadow plane onto the at least one other object by way of texture mapping.

17. An apparatus according to claim 16, wherein the rendering unit comprises a mapping unit operable to map the shadow rendered on the shadow plane onto the at least one other object by way of texture mapping onto the virtual plane based on projected coordinates of the at least one other object.

18. An apparatus according to claim 16, wherein the rendering unit comprises a mapping unit operable to map the shadow rendered on the shadow plane onto the at least one other object by way of texture mapping with respect to each of a plurality of polygons defining the at least one other object.

19. An apparatus according to claim 16, wherein:
the rendering unit comprises a coordinate calculating unit operable to determine coordinates of the objects with respect to the viewpoint representing the light source, and to determine projected coordinates of the objects onto the virtual plane successively in accordance with a direction away from the viewpoint representing the light source; and
the rendering unit is further operable to render the shadow formed by the first object on the shadow plane based on the projected coordinates each time texture mapping onto the at least one other object is finished.

20. An apparatus according to claim 19, wherein:
the rendering unit comprises a rendering list generating unit operable to determine the coordinates of the objects and the projected coordinates of the objects onto the virtual plane with respect to each of a plurality of polygons defining the objects, and to register the determined coordinates in a rendering list successively in accordance with the direction away from the viewpoint representing the light source; and
the rendering unit is further operable to successively read the registered coordinates from the rendering list for rendering the shadow of the first object on the shadow plane.

21. An apparatus according to claim 19, wherein the rendering unit is further operable to low-pass filter the shadow of the first object rendered on the shadow plane depending on at least a distance of the first object from the light source to apply a blur to the shadow rendered on the shadow plane.

22. An apparatus according to claim 21, wherein the rendering unit is further operable to interpolate the shadow of the first object rendered on the shadow plane when it is mapped on the at least one other object to control the blur thereof, the step of interpolating being performed based on: (i) the shadow of the first object before it is subject to low-pass filtering; (ii) the shadow after it is subject to low-pass filtering; and (iii) the coordinates of the objects with respect to the viewpoint representing the light source.

23. An apparatus according to claim 19, wherein:
the shadow plane includes a reference shadow plane and a generating shadow plane, the shadow of the first object being rendered on the generating shadow plane; and
the rendering unit is further operable to (i) copy the shadow of the first object rendered on the generating shadow plane onto the reference shadow plane when a shadow of a second object is to be processed, (ii) map the shadow of the first object on the reference shadow plane by way of texture mapping onto each of a plurality of polygons defining the at least one other object, and (iii) render the shadow of the second object on the generating shadow plane based on the projected coordinates of the objects on the virtual plane.

24. An apparatus according to claim 23, wherein the rendering unit is further operable to low-pass filter the shadow of the second object rendered on the generating shadow plane after the shadow of the first object is copied onto the reference shadow plane.

25. An apparatus according to claim 24, wherein:
shadow plane includes a background shadow plane to serve as a texture plane corresponding to a background virtual plane oriented behind the at least one other object with respect to the viewpoint representing the light source; and
the rendering unit is further operable to (i) project a shadow of a given object onto the virtual plane, (ii) project the shadow of the virtual plane onto the background virtual plane, (iii) render the shadow of the background virtual plane onto the background shadow plane, (iv) map the shadow of the given object on the at least one other object by way of texture mapping, and (v) interpolate the shadow of the given object based on the shadow of the given object rendered on the reference shadow plane, the shadow of the given object rendered on the background shadow plane, and the coordinates of the objects with respect to the viewpoint representing the light source.

26. An apparatus according to claim 16, wherein the rendering unit is further operable to establish an extended light source, to project reflections of the extended light source onto the virtual plane, to render the reflections of the extended light source onto the shadow plane, and to map the reflections of the extended light source to form a shadow on the at least one other of the objects.

27. A recording medium operable to store a program capable of causing a system to carry out acts comprising:
(a) orienting at least one virtual plane among a plurality of objects representing three-dimensional objects;
(b) projecting a shadow of a first one of the objects onto the virtual plane based on a viewpoint representing a light source; and
(c) mapping the projected shadow onto at least one other of the objects that is farther from the viewpoint representing the light source than the first object.

28. A recording medium according to claim 27, wherein step (a) comprises defining an attribute indicating whether to permit the shadow of the first object to be mapped onto the at least one other object, and step (b) comprises selectively mapping the shadow of the first object onto the at least one other of the objects based on the attribute.

29. A recording medium according to claim 27, wherein step (b) comprises:
establishing a shadow, plane to serve as a texture plane in correspondence with the virtual plane;
rendering the shadow of first object on the shadow plane; and
mapping the shadow rendered on the shadow plane onto the at least one other object by way of texture mapping.

30. A recording medium according to claim 29, wherein step (c) further comprises mapping the shadow rendered on the shadow plane onto the at least one other object by way of texture mapping onto the virtual plane based on projected coordinates of the at least one other object.

31. A recording medium according to claim 29, wherein step (c) further comprises mapping the shadow rendered on the shadow plane onto the at least one other object by way of texture mapping with respect to each of a plurality of polygons defining the at least one other object.

32. A recording medium according to claim 29, wherein step (b) further comprises determining coordinates of the objects with respect to the viewpoint representing the light source, and determining projected coordinates of the objects onto the virtual plane successively in accordance with a direction away from the viewpoint representing the light source; and step (c) further comprises rendering the shadow formed by the first object on the shadow plane based on the projected coordinates each time texture mapping onto the at least one other object is finished.

33. A recording medium according to claim 32, wherein:

step (b) further comprises determining the coordinates of the objects and the projected coordinates of the objects onto the virtual plane with respect to each of a plurality of polygons defining the objects, and registering the determined coordinates in a rendering list successively in accordance with the direction away from the viewpoint representing the light source; and step (c) further comprises successively reading the registered coordinates from the rendering list for rendering the shadow of the first object on the shadow plane.

34. A recording medium according to claim 32, wherein step (c) further comprises low-pass filtering the shadow of the first object rendered on the shadow plane depending on at least a distance of the first object from the light source to apply a blur to the shadow rendered on the shadow plane.

35. A recording medium according to claim 34, wherein step (c) further comprises interpolating the shadow of the first object rendered on the shadow plane when it is mapped on the at least one other object to control the blur thereof, the step of interpolating being performed based on: the shadow of the first object before it is subject to the low-pass filtering step; (ii) the shadow of the first object after it is subject to the low-pass filtering step: and (iii) the coordinates of the objects with respect to the viewpoint representing the light source.

36. A recording medium according to claim 29, wherein the shadow plane includes a reference shadow plane and a generating shadow plane, the shadow of the first object being rendered on the generating shadow plane, and step (c) further comprises: copying the shadow of the first object rendered on the generating shadow plane onto the reference shadow plane when a shadow of a second object is to be processed;

mapping the shadow of the first object on the reference shadow plane by way of texture mapping onto each of a plurality of polygons defining the at least one other of the objects; and rendering the shadow of the second object on the generating shadow plane based on the projected coordinates of the objects on the virtual plane.

37. A recording medium according to claim 36, wherein step (c) further comprises low-pass filtering the shadow of the second object rendered on the generating shadow plane after the shadow of the first object is copied onto the reference shadow plane.

38. A recording medium according to claim 37, wherein step (c) further comprises:

orienting a background virtual plane behind the at least one other object with respect to the viewpoint representing the light source;

establishing a background shadow plane to serve as a texture plane corresponding to the background virtual plane;

projecting a shadow of a given object onto the virtual plane and projecting the shadow of the virtual plane onto the background virtual plane rendering the shadow of the background virtual plane onto the background shadow plane;

mapping the shadow of the given object on the at least one other object by way of texture mapping; and interpolating the shadow of the given object based on the shadow of the given object rendered on the reference shadow plane, the shadow of the given object rendered on the background shadow plane, and the; coordinates of the objects with respect to the viewpoint representing the light source.

39. A recording medium according to claim 29, wherein step (c) further comprises:

establishing an extended light source;

projecting reflections of the extended light source onto the virtual plane;

rendering the reflections of the extended light source onto the shadow plane; and mapping the reflections of the extended light source to form a shadow on the at least one other object.

40. An apparatus for processing an image, comprising:

means for establishing at least one virtual plane among a plurality of objects representing three-dimensional objects;

means for projecting a shadow of a first one of the objects onto the virtual plane based on a viewpoint representing a light source; and means for mapping the projected shadow onto at least one other of the objects that is farther from the viewpoint representing the light source than the first object.

\* \* \* \* \*

UNITED STATES PATENT AND TRADEMARK OFFICE
CERTIFICATE OF CORRECTION

PATENT NO. : 6,677,946 B1
DATED : January 13, 2004
INVENTOR(S) : Akio Ohba

It is certified that error appears in the above-identified patent and that said Letters Patent is hereby corrected as shown below:

<u>Title page, Item [54] and Column 1, lines 1-3,</u>
Title, should read -- METHOD OF, AN APPARATUS FOR, AND A RECORDING MEDIUM COMPRISING A PROGRAM FOR, PROCESSING AN IMAGE TO SHOW SHADOWING EFFECTS --.
Item [57], ABSTRACT,
Line 3, "an image, includes" should read -- an image includes --.

<u>Column 2,</u>
Line 27, "objects to" should read -- objects --.
Line 54, "each of polygons" should read -- each of the polygons --.

<u>Column 3,</u>
Lines 1 and 29, "each of polygons" should read -- each of the polygons --.
Line 60, "modeling, and sec-" should read -- modeling, and a sec- --.
Line 61, "express and a shadow" should read -- express a shadow --.

<u>Column 4,</u>
Lines 1-2, "and wherein the second means may comprising expressing selectively" should read -- and the second unit may selectively --.
Line 12, "comprise mapping mapping the" should read -- comprise a mapping unit operable to map the --.
Lines 15, 29 and 54, "each of polygons" should read -- each of the polygons --.
Line 18, "means for determining" should read -- unit operable to determine --.
Line 57, "operable to each" should read -- operable to, each --.
Line 59, "plane effect" should read -- plane, effect --.

<u>Column 5,</u>
Line 12, "and forming a" should read -- and form a --.
Lines 25 and 31, "may comprises" should read -- may comprise --.
Lines 40 and 54, "each of polygons" should read -- each of the polygons --.

<u>Column 6,</u>
Line 13, "each of polygons" should read -- each of the polygons --.

<u>Column 7,</u>
Line 33, "are flowchart" should read -- are flowcharts --.
Line 62, "processing unit" should read -- processing units --.

<u>Column 8,</u>
Line 1, "flowchart of a sequence" should read -- flowcharts of sequences --.
Line 42, "1(E memory" should read -- memory --.

UNITED STATES PATENT AND TRADEMARK OFFICE
CERTIFICATE OF CORRECTION

PATENT NO.    : 6,677,946 B1
DATED         : January 13, 2004
INVENTOR(S)   : Akio Ohba It is certified that error appears in the above-identified patent and that said Letters Patent is hereby corrected as shown below:

Column 8 (cont'd),
Line 52, "according NTSC" should read -- according to NTSC --.

Column 9,
Line 12, "process," should read -- process --.
Lines 13-14, "unit, the program 100 (see FIG. 3), is downloaded" should read -- unit 100 (see FIG. 3). The program is downloaded --.

Column 10,
Line 4, "means 108" should read -- unit 108 --.
Line 23, "generating means" should read -- generating unit --.
Line 24, "initializing means" should read -- initializing unit --.
Line 26, "means 132" should read -- unit 132 --.
Line 27, "means 134" should read -- unit 134 --.
Line 29, "means 136" should read -- unit 136 --.
Line 30, "means 138" should read -- unit 138 --.
Line 34, "means 140" should read -- unit 140 --.
Line 37, "means 142" should read -- unit 142 --.
Line 39, "means 144" should read -- unit 144 --.
Lines 42, 47 and 52, "means 106" should read -- unit 106 --.
Lines 48 and 50, "means 154" should read -- unit 154 --.
Line 51, "means 158" should read -- unit 158 --.
Line 53, "means 160" should read -- unit 160 --.
Line 57, "means 162" should read -- unit 162 --.
Line 58, "reading means" should read -- reading unit --.
Line 60, "means 166" should read -- unit 166 --.
Line 62, "rendering means" should read -- rendering unit --.
Line 65, "means 170" should read -- unit 170 --.

Column 11,
Line 3, "means 172" should read -- unit 172 --.
Line 7, "means 174" should read -- unit 174 --.
Lines 12 and 14, "means 100" should read -- unit 100 --.

Column 12,
Lines 4, 35, 38 and 41, "means 102" should read -- unit 102 --.
Lines 9 and 35, "means 104" should read -- unit 104 --.
Lines 19 and 36, "means 106" should read -- unit 106 --.
Line 25, "means 108" should read -- unit 108 --.
Line 40, "generating means" should read -- generating unit --.
Line 55, "registering means" should read -- registering unit --.
Line 59, "means 124" should read -- unit 24 --.

UNITED STATES PATENT AND TRADEMARK OFFICE
CERTIFICATE OF CORRECTION

PATENT NO. : 6,677,946 B1
DATED : January 13, 2004
INVENTOR(S) : Akio Ohba

It is certified that error appears in the above-identified patent and that said Letters Patent is hereby corrected as shown below:

Column 13,
Line 38, "means 134" should read -- unit 134 --.
Line 59, "Z2 and" should read -- Z2, and --.

Column 14,
Line 3, "means 140" should read -- unit 140 --.
Line 18, "has been ended" should read -- has ended --.
Lines 19 and 34, "or not, by" should read -- by --.
Line 43, "z-sorting" should read -- z-sorting pointers. --.
Line 47, "An sequence" should read -- A sequence --.
Line 61, "(kth) indicated" should read -- (kth) point indicated --.

Column 15,
Line 5, "means 168" should read -- unit 168 --.
Line 36, "if the a" should read -- if the --.
Line 61, "means 106" should read -- unit 106 --.
Line 64, "mostly closely" should read -- closest --.

Column 16,
Line 18, "viewpoint is" should read -- viewpoint (or with respect to the light source) is --.

Column 17,
Line 2, "means 190" should read -- unit 190 --.

Column 18,
Line 13, "means 126" should read -- unit 126 --.
Line 35, "rendering 168" should read -- rendering unit 168 --.
Line 39, "means 168" should read -- unit 168 --.

Column 21,
Line 60, "rendering if unit" should read -- rendering unit --.

Column 22,
Lines 58-59, "orienting at least one virtual plane among a plurality of objects representing three-dimensional objects;" should read -- orienting a plurality of three-dimensional image objects in a three-dimensional space such that at least some of the objects are spaced apart from one another; --.
Line 60, insert -- orienting at least one virtual plane among, but not touching, the objects; --.

UNITED STATES PATENT AND TRADEMARK OFFICE
CERTIFICATE OF CORRECTION

PATENT NO. : 6,677,946 B1
DATED : January 13, 2004
INVENTOR(S) : Akio Ohba

It is certified that error appears in the above-identified patent and that said Letters Patent is hereby corrected as shown below:

Column 23,
Line 6, "shadow plan" should read -- shadow plane --.

Column 24,
Line 29, "on [said] the" should read -- on the --.
Line 40, insert a new paragraph -- a geometry unit operable to orient a plurality of three-dimensional image objects in a three-dimensional space such that at least some of the objects are spaced apart from one another; --.
Lines 41-43, "among a plurality of objects representing three-dimensional objects; and" should read -- among, but not touching, the objects; and --.
Line 53, "object the, and" should read -- object, and --.

Column 26,
Line 31, after the end of the line, insert a new paragraph -- (a) orienting a plurality of three-dimensional image objects in a three-dimensional space such that at least some of the objects are spaced apart from one another; --.
Lines 32-33, "(a) orienting at least one virtual plane among a plurality of objects representing three-dimentional objects;" should read -- (b) orienting at least one virtual plane among, but not touching, the objects; --.
Line 34, "(b) projecting" should read -- (c) projecting --.
Line 37, "(c) mapping" should read -- (d) mapping --.
Line 48, "shadow, plane" should read -- shadow plane --.

Column 27,
Line 29, "on: the" should read -- on: (i) the --.

Column 28,
Line 24, "and the; coordinates" should read -- and the coordinates --.
Line 36, following the end of the line, insert a new paragraph -- means for orienting a plurality of three-dimensional objects in a three-dimensional space such that at least some of the objects are spaced apart from one another; --.

UNITED STATES PATENT AND TRADEMARK OFFICE
CERTIFICATE OF CORRECTION

PATENT NO.    : 6,677,946 B1
DATED         : January 13, 2004
INVENTOR(S)   : Akio Ohba It is certified that error appears in the above-identified patent and that said Letters Patent is hereby corrected as shown below:

<u>Column 28 (cont'd),</u>
Lines 37-39, "means for establishing at least one virtual plane among a plurality of objects representing three-dimensional objects;" should read -- means for establishing at least one virtual plane among, but not touching, the objects; --.

Signed and Sealed this

Thirteenth Day of June, 2006

JON W. DUDAS
*Director of the United States Patent and Trademark Office*

UNITED STATES PATENT AND TRADEMARK OFFICE
CERTIFICATE OF CORRECTION

PATENT NO. : 6,677,946 B1
APPLICATION NO. : 09/516950
DATED : January 13, 2004
INVENTOR(S) : Akio Ohba It is certified that error appears in the above-identified patent and that said Letters Patent is hereby corrected as shown below:

Title page, Item [54] and Column 1, lines 1-3,
Title, should read -- METHOD OF, AN APPARATUS FOR, AND A RECORDING MEDIUM COMPRISING A PROGRAM FOR, PROCESSING AN IMAGE TO SHOW SHADOWING EFFECTS --.
Item [57], ABSTRACT,
Line 3, "an image, includes" should read -- an image includes --.

Column 2,
Line 27, "objects to" should read -- objects --.
Line 54, "each of polygons" should read -- each of the polygons --.

Column 3,
Lines 1 and 29, "each of polygons" should read -- each of the polygons --.
Line 60, "modeling, and sec-" should read -- modeling, and a sec- --.
Line 61, "express and a shadow" should read -- express a shadow --.

Column 4,
Lines 1-2, "and wherein the second means may comprising expressing selectively" should read -- and the second unit may selectively --.
Line 12, "comprise mapping mapping the" should read -- comprise a mapping unit operable to map the --.
Lines 15, 29 and 54, "each of polygons" should read -- each of the polygons --.
Line 18, "means for determining" should read -- unit operable to determine --.
Line 57, "operable to each" should read -- operable to, each --.
Line 59, "plane effect" should read -- plane, effect --.

Column 5,
Line 12, "and forming a" should read -- and form a --.
Lines 25 and 31, "may comprises" should read -- may comprise --.
Lines 40 and 54, "each of polygons" should read -- each of the polygons --.

Column 6,
Line 13, "each of polygons" should read -- each of the polygons --.

Column 7,
Line 33, "are flowchart" should read -- are flowcharts --.
Line 62, "processing unit" should read -- processing units --.

Column 8,
Line 1, "flowchart of a sequence" should read -- flowcharts of sequences --.
Line 42, "1(E memory" should read -- memory --.

UNITED STATES PATENT AND TRADEMARK OFFICE
CERTIFICATE OF CORRECTION

PATENT NO. : 6,677,946 B1
APPLICATION NO. : 09/516950
DATED : January 13, 2004
INVENTOR(S) : Akio Ohba It is certified that error appears in the above-identified patent and that said Letters Patent is hereby corrected as shown below:

Column 8 (cont'd),
Line 52, "according NTSC" should read -- according to NTSC --.

Column 9,
Line 12, "process," should read -- process --.
Lines 13-14, "unit, the program 100 (see FIG. 3), is downloaded" should read -- unit 100 (see FIG. 3). The program is downloaded --.

Column 10,
Line 4, "means 108" should read -- unit 108 --.
Line 23, "generating means" should read -- generating unit --.
Line 24, "initializing means" should read -- initializing unit --.
Line 26, "means 132" should read -- unit 132 --.
Line 27, "means 134" should read -- unit 134 --.
Line 29, "means 136" should read -- unit 136 --.
Line 30, "means 138" should read -- unit 138 --.
Line 34, "means 140" should read -- unit 140 --.
Line 37, "means 142" should read -- unit 142 --.
Line 39, "means 144" should read -- unit 144 --.
Lines 42, 47 and 52, "means 106" should read -- unit 106 --.
Lines 48 and 50, "means 154" should read -- unit 154 --.
Line 51, "means 158" should read -- unit 158 --.
Line 53, "means 160" should read -- unit 160 --.
Line 57, "means 162" should read -- unit 162 --.
Line 58, "reading means" should read -- reading unit --.
Line 60, "means 166" should read -- unit 166 --.
Line 62, "rendering means" should read -- rendering unit --.
Line 65, "means 170" should read -- unit 170 --.

Column 11,
Line 3, "means 172" should read -- unit 172 --.
Line 7, "means 174" should read -- unit 174 --.
Lines 12 and 14, "means 100" should read -- unit 100 --.

Column 12,
Lines 4, 35, 38 and 41, "means 102" should read -- unit 102 --.
Lines 9 and 35, "means 104" should read -- unit 104 --.
Lines 19 and 36, "means 106" should read -- unit 106 --.
Line 25, "means 108" should read -- unit 108 --.
Line 40, "generating means" should read -- generating unit --.
Line 55, "registering means" should read -- registering unit --.
Line 59, "means 124" should read -- unit 124 --.

UNITED STATES PATENT AND TRADEMARK OFFICE
CERTIFICATE OF CORRECTION

PATENT NO. : 6,677,946 B1
APPLICATION NO. : 09/516950
DATED : January 13, 2004
INVENTOR(S) : Akio Ohba It is certified that error appears in the above-identified patent and that said Letters Patent is hereby corrected as shown below:

Column 13,
Line 38, "means 134" should read -- unit 134 --.
Line 59, "Z2 and" should read -- Z2, and --.

Column 14,
Line 3, "means 140" should read -- unit 140 --.
Line 18, "has been ended" should read -- has ended --.
Lines 19 and 34, "or not, by" should read -- by --.
Line 43, "z-sorting" should read -- z-sorting pointers. --.
Line 47, "An sequence" should read -- A sequence --.
Line 61, "(kth) indicated" should read -- (kth) point indicated --.

Column 15,
Line 5, "means 168" should read -- unit 168 --.
Line 36, "if the a" should read -- if the --.
Line 61, "means 106" should read -- unit 106 --.
Line 64, "mostly closely" should read -- closest --.

Column 16,
Line 18, "viewpoint is" should read -- viewpoint (or with respect to the light source) is --.

Column 17,
Line 2, "means 190" should read -- unit 190 --.

Column 18,
Line 13, "means 126" should read -- unit 126 --.
Line 35, "rendering 168" should read -- rendering unit 168 --.
Line 39, "means 168" should read -- unit 168 --.

Column 21,
Line 60, "rendering if unit" should read -- rendering unit --.

Column 22,
Lines 58-59, "orienting at least one virtual plane among a plurality of objects representing three-dimensional objects;" should read -- orienting a plurality of three-dimensional image objects in a three-dimensional space such that at least some of the objects are spaced apart from one another; --.
Line 60, insert -- orienting at least one virtual plane among, but not touching, the objects; --.

UNITED STATES PATENT AND TRADEMARK OFFICE
CERTIFICATE OF CORRECTION

PATENT NO. : 6,677,946 B1
APPLICATION NO. : 09/516950
DATED : January 13, 2004
INVENTOR(S) : Akio Ohba It is certified that error appears in the above-identified patent and that said Letters Patent is hereby corrected as shown below:

Column 23,
Line 6, "shadow plan" should read -- shadow plane --.

Column 24,
Line 29, "on [said] the" should read -- on the --.
Line 40, insert a new paragraph -- a geometry unit operable to orient a plurality of three-dimensional image objects in a three-dimensional space such that at least some of the objects are spaced apart from one another; --.
Lines 41-43, "among a plurality of objects representing three-dimensional objects; and" should read -- among, but not touching, the objects; and --.
Line 53, "object the, and" should read -- object, and --.

Column 26,
Line 31, after the end of the line, insert a new paragraph -- (a) orienting a plurality of three-dimensional image objects in a three-dimensional space such that at least some of the objects are spaced apart from one another; --.
Lines 32-33, "(a) orienting at least one virtual plane among a plurality of objects representing three-dimentional objects;" should read -- (b) orienting at least one virtual plane among, but not touching, the objects; --.
Line 34, "(b) projecting" should read -- (c) projecting --.
Line 37, "(c) mapping" should read -- (d) mapping --.
Line 48, "shadow, plane" should read -- shadow plane --.

Column 27,
Line 29, "on: the" should read -- on: (i) the --.

Column 28,
Line 24, "and the; coordinates" should read -- and the coordinates --.
Line 36, following the end of the line, insert a new paragraph -- means for orienting a plurality of three-dimensional image objects in a three-dimensional space such that at least some of the objects are spaced apart from one another; --.

UNITED STATES PATENT AND TRADEMARK OFFICE
CERTIFICATE OF CORRECTION

PATENT NO.        : 6,677,946 B1
APPLICATION NO. : 09/516950
DATED             : January 13, 2004
INVENTOR(S)       : Akio Ohba It is certified that error appears in the above-identified patent and that said Letters Patent is hereby corrected as shown below:

<u>Column 28 (cont'd),</u>
Lines 37-39, "means for establishing at least one virtual plane among a plurality of objects representing three-dimensional objects;" should read -- means for establishing at least one virtual plane among, but not touching, the objects; --.

This certificate supersedes Certificate of Correction issued June 13, 2006.

Signed and Sealed this

Sixth Day of February, 2007

JON W. DUDAS
*Director of the United States Patent and Trademark Office*

UNITED STATES PATENT AND TRADEMARK OFFICE
CERTIFICATE OF CORRECTION

PATENT NO.       : 6,677,946 B1
APPLICATION NO.  : 09/516950
DATED            : January 13, 2004
INVENTOR(S)      : Akio Ohba It is certified that error appears in the above-identified patent and that said Letters Patent is hereby corrected as shown below:

Delete the title page and substitute therefore the attached title page.

Delete Columns 1-28 and substitute therefore the attached reprinted specification and claims Columns 1-28.

Signed and Sealed this

Seventeenth Day of May, 2011

David J. Kappos
*Director of the United States Patent and Trademark Office*

United States Patent
Ohba

(10) Patent No.: US 6,677,946 B1
(45) Date of Patent: Jan. 13, 2004

(54) METHOD OF, AN APPARATUS FOR, AND A RECORDING MEDIUM COMPRISING A PROGRAM FOR, PROCESSING AN IMAGE TO SHOW SHADOWING EFFECTS

(75) Inventor: Akio Ohba, Tokyo (JP)

(73) Assignee: Sony Computer Entertainment, Inc. (JP)

( * ) Notice: Subject to any disclaimer, the term of this patent is extended or adjusted under 35 U.S.C. 154(b) by 0 days.

(21) Appl. No.: 09/516,950

(22) Filed: Mar. 1, 2000

(30) Foreign Application Priority Data

Mar. 8, 1999 (JP) .......................................... 11-060884

(51) Int. Cl.[7] ............................................. G06T 15/00
(52) U.S. Cl. ...................................................... 345/426
(58) Field of Search ......................... 345/426, 427, 428, 345/582, 586, 619, 629, 630

(56) References Cited

U.S. PATENT DOCUMENTS

| | | | |
|---|---|---|---|
| 5,537,638 A | 7/1996 | Morita et al. | 395/125 |
| 5,742,749 A | 4/1998 | Foran et al. | 395/126 |
| 5,870,098 A * | 2/1999 | Gardiner | 345/426 |

FOREIGN PATENT DOCUMENTS

| | | |
|---|---|---|
| EP | 0 358 493 A2 | 3/1990 |
| EP | 0 725 367 A1 | 8/1996 |
| EP | 0 948 978 A2 | 10/1999 |
| WO | WO97/50060 | 12/1997 |

OTHER PUBLICATIONS

Robert Rivlin (The Algorithmic Image : 1986: Microsoft Press).*

3D Studio Max: vol. 2: Rendering and Animation: ISBN: 120801–000000–5030.*

Weinhaus et al ("Texture Mapping 3D Models of real—World Scenes": 1997 ACM 0360–0300/97/1200–0325).*

Hsu, P.C. et al., "Superimposing Images With Shadow Casting", Proceedings of the First IEEE Conference on Visualization '90, San Francisco, California, Oct. 23–26, 1990, pp. 298–306.

* cited by examiner

*Primary Examiner*—Almis R. Jankus
(74) *Attorney, Agent, or Firm*—Lerner, David, Littenberg, Krumholz & Mentlik, LLP

(57) ABSTRACT

A method of processing an image, includes the steps of orienting at least one virtual plane among a plurality of objects representing three-dimensional objects; projecting a shadow of a first one of the objects onto the virtual plane based on a viewpoint representing a light source; and mapping the projected shadow onto at least one other of the objects that is farther from the viewpoint representing the light source than the first object.

40 Claims, 30 Drawing Sheets

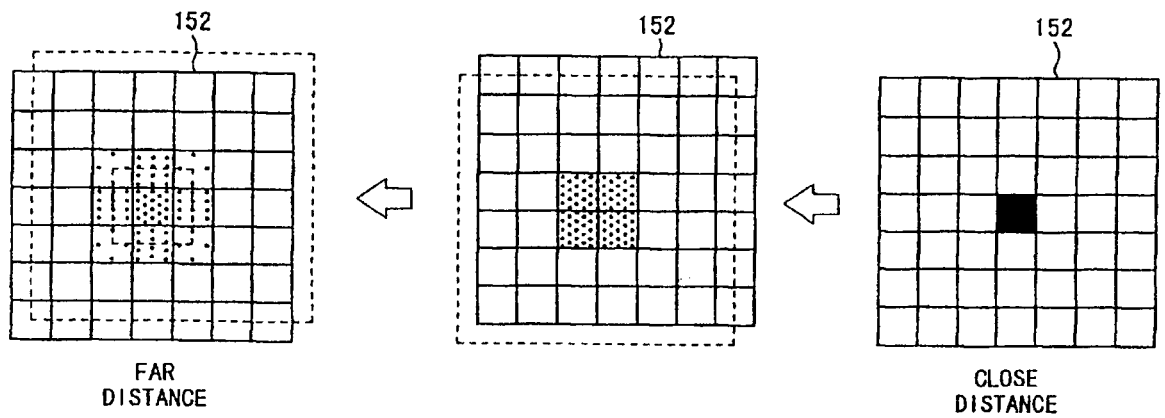

FAR DISTANCE          CLOSE DISTANCE

METHOD OF, AN APPARATUS FOR, AND A RECORDING MEDIUM COMPRISING A PROGRAM FOR, PROCESSING AN IMAGE TO SHOW SHADOWING EFFECTS

BACKGROUND OF THE INVENTION

1. Field of the Invention

The present invention relates to a method of and an apparatus for processing an image to express the shadow of an object which is created by the radiation of light from a light source, cast on another object disposed therebehind, based on the layout of a plurality of objects generated by three-dimensional modeling, a recording medium which stores a program for performing such image processing, and a program for performing such image processing.

2. Description of the Related Art

Recently, various computer graphics (CG) processing techniques including hidden line processing, hidden surface removal, smooth shading, texture mapping, etc. have been making rapid progress in combination with growing hardware advances.

According to one general CG processing procedure, a plurality of three-dimensional figures (objects) are generated according to three-dimensional modeling of CAD, and colors and shades are applied to the generated objects. Then, optical characteristics including mirroring, diffuse reflection, refraction, transparency, etc. are added to the objects, and surface patterns are applied to the objects. Furthermore, surrounding situations are rendered, e.g., windows and scenes are reflected and light rays are introduced.

Shading is governed by the directions of lines normal to polygons that make up an object and the viewpoint for light rays. There is a process of expressing the shadow of an object cast on another object positioned therebehind based on the layout of a light source and a plurality of objects. The latter process, rather than the shading, cannot be performed by techniques other than a highly costly rendering approach such as ray tracing.

If no high cost should be incurred such as for real-time rendering, then it has heretofore been customary to approximate such a shadow with perspective projection onto a simple plane or the rendering of a simple figure such as a circle.

In addition, if the light source has a certain size such as a flame, it is extremely difficult to express shadows produced by the light source.

SUMMARY OF THE INVENTION

It is therefore an object of the present invention to provide a method of and an apparatus for processing an image to express shadows with respect to a plurality of objects arranged in a complex layout or a shadow with respect to an object having a complex shape, a recording medium which stores a program capable of simply expressing such a shadow or shadows, and a program for expressing such a shadow or shadows.

Another object of the present invention is to provide a method of and an apparatus for processing an image so as to be able to selectively express a shadow with respect to an object, a recording medium which stores a program capable of selectively expressing a shadow with respect to an object, and a program for selectively expressing a shadow with respect to an object.

Still another object of the present invention is to provide a method of and an apparatus for processing an image so as to be able to easily apply various effects such as blurring in expressing a shadow with respect to an object, a recording medium which stores a program capable of easily applying various effects in expressing a shadow with respect to an object, and a program for easily applying various effects in expressing a shadow with respect to an object.

Yet another object of the present invention is to provide a method of and an apparatus for processing an image so as to be able to easily control shadow blurring among various effects on shadows for easily expressing a more realistic shadow, a recording medium which stores a program capable of easily expressing a more realistic shadow, and a program for easily expressing a more realistic shadow.

Yet still another object of the present invention is to provide a method of and an apparatus for processing an image so as to be able to easily express a projected image of an extended light source such as a flame and a shadow produced by such an extended light source, a recording medium which stores a program capable of easily expressing a projected image of an extended light source such as a flame and a shadow produced by such an extended light source, and a program for easily expressing a projected image of an extended light source such as a flame and a shadow produced by such an extended light source.

A method of processing an image according to the present invention comprises the steps of establishing at least one virtual plane from the layout of a plurality of objects generated by three-dimensional modeling, and expressing a shadow of the object projected onto the virtual plane by a light source as a viewpoint, on the object that is farther from the light source than the object.

With the above method, it is possible to express easily a shadow on a plurality of objects arranged in a complex layout or a shadow with respect to an object having a complex shape.

The method may further comprise the steps of defining a shadow expression attribute as to whether the shadow is to be expressed on the objects in light source processing attributes of the objects, and selectively expressing the shadow on the object based on the shadow expression attribute. In this manner, the shadow may selectively be expressed with respect to the object.

Specifically, the method may further comprise the steps of establishing a shadow plane which serves as a texture plane corresponding to the virtual plane, rendering the shadow of the object formed by projection onto the virtual plane on the shadow plane, and mapping the shadow rendered on the shadow plane onto the other object by way of texture mapping.

The step of mapping the shadow onto the other object by way of texture mapping may comprise the step of mapping the shadow onto the other object by way of texture mapping based on projected coordinates of the other object onto the virtual plane, or with respect to each of the polygons of the other object.

The method may further comprise the steps of determining coordinates of the objects with the light source as a viewpoint, determining projected coordinates of the objects onto the virtual plane successively in a direction away from the light source, and rendering the shadow formed by the object on the shadow plane based on the projected coordinates each time texture mapping onto one of the objects is finished.

The method may further comprise the steps of determining the coordinates of the objects and the projected coordinates of the objects onto the virtual plane with respect to each of the polygons of the objects, registering the determined coordinates in a rendering list successively in the direction away from the light source, and successively reading the registered coordinates from the rendering list for rendering the shadow on the shadow plane.

It is preferable to effect low-pass filtering on the shadow rendered on the shadow plane depending on at least the distance from the light source for thereby applying a blur to the shadow depending on at least the distance from the light source. In this manner, various effects, such as blurring, etc., can easily be applied to a shadow expressed with respect to an object.

The method may further comprise the steps of interpolating the shadow rendered on the generating shadow plane when it is expressed on the object, according to rendering depending on the shadow before it is subject to low-pass filtering, the shadow after it is subject to low-pass filtering, and the light source coordinates of the object to be processed, for thereby controlling the blur of the shadow. Thus, blurring can easily be controlled for easily expressing a more realistic shadow.

The method may further comprise the steps of preparing a reference shadow plane and a generating shadow plane as the shadow plane, and, each time the objects to be processed switch from one to another, copying the shadow rendered on the generating shadow plane onto the reference shadow plane, and, each time the shadow on the reference shadow plane is mapped by way of texture mapping with respect to each of polygons of one object, rendering a projected image of the polygon onto the virtual plane as a new combined shadow on the generating shadow plane.

Each time the shadow rendered on the generating shadow plane is copied onto the reference shadow plane, low-pass filtering may be effected on the shadow rendered on the generating shadow plane. In this manner, various effects, such as blurring, etc., can easily be applied to a shadow expressed with respect to an object.

The method may further comprise the steps of preparing, in addition to the reference shadow plane and the generating shadow plane as the shadow plane, a background shadow plane which is a texture plane corresponding to a background virtual plane disposed behind the object to be processed, with the light source as a viewpoint, rendering a shadow formed by projecting a shadow projected onto the virtual plane onto the background virtual plane, on the background shadow plane, and mapping a shadow expressed on the object to be processed by way of texture mapping, while interpolating the shadow according to rendering based on the shadow rendered on the reference shadow plane, the shadow rendered on the background shadow plane, and light source coordinates of the object. Thus, blurring can easily be controlled for easily expressing a more realistic shadow.

The method may further comprise the steps of establishing an extended light source as an initial value for the shadow plane, and reflecting the extended light source and forming a shadow thereof on the object.

An apparatus for processing an image according to the present invention comprises a first unit operable to establish at least one virtual plane from the layout of a plurality of objects generated by three-dimensional modeling, and a second unit operable to express a shadow of the object projected onto the virtual plane by a light source as a viewpoint, on the object that is farther from the light source than the object.

The first unit may define a shadow expression attribute as to whether the shadow is to be expressed on the objects in light source processing attributes of the objects, and the second unit may selectively express the shadow on the object based on the shadow expression attribute.

The second unit may have a rendering unit operable to establish a shadow plane which serves as a texture plane corresponding to the virtual plane, rendering the shadow of the object formed by projection onto the virtual plane on the shadow plane, and mapping the shadow rendered on the shadow plane onto the other object by way of texture mapping.

The rendering unit may comprise a mapping unit operable to map shadow onto the other object by way of texture mapping based on projected coordinates of the other object onto the virtual plane, or with respect to each of the polygons of the other object.

The second unit may comprise a coordinate calculating unit operable to determine coordinates of the objects with the light source as a viewpoint, and determine projected coordinates of the objects onto the virtual plane successively in a direction away from the light source, and the rendering unit may be further operable to render the shadow formed by the object on the shadow plane based on the projected coordinates each time texture mapping onto one of the objects is finished.

The second unit may comprise a rendering list generating unit operable to determine the coordinates of the objects and the projected coordinates of the objects onto the virtual plane with respect to each of the polygons of the objects, and registering the determined coordinates in a rendering list successively in the direction away from the light source, and the rendering unit may be further operable to successively read the registered coordinates from the rendering list for rendering the shadow on the shadow plane.

The rendering unit may be further operable to low-pass filter the shadow rendered on the shadow plane depending on at least the distance from the light source for thereby applying a blur to the shadow depending on at least the distance from the light source. The rendering unit may be further operable to interpolate the shadow rendered on the generating shadow plane when it is expressed on the object, according to rendering depending on the shadow before it is subject to low-pass filtering, the shadow after it is subject to low-pass filtering, and the light source coordinates of the object to be processed, for thereby controlling the blur of the shadow.

The rendering unit may be further operable to prepare a reference shadow plane and a generating shadow plane as the shadow plane, and, each time the objects to be processed switch from one to another, copying the shadow rendered on the generating shadow plane onto the reference shadow plane, and, each time the shadow on the reference shadow plane is mapped by way of texture mapping with respect to each of the polygons of one object, rendering a projected image of the polygon onto the virtual plane as a new combined shadow on the generating shadow plane.

The rendering unit may be further operable to, each time the shadow rendered on the generating shadow plane is copied onto the reference shadow plane, effect low-pass filtering on the shadow rendered on the generating shadow plane.

The rendering unit may be further operable to prepare in addition to the reference shadow plane and the generating shadow plane as the shadow plane, a background shadow plane which is a texture plane corresponding to a background virtual plane disposed behind the object to be processed, with the light source as a viewpoint, render a shadow formed by projecting a shadow projected onto the virtual plane onto the background virtual plane, on the background shadow plane, and map a shadow expressed on the object to be processed by way of texture mapping, while interpolating the shadow according to rendering based on the shadow rendered on the reference shadow plane, the shadow rendered on the background shadow plane, and light source coordinates of the object.

The rendering unit may be further operable to establish an extended light source as an initial value for the shadow plane, and reflect the extended light source and form a shadow thereof on the object.

A recording medium according to the present invention stores a program comprising the steps of (a) establishing at least one virtual plane from the layout of a plurality of objects generated by three-dimensional modeling, and (b) expressing a shadow of the object projected onto the virtual plane by a light source as a viewpoint, on the object that is farther from the light source than the object.

The recording medium with the stored program makes it possible to express easily a shadow on a plurality of objects arranged in a complex layout or a shadow with respect to an object having a complex shape.

The step (a) may comprise the step of defining a shadow expression attribute as to whether the shadow is to be expressed on the objects in light source processing attributes of the objects, and the step (b) may comprise the step of selectively expressing the shadow on the object based on the shadow expression attribute.

The step (b) may comprise the steps of (c) establishing a shadow plane which serves as a texture plane corresponding to the virtual plane, rendering the shadow of the object formed by projection onto the virtual plane on the shadow plane, and mapping the shadow rendered on the shadow plane onto the other object by way of texture mapping.

The steps (c) may further comprise the step of mapping the shadow onto the other object by way of texture mapping based on projected coordinates of the other object onto the virtual plane, or with respect to each of the polygons of the other object.

The step (b) may further comprise the steps of determining coordinates of the objects with the light source as a viewpoint, and determining projected coordinates of the objects onto the virtual plane successively in a direction away from the light source, and the steps (c) may further comprise the step of rendering the shadow formed by the object on the shadow plane based on the projected coordinates each time texture mapping onto one of the objects is finished.

The step (b) may further comprise the steps of determining the coordinates of the objects and the projected coordinates of the objects onto the virtual plane with respect to each of the polygons of the objects, and registering the determined coordinates in a rendering list successively in the direction away from the light source, and the steps (c) may further comprise the step of successively reading the registered coordinates from the rendering list for rendering the shadow on the shadow plane.

The steps (c) may further comprise the step of effecting low-pass filtering on the shadow rendered on the shadow plane depending on at least the distance from the light source for thereby applying a blur to the shadow depending on at least the distance from the light source.

The steps (c) may further comprise the step of interpolating the shadow rendered on the generating shadow plane when it is expressed on the object, according to rendering depending on the shadow before it is subject to low-pass filtering, the shadow after it is subject to low-pass filtering, and the light source coordinates of the object to be processed, for thereby controlling the blur of the shadow.

The steps (c) may further comprise the steps of preparing a reference shadow plane and a generating shadow plane as the shadow plane, and, each time the objects to be processed switch from one to another, copying the shadow rendered on the generating shadow plane onto the reference shadow plane, and, each time the shadow on the reference shadow plane is mapped by way of texture mapping with respect to each of the polygons of one object, rendering a projected image of the polygon onto the virtual plane as a new combined shadow on the generating shadow plane.

The steps (c) may further comprise the step of, each time the shadow rendered on the generating shadow plane is copied onto the reference shadow plane, effecting low-pass filtering on the shadow rendered on the generating shadow plane.

The steps (c) may further comprise the steps of preparing, in addition to the reference shadow plane and the generating shadow plane as the shadow plane, a background shadow plane which is a texture plane corresponding to a background virtual plane disposed behind the object to be processed, with the light source as a viewpoint, rendering a shadow formed by projecting a shadow projected onto the virtual plane onto the background virtual plane, on the background shadow plane, and mapping a shadow expressed on the object to be processed by way of texture mapping, while interpolating the shadow according to rendering based on the shadow rendered on the reference shadow plane, the shadow rendered on the background shadow plane, and light source coordinates of the object.

The steps (c) may further comprise the steps of establishing an extended light source as an initial value for the shadow plane, and reflecting the extended light source and forming a shadow thereof on the object.

A program according to the present invention comprises the steps of (a) establishing at least one virtual plane from the layout of a plurality of objects generated by three-dimensional modeling, and (b) expressing a shadow of the object projected onto the virtual plane by a light source as a viewpoint, on the object that is farther from the light source than the object.

When the above program is executed, it is possible to express easily a shadow on a plurality of objects arranged in a complex layout or a shadow with respect to an object having a complex shape.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

Figure 10:
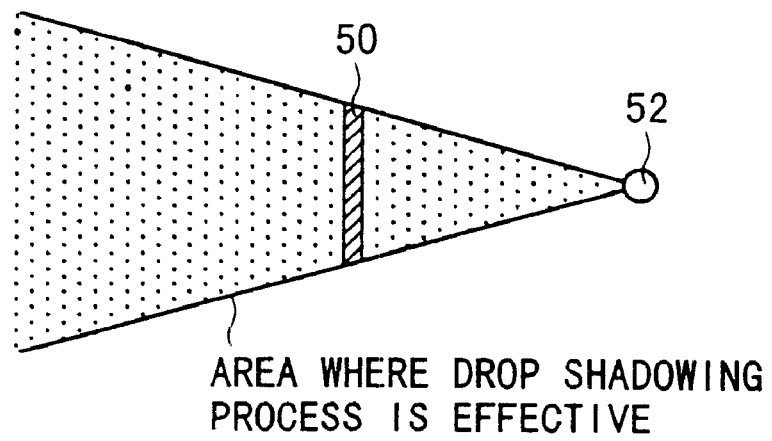
FIG. 10 is a diagram showing an effective area where the drop shadowing process is effective with respect to a point light source.
Figure 13:
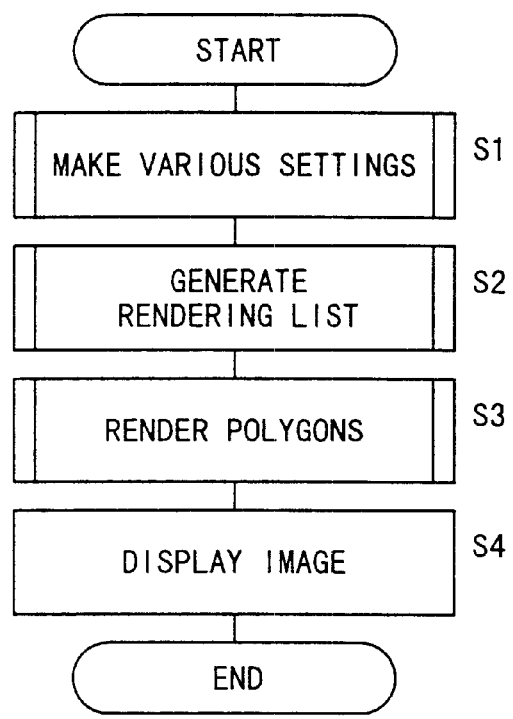
FIG. 13 is a flowchart of a sequence of the drop shadowing process according to the first embodiment of the present invention.

FIG. 1 is a block diagram of an entertainment apparatus according to the present invention;

FIG. 2 is a diagram illustrative of a drop shadowing process according to the present invention;

FIG. 3 is a functional block diagram of a drop shadowing unit according to the present invention;

FIG. 4 is a diagram showing details of an object information table;

FIG. 5 is a diagram showing details of a vertex data file;

FIG. 6 is a diagram showing details of a packet;

FIG. 7 is a functional block diagram of a various setting processing unit in a drop shadowing process according to a first embodiment of the present invention;

FIG. 8 is a functional block diagram of a rendering list generating unit in the drop shadowing process according to the first embodiment of the present invention;

FIG. 9 is a functional block diagram of a rendering unit in the drop shadowing process according to the first embodiment of the present invention;

FIG. 10 is a diagram showing an effective area where the drop shadowing process is effective with respect to a point light source;

FIG. 11 is a diagram illustrative of perspective transformation of an object onto a virtual plane;

FIG. 12 is a diagram showing a conceptual representation of the drop shadowing process according to the first embodiment of the present invention;

FIG. 13 is a flowchart of a sequence of the drop shadowing process according to the first embodiment of the present invention;

FIG. 14 is a flowchart of a sequence of operation of the various setting processing unit in the drop shadowing process according to the first embodiment of the present invention;

FIGS. 15 and 16 are a flowchart of a sequence of operation of the rendering list generating unit in the drop shadowing process according to the first embodiment of the present invention;

FIG. 17 is a diagram illustrative of the insertion of a packet into a rendering list;

FIGS. 18 and 19 are flowcharts of sequence of operation of the rendering unit in the drop shadowing process according to the first embodiment of the present invention;

FIG. 20 is a diagram illustrative of the formation of umbra and penumbra regions on a virtual plane by a distributed light source in a drop shadowing process according to a second embodiment of the present invention;

FIG. 21 is a diagram illustrative of the manner in which a generating shadow plane is subjected to low-pass filtering depending on the distance from a light source to express the extent of a blur (penumbra) depending on the distance, in the drop shadowing process according to the second embodiment of the present invention;

FIG. 22 is a diagram illustrative of the manner in which a generating shadow plane is subjected to low-pass filtering each time an object is processed and a generating shadow plane is subjected to low-pass filtering at every constant distance, in the drop shadowing process according to the second embodiment of the present invention;

FIG. 23 is a diagram illustrative of a trilinear process in a drop shadowing process according to a third embodiment of the present invention;

FIG. 24 is a functional block diagram of a various setting processing unit in the drop shadowing process according to the third embodiment of the present invention;

FIG. 25 is a functional block diagram of a rendering unit in the drop shadowing process according to the third embodiment of the present invention;

FIG. 26 is a flowchart of a sequence of operation of the various setting processing units in the drop shadowing process according to the third embodiment of the present invention;

FIGS. 27 and 28 are flowcharts of a sequences of operation of the rendering unit in the drop shadowing process according to the third embodiment of the present invention;

FIG. 29 is a diagram illustrative of an expression of a shadow whose shape and color vary gradually along the depth of a polygon in the drop shadowing process according to the third embodiment of the present invention; and FIG. 30 is a diagram illustrative of an expression of a projected shadow of an extended light source such as a flame and a shadow cast by the extended light source on an object, in a drop shadowing process according to a fourth embodiment of the present invention.

DESCRIPTION OF THE PREFERRED EMBODIMENTS

Embodiments in which an image processing method, an image processing apparatus, a recording medium, and a program according to the present invention are applied to an entertainment apparatus for performing three-dimensional CG processing will be described below with reference to FIGS. 1 through 30.

As shown in FIG. 1, an entertainment apparatus 10 comprises a main CPU 12 for controlling the overall operation of the entertainment apparatus 10, a main memory 14 for storing various programs and various data, an image processor 18 for generating image data under the control of the main CPU 12 and outputting the generated image data to a display unit (e.g., CRT) 16, and an input/output port 20 for sending data to and receiving data from external devices.

The main memory 14, the image processor 18, and the input/output port 20 are connected to the main CPU 12 by a bus 22. To the input/output port 20, there are connected, for example, an input/output device 24 for entering data (key entry data, coordinate data, etc.) into the entertainment apparatus 10, and an optical disk drive 26 for playing back an optical disk, such as a CD-ROM, which stores various programs and data (object-related data, texture data, etc.).

The image processor 18 comprises a rendering engine 30, a memory interface 32, an image memory 34, and a display controller 36 such as a programmable CRT controller, for example.

The rendering engine 30 renders image data in the image memory 34 via the memory interface 32 in response to rendering commands supplied from the main CPU 12.

A first bus 38 is connected between the memory interface 32 and the rendering engine 30, and a second bus 40 is connected between the memory interface 32 and the image memory 34. The first and second buses 38, 40 each have a bus width of 128 bits, for example, for allowing the rendering engine 30 to render image data rapidly in the image memory 34.

The rendering engine 30 is capable of rendering image data of 320×240 pixels according to NTSC or PAL or image data of 640×480 pixels on a real-time basis a plurality of times, ranging from more than ten to several tens, per 1/60 to 1/30 second.

The image memory 34 is of a unified memory structure capable of specifying a texture area 34a and a rendering area 34b (see FIG. 3) in one area.

The display controller 36 writes texture data read by the optical disk drive 26 and texture data generated in the main memory 14 into the texture area of the image memory 34 via the memory interface 32, and reads image data rendered in the rendering area of the main memory 14 via the memory interface 32, and outputs the image data to the display unit 16 for display on its display screen.

The function of a characteristic feature of the entertainment apparatus 10, i.e., the function of a process of dropping a shadow on an object (hereinafter referred to as a "drop shadowing process"), will be described in detail below.

According to the drop shadowing process, as shown in FIG. 2, at least one virtual plane 50 is established from the layout of a plurality of objects Ob1, Ob2 generated by three-dimensional modeling, and a projected image 54 of the object Ob1 projected onto the virtual plane 50 by a light source 52 is expressed as a shadow 56 on the object Ob2 that is farther from the light source 52 than the object Ob1.

A program for performing the drop shadowing process may be used in a drop shadowing unit 100 (see FIG. 3). The program is downloaded from a CD-ROM that is played back by the optical disk drive 26 into the main memory 14 of the entertainment apparatus 10. Then, the downloaded program for performing the drop shadowing process is run on the entertainment apparatus 10.

The drop shadowing unit 100 will be described below with reference to FIGS. 3 through 9. As shown in FIG. 3, the drop shadowing unit 100 has a various setting processing unit 102, a rendering list generating unit 104, a rendering unit 106, and an image display unit 108.

The various setting processing unit 102 generates an object information table 110, makes layout settings for objects Ob1, Ob2, . . . , a screen, and a light source 52, and establishes at least one virtual plane 50 from the layout of the objects Ob1, Ob2, . . .

As shown in FIG. 4, the object information table 110 registers as many records as the number of generated objects. Each of the records contains an initial address of a data file (vertex data file) of vertex data (object coordinates) of polygons that make up the corresponding object, the number M of polygons, an initial address of a texture table that is used, shading attribute information (such as Gouraud shading), topology information (such as mesh), a light source processing attribute, and object layout information.

The light source processing attribute defines information as to whether a polygon shadow is to be displayed or not (to be displayed/not to be displayed=1/0).

The rendering list generating unit 104 determines a screen coordinate system, a light source coordinate system, and projected coordinates on the virtual plane 50 (coordinates of a polygon shadow) of each of the polygons of objects based on vertex data files 112 of the objects and the layout of the light source 52, etc., registers the determined coordinate systems and projected coordinates in packets 114, and effects Z-sorting on the packets 114 in a direction away from the light source 52, and registers the packets 114 in a rendering list 116.

As shown in FIG. 5, the vertex data files 112 comprise as many files as the number of generated objects. Each of the files registers in each record object coordinates $PP_{ij0}=(X_{ij0}, Y_{ij0}, Z_{ij0})$, $PP_{ij1}=(X_{ij1}, Y_{ij1}, Z_{ij1})$, $PP_{ij2}=(X_{ij2}, Y_{ij2}, Z_{ij2})$ of a polygon of the object.

As shown in FIG. 6, each of the packets 114 stores therein the number of an object (object number) to which the polygon belongs, a Z-sorting pointer for use as a pointer when the packet 114 is registered in the rendering list 116, screen coordinates $SP_{ij0}=(X_{Sij0}, Y_{Sij0}, Z_{Sij0})$, $SP_{ij1}=(X_{Sij1}, Y_{Sij1}, Z_{Sij1})$, $SP_{ij2}=(X_{Sij2}, Y_{Sij2}, Z_{Sij2})$ of the polygon, light source coordinates $UP_{ij0}=(X_{Uij0}, Y_{Uij0}, Z_{Uij0})$, $UP_{ij1}=(X_{Uij1}, Y_{Uij1}, Z_{Uij1})$, $UP_{ij2}=(X_{Uij2}, Y_{Uij2}, Z_{Uij2})$ of the polygon, and projected coordinates $UV_{ij0}=(U_{ij0}, V_{ij0})$, $UV_{ij1}=(U_{ij1}, V_{ij1})$, $UV_{ij2}=(U_{ij2}, V_{ij2})$ of the polygon onto the virtual plane 50.

The rendering unit 106 successively takes the packets 114 from the rendering list 116, and, based on the various data of the polygons registered in the packets 114, renders the polygons and performs texture mapping on polygon shadows of the polygons.

The image display unit 108 reads image data stored in the rendering area 34b of the image memory 34 and outputs the read image data to the display controller 36.

As shown in FIG. 7, the various setting processing unit 102 has a table generating unit 120 for generating an object information table 110 based on data entered via the input/output device 24, a layout information registering unit 122 for registering information relative to the layout of objects entered via the input/output device 24 in the object information table 110, a coordinate setting unit 124 for determining world coordinates of a screen, the light source 52, and the virtual plane 50 from information relative to the layout of the screen, the light source 52, and the virtual plane 50, and registering the determined world coordinates in predetermined array variable areas Z1–Z4, and a light source coordinate calculating unit 126 for determining light source coordinates of the virtual plane 50 based on the world coordinates of the virtual plane 50, and registering the Z coordinate in a predetermined array variable area Z5.

As shown in FIG. 8, the rendering list generating unit 104 comprises a rendering list initializing unit 130 for initializing the rendering list 116, a table record reading unit 132 for reading records of information from the object information table 110, a file record reading unit 134 for reading records of information from the corresponding vertex data file 112, a data storing unit 136 for storing data in packets 114, a coordinate calculating unit 138 for calculating screen coordinates, light source coordinates, and projected coordinates onto the virtual plane 50, of the polygons registered in the vertex data files 112, a pointer determining unit 140 for determining an insertion pointer (Z-sorting pointer) with respect to the rendering list 116 based on the light source coordinates of the polygons, a packet inserting unit 142 for inserting a packet 114 into the record corresponding to the pointer, and an end determining unit 144 for determining whether the processing on the polygons that make up the object to be processed has all been ended or not.

As shown in FIG. 9, the rendering unit 106 is arranged to use a reference shadow plane 150 and a generating shadow plane 152 which correspond to the virtual plane 50. The shadow planes 150, 152 are logically assigned to the texture area 34a of the image memory 34.

The rendering unit 106 issues a command for operating a texture expressing processing unit 154 incorporated in the rendering engine 30. The texture expressing processing means 154 comprises a texture mapping means 156 and a shading unit 158.

The rendering unit 106 has a shadow plane initializing unit 160 for writing initial data Di read from an initial data file 178 into the reference shadow plane 150 and the generating shadow plane 152 to initialize the reference shadow plane 150 and the generating shadow plane 152, a packet reading unit 162 for successively reading packets 114 from the rendering list 116, a table record reading means 164 for reading records of information from the object information table 110, an object determining unit 166 for determining whether objects to be processed have switched from one to another or not, a shadow plane rendering unit 168 for rendering data in the reference shadow plane 150 and the generating shadow plane 152, a polygon shadow display determining unit 170 for determining whether a polygon shadow is to be displayed or not based on light source processing attributes registered in the object information table 110, a hidden surface removal processing unit 172 for rendering generated polygon data (polygon data after texture expression and drop shadowing) in the rendering area 34b while carrying out hidden surface removal according to Z-buffering, for example, and an end determining unit 174 for determining whether the processing on the packets 114 registered in the rendering list 116 has all been ended or not.

A drop shadowing process according to a first embodiment of the present invention, which is carried out by the drop shadowing unit 100, will be described below. Prior to the description of the drop shadowing process, the concept of operation of the drop shadowing unit 100 will first be described with reference to FIGS. 2, 10 through 12.

FIG. 2 shows the concept of the drop shadowing process using the virtual plane 50. In FIG. 2, the virtual plane 50 is located between the object Ob1 which casts a shadow and the object Ob2 on which the shadow is cast. The position of the virtual plane 50 is determined by its size and the extent of a space covered by the drop shadowing process.

In the first embodiment, the object Ob1 is projected onto the virtual plane 50 according to perspective transformation with the light source 52 as the viewpoint, and is written as a polygon shadow on a shadow plane (the reference shadow plane 150 and the generating shadow plane 152) which is a texture plane corresponding to the virtual plane 50. The drop shadowing process for dropping a shadow on the object Ob2 is carried out by performing texture mapping onto each of the polygons of the object Ob2 from the reference shadow plane 150 that serves as a texture pattern.

The texture coordinates of each of vertexes of a polygon can be determined according to perspective transformation with the light source 52 as the viewpoint. Formulas of perspective transformation will be described below with reference to FIG. 11.

In FIG. 11, if the light source 52 is a point light source, then the perspective transformation of each of the vertexes of the object Ob1 to the virtual plane 50 is represented by:

$$Xa=(xa*ScrZ)/za$$

$$Ya=(ya*ScrZ)/za$$

and the texture coordinates (Ub, Vb) of the shadow of each of the vertexes of the object Ob2 are similarly represented according to perspective transformation by:

$$Ub=(xb*ScrZ)/zb$$

$$Vb=(yb*ScrZ)/zb$$

If the light source 52 is a parallel light source, then $$(Xa, Ya)=(xa, ya)$$

$$(Xb, Yb)=(xb, yb)$$

FIG. 12 shows a conceptual representation of the drop shadowing process according to the first embodiment of the present invention. According to the drop shadowing process shown in FIG. 12, which is applied to each object, a polygon shadow rendered on a shadow plane (the reference shadow plane 150) is subjected to texture mapping onto an object and rendered on a screen 176 (procedure 1), and thereafter the polygon shadow formed on the object is rendered on the shadow plane 150 (procedure 2). The above drop shadowing process is carried out by Z-sorting with the light source 52 as the viewpoint, as indicated by the arrow A.

A sequence of the drop shadowing process according to the first embodiment of the present invention will be described below with reference to FIG. 13.

In step S1, the various setting processing unit 102 generates an object information table 110, makes layout settings for the object, the screen 176, and the light source 52, and sets up at least one virtual plane 50 from the layout of a plurality of objects (various setting processing).

Then, in step S2, the rendering list generating unit 104 determines a screen coordinate system, a light source coordinate system, and projected coordinates on the virtual plane 50 (coordinates of a polygon shadow) of each of the polygons of objects based on vertex data files 112 of the objects and the layout of the light source 52, etc., registers the determined coordinate systems and projected coordinates in packets 114, and registers the packets 114 successively in a direction away from the light source 52 in a rendering list 116 (rendering list generation processing).

Thereafter, in step S3, the rendering unit 106 successively takes the packets 114 from the rendering list 116, and, based on the various data of the polygons registered in the packets 114, renders the polygons and performs texture mapping on polygon shadows of the polygons (rendering processing).

Then, in step S4, the image display unit 108 reads image data stored in the rendering area 34b of the image memory 34 and outputs the read image data via the display controller 36 to the display unit 16. In this manner, as shown in FIG. 2, the shadow of the object Ob1 produced by the light source 52 is cast on the object Ob2 which is positioned behind the object Ob1 with respect to the light source 52.

After step S4, the drop shadowing process according to the first embodiment is ended.

Sequences of operation of the various setting processing unit 102, the rendering list generating unit 104, and the rendering unit 106 will be described below with reference to FIGS. 14 through 19.

First, a sequence of operation of the various setting processing unit 102 will be described below with reference to FIG. 14.

In step S101 shown in FIG. 14, the table generating unit 120 of the various setting processing means 102 generates an object information table 110 based on data entered via the input/output device 24.

As shown in FIG. 4, items of information registered in the object information table 110 include shading attribute information (such as Gouraud shading), topology information (such as mesh), and a light source processing attribute, among others. The light source processing attribute defines information as to whether a polygon shadow is to be displayed or not (to be displayed/not to be displayed=1/0).

In the object information table 110, an initial address of a vertex data file 112, the number of polygons, an initial address of a texture table that is used, etc. are registered when an object is generated according to CAD.

In step S102, the layout information registering unit 122 registers information relative to the layout of objects entered via the input/output device 24 in the object information table 110.

In step S103, the coordinate setting unit 124 calculates world coordinates of the screen 176 based on information relative to the layout of the screen 176, and stores the calculated world coordinates in a predetermined array variable area Z1.

In step S104, the coordinate setting unit 124 calculates world coordinates of the light source 52 based on information relative to the layout of the light source 52, and stores the calculated world coordinates in a predetermined array variable area Z2. The coordinate setting unit 124 also stores the type of the light source 52 entered via the input/output device 24 in a predetermined array variable area Z3.

In step S105, the coordinate setting unit 124 sets up the layout of the virtual plane 50 based on the position of the light source 52 stores in the array variable area Z2 and the layout information of objects registered in the object information table 110, calculates world coordinates of the virtual plane 50, and stores the calculated world coordinates in a predetermined array variable area Z4.

In step S106, the light source coordinate calculating unit 126 calculates light source coordinates of the virtual plane 50 based on the world coordinates of the virtual plane 50 stored in the array variable area Z4 and the position of the light source 52, and stores the Z coordinate of the calculated world coordinates in a predetermined array variable area Z5.

After step S105, the sequence of operation of the various setting processing unit 102 is ended.

A sequence of operation of the rendering list generating unit 104 will be described below with reference to FIGS. 15 and 16.

In step S201 shown in FIG. 15, the rendering list initializing unit 130 initializes the rendering list 116.

Then, in step S202, the rendering list generating unit 104 stores an initial value "0" in an index register 1 used to search for an object, thereby initializing the index register i.

In step S203, the table record reading unit 132 reads a record (i record) indicated by the index register i from the object information table 110.

In step S204, the rendering list generating unit 104 stores an initial value "0" in an index register j used to search for a polygon, thereby initializing the index register j.

In step S205, the data storing unit 136 stores an initial value in a packet 114, thereby initializing the packet 114.

In step S206, the data storing unit 136 stores an object number i (the value of the index register i) in the packet 114.

In step S207, the file record reading unit 134 reads a record (j record) indicated by the index register j from the corresponding vertex data file 112, i.e., reads vertex data of a jth polygon. The corresponding vertex data file 112 is a vertex data file corresponding to the initial address of the vertex data file 112 that is registered in the i record read from the object information table 110.

In step S208, the coordinate calculating unit 138 determines screen coordinates $SP_{ij0}=(X_{Sij0}, Y_{Sij0}, Z_{Sij0})$, $SP_{ij1}=(X_{Sij1}, Y_{Sij1}, Z_{Sij1})$, $Sp_{ij2}=(X_{Sij2}, Y_{Sij2}, Z_{Sij2})$ of the vertexes of the jth polygon based on the layout information of the object registered in the i record in the object information table 110, the world coordinates of the screen 176 registered in the array variable area Z1, and the vertex data of the jth polygon, and the data storing unit 136 stores the determined screen coordinates in the packet 114.

In step S209, the coordinate calculating unit 138 determines light source coordinates $UP_{ij0}=(X_{Uij0}, Y_{Uij0}, Z_{Uij0})$, $UP_{ij1}=(X_{Uij1}, Y_{Uij1}, Z_{Uij1})$, $UP_{ij2}=(X_{Uij2}, Y_{Uij2}, Z_{Uij2})$ of the vertexes of the jth polygon based on the layout information of the object, the world coordinates of the light source 52 registered in the array variable area Z2, and the vertex data of the jth polygon, and the data storing unit 136 stores the determined light source coordinates in the packet 114.

In step S210, the coordinate calculating unit 138 determines projected coordinates $UV_{ij0}=(U_{ij0}, V_{ij0})$, $UV_{ij1}=(U_{ij1}, V_{ij1})$, $UV_{ij2}=(U_{ij2}, V_{ij2})$ of the vertexes of the jth polygon based on the layout information of the object, the Z coordinate (light source coordinate) of the virtual plane 50 registered in the array variable area Z5, and the vertex data of the jth polygon, and the data storing unit 136 stores the determined projected coordinates in the packet 114.

In step S211, the pointer determining unit 140 selects the Z coordinate which is closest to the light source, of those Z coordinates of the light source coordinates $UP_{ij0}=(X_{Uij0}, Y_{Uij0}, Z_{Uij0})$, $UP_{ij1}=(X_{Uij1}, Y_{Uij1}, Z_{Uij1})$, $UP_{ij2}=(X_{Uij2}, Y_{Uij2}, Z_{Uij2})$ of the vertexes that have been determined in step S209, and uses the selected Z coordinate as a Z-sorting pointer for the jth polygon.

In step S212 shown in FIG. 16, the packet inserting unit 142 searches the rendering list 116, and inserts the present packet 114 into the rendering list 116 such that the packets 114 are arranged therein according to an increasing pattern of Z coordinates (Z-sorting pointers), as shown in FIG. 17.

In step S213, the end determining unit 144 increments the value of the index register j by "+1". In step S214, the end determining unit 144 determines whether the processing on all the polygons that make up the ith object has ended by determining whether or not the value of the index register j is equal to or greater than the number M of polygons registered in the i record in the object information table 110.

If the processing on all the polygons that make up the ith object has not ended, then control goes back to step S205 shown in FIG. 15 to calculate the various coordinates relative to a next polygon, store the calculated coordinates in a packet 114, and insert the packet 114 in the rendering list 116.

If the processing on all the polygons that make up the ith object has ended in step S214, then control proceeds to step S215 in which the end determining unit 144 increments the value of the index register i by "+1". In step S216, the end determining unit 144 determines whether the processing on all the objects has ended by determining whether or not the value of the index register i is equal to or greater than the number N of records registered in the object information table 110.

If the processing on all the objects has not been ended, then control goes back to step S203 shown in FIG. 15 to calculate the various coordinates relative to all polygons of a next object, store the calculated coordinates in respective packets 114, and insert the packets 114 in the rendering list 116 according to an increasing pattern of z-sorting pointers.

If the processing on all the objects has ended in step S216, then the sequence of operation of the rendering list generating unit 104 is brought to an end.

A sequence of operation of the rendering unit 106 will be described below with reference to FIGS. 18 and 19.

In step S301 shown in FIG. 18, the shadow plane initializing unit 160 reads initial data Di from the initial data file 178, and renders the initial data Di in the shadow plane that is used (the reference shadow plane 150 and the generating shadow plane 152) to initialize the reference shadow plane 150 and the generating shadow plane 152.

In step S302, the rendering unit 106 stores an initial value "FF" in a register R which is used to save the object number i, and an initial value "0" in an index register k which is used to search the packets 114, for thereby initializing the register R and the index register k.

In step S303, the packet reading unit 162 reads a packet 114 at a (kth) point indicated by the index register k from the rendering list 116. In step S304, the packet reading unit 162 reads the object number i from the read packet 114.

In step S305, the object determining unit 166 determines whether the present object number i is the same as the previous object number or not, by determining whether the value of the index register i is the same as the value of the register R or not.

If the present object number i is different from the previous object number, then control proceeds to step S306 in which the table recording reading unit 164 reads the i record from the object information table 110.

In step S307, the shadow plane rendering unit 168 copies texture data (or the initial data Di) relative to a polygon shadow rendered in the generating shadow plane 152 onto the reference shadow plane 150.

In step S308, the object determining unit 166 stores the object number i in the register R.

After the processing in step S308 is finished or if the present object number i is the same as the previous object number in step S305, control goes to step S309 shown in FIG. 19 in which the texture expressing processing unit 154 performs a normal texture expressing process. Specifically, the texture expressing processing unit 154 performs a texture expressing process such as shading, texture mapping, etc. based on the screen coordinates of the present polygon and the initial address of a texture table 180.

In step S310, the polygon shadow display determining unit 170 determines whether a polygon shadow can be displayed on the object or not based on a polygon shadow display attribute of the light source processing attributes registered in the corresponding record in the object information table 110.

If a polygon shadow can be displayed, then control goes to step S311 in which the texture mapping unit 156 of the texture expressing processing unit 154 maps the polygon shadow rendered in the reference shadow plane 150 onto the polygon to be processed by way of texture mapping, while referring to the projected coordinates $UV_{ij0}=(U_{ij0}, V_{ij0})$, $UV_{ij1}=(U_{ij1}, V_{ij1})$, $UV_{ij2}=(U_{ij2}, V_{ij2})$ of the polygon to be processed onto the virtual plane 50. If only the initial data is rendered in the reference shadow plane 150, then the initial data Di is mapped by way of texture mapping.

After the processing in step S311 is finished or if the polygon shadow cannot be displayed in step S310, then control goes to step S312 in which the shadow plane rendering unit 168 renders the polygon shadow of the present polygon in combination with the previous polygon shadow on the generating shadow plane 152, based on the projected coordinates of the present polygon onto the virtual plane 50, and paints the combined shadow with black $(R, G, B, \alpha)=(0, 0, 0, 100\%)$.

In step S313, the hidden surface removal processing unit 172 writes the data of the present polygon in the rendering area 34b while carrying out hidden surface removal according to Z-buffering, based on the screen coordinates of the present polygon.

In step S314, the rendering unit 106 increments the value of the index register k by "+1". Then, in step S315, the end determining unit 174 determines whether the processing on all the packets 114 has ended or not. If the processing on all the packets 114 has not ended, then control goes back to step S303 to perform the normal texture expressing process, the texture mapping of the polygon shadow, and the hidden surface removal with respect to the polygon registered in a next packet 114.

If the processing on all the packets 114 registered in the rendering list 116 has ended in step S315, then the sequence of operation of the rendering unit 106 comes to an end.

The processing in steps S303-S313 is repeated to offer the following advantages: With respect to the polygons of the object Ob1 that is positioned closet to the light source 52, only the initial data Di is written on the reference shadow plane 150. If the initial data Di represents transparency, then no polygon shadow is rendered on the polygons of the object Ob1.

On the polygons of the object Ob2 that is the second object from the light source 52, there is rendered a polygon shadow of all the polygon shadows of the first object Ob1 from the light source, which is present in the range represented by the projected coordinates of the polygon of the object Ob1. When the processing on the second object Ob2 is finished, the polygon shadow of the first object Ob1 is rendered on the second object Ob2.

Similarly, on an object Ob3 that is the third object from the light source 52, there is rendered a combination of the polygon shadow of the first object Ob1 and the polygon shadow of the second object Ob2.

In the drop shadowing process according to the first embodiment, as described above, one virtual plane 50 is established from the layout of a plurality of objects generated by three-dimensional modeling, and a polygon shadow of one of the objects which is formed by projection onto the virtual plane by a light source as a viewpoint (or with respect to the light source) is expressed as on another one of the objects that is farther from the light source 52 than the object.

Specifically, a reference shadow plane 150 and a generating shadow plane 152 which are texture planes corresponding to the virtual plane 50 are set up, the shadow of an object which is formed by projection onto the virtual plane 50 is rendered on the reference shadow plane 150 via the generating shadow plane 152, and the shadow rendered on the reference shadow plane 150 is mapped onto a next object by way of texture mapping.

In this manner, it is easy to express shadows with respect to a plurality of objects arranged in a complex layout or a shadow with respect to an object having a complex shape.

In this embodiment, since a shadow expression attribute as to whether a polygon shadow is to be expressed on an object or not is defined in the light source processing attribute in each record in the object information table 110, the process of expressing a polygon shadow on an object can selectively be performed. Therefore, the facial expression of a principal character in a game, for example, may be prevented from being hidden by the shadow of another object.

A drop shadowing process according to a second embodiment of the present invention will be described below with reference to FIGS. 9, 20 through 22.

The drop shadowing process according to the second embodiment is essentially the same as the drop shadowing process according to the first embodiment except that the rendering unit in the drop shadowing process has a bilinear processing unit 190 for blurring a polygon shadow depending on the distance from the light source 52, as indicated in parentheses in FIG. 9.

As shown in FIG. 20, if the light source 52 is not a point light source, but an extended light source, then when the virtual plane 50 is located in a position close to the object Ob1, the object Ob1 casts an umbra Ss on the virtual plane 50.

When the virtual plane 50 is located in a position far from the object Ob1, the object Ob1 casts the umbra Ss and also a penumbra Sd, which is a blurred shadow that surrounds the umbra Ss, on the virtual plane 50. The degree of a blur of the penumbra Sd increases depending on the distance from the light source 52 to the virtual plane 50.

The drop shadowing process according to the second embodiment is arranged to realize the characteristics of the penumbra Sd.

Specifically, as shown in FIG. 18, after the shadow plane rendering unit 168 has copied texture data relative to a polygon shadow rendered in the generating shadow plane 152 onto the reference shadow plane 150 in step S307, the bilinear processing unit 190 effects low-pass filtering on the texture data relative to the polygon shadow rendered in the generating shadow plane 152 in step S320 indicated in parentheses in FIG. 18.

FIG. 21 shows the manner in which the texture data relative to the polygon shadow rendered in the generating shadow plane 152 is subjected to low-pass filtering depending on the distance from the light source 52 to express the degree of a blur (penumbra) depending on the distance. A review of FIG. 21 indicates that the projected shadow is clearer at a distance close to the light source 52 and more blurred at a distance far from the light source 52. According to the second embodiment, if the present object number i is different from the previous object number in step S305 shown in FIG. 5, then the texture data relative to the polygon shadow rendered in the generating shadow plane 152 is subjected to low-pass filtering in step S320.

In this manner, as shown in FIG. 22, when the object Ob1 is processed at a stage P1, the polygon shadow (umbra only) of the object Ob1 is rendered on the generating shadow plane 152, and when the object Ob2 is processed at a stage P3, the polygon shadow (umbra and penumbra) of the object Ob1 and the polygon shadow (umbra only) of the object Ob2 are rendered on the generating shadow plane 152.

Farther from the light source 52 and each time objects are changed, the polygon shadow rendered on the generating shadow plane 152 is gradually blurred depending on the distance from the light source 52.

The polygon shadow rendered on the generating shadow plane 152 may be subject to low-pass filtering each time a certain distance is reached while monitoring the light source coordinates. In FIG. 22, the polygon shadow rendered on the generating shadow plane 152 is subject to low-pass filtering at stages or points P1, P2, P3.

In the drop shadowing process according to the second embodiment, inasmuch as the polygon shadow rendered on the generating shadow plane 152 is subject to low-pass filtering depending on the distance from the light source 52, the polygon shadow is blurred depending on the distance from the light source 52 and hence is expressed in a realistic manner.

A drop shadowing process according to a third embodiment of the present invention will be described below with reference to FIGS. 23 through 29.

In the drop shadowing process according to the third embodiment, when a polygon shadow rendered on the generating shadow plane 152 is expressed on an object via the reference shadow plane 150, it is interpolated according to rendering (in a narrow sense) depending on the polygon shadow before it is subject to low-pass filtering, the polygon shadow after it is subject to low-pass filtering, and the light source coordinates of the object to be processed, for thereby controlling the blur of the polygon shadow.

As shown in FIG. 23, the polygon shadow is rendered using two shadow planes, i.e., the reference shadow plane 150 and a background shadow plane 192.

The reference shadow plane 150 and the background shadow plane 192 are shadow planes on which the polygon shadow is subject to low-pass filtering at different times. The polygon shadow is rendered by a trilinear texture mapping process which effects interpolation between the two shadow planes 150, 192 depending on the Z coordinate of the light source coordinates. As a result, the blur of the shadow depending on the distance from the light source 52 to the object can be controlled within the polygon for better shadow approximation.

An arrangement for carrying out the drop shadowing process according to the third embodiment and operation of the drop shadowing process will be described below.

The drop shadowing process according to the third embodiment is essentially the same as the drop shadowing process according to the first embodiment except that the various setting processing unit 102 and the rendering unit 106 have partly different functions.

Specifically, as shown in FIG. 24, the various setting processing unit 102 has the table generating unit 120, the layout information registering unit 122, the coordinate setting unit 124, and the light source coordinate calculating unit 126 which has different functions from those described above.

The light source coordinate calculating unit 126 determines light source coordinates of the virtual plane 50 based on the world coordinates of the virtual plane 50, and registers the Z coordinate in a predetermined array variable area Z5. The light source coordinate calculating unit 126 also determines light source coordinates of 1st-nth background virtual planes that are virtually disposed behind respective objects based on the layout information of the objects, and registers Z-coordinates of the determined light source coordinates in respective predetermined array variable areas Z11-Z1$n$.

As shown in FIG. 25, the rendering unit 106 is arranged to use, in addition to the reference shadow plane 150 and the generating shadow plane 152, one background shadow plane 192 logically assigned to the texture area 34$a$ of the image memory 34 in association with the 1st-nth background virtual planes.

The rendering unit 106 has the shadow plane initializing unit 160, the packet reading unit 162, the table record reading unit 164, the object determining unit 166, the shadow plane rendering unit 168, the polygon shadow display determining unit 170, the hidden surface removal processing unit 172, and the end determining unit 174. The shadow plane initializing unit 160, the shadow plane rendering unit 168, and the bilinear processing unit 190 have different functions from those described above.

The shadow plane initializing unit 160 writes initial data Di into the background shadow plane 192, as well as the reference shadow plane 150 and the generating shadow plane 152, to initialize these shadow planes 150, 152, 192.

The shadow plane rendering unit 168 renders, on the background shadow plane 192, a polygon shadow formed when a polygon shadow projected onto the virtual plane 50 (a polygon shadow rendered on the reference shadow plane 150) is projected onto either one of the 1st-nth background virtual planes virtually disposed behind the object, based on the distance from the light source 52 to the virtual plane 50 (the Z coordinate of the virtual plane 50) and the distance from the light source 52 to the corresponding background virtual plane (the Z coordinate of either one of the 1st-nth background virtual planes).

The bilinear processing unit 190 effects low-pass filtering on the polygon shadow rendered on the background shadow plane 192, as well as the polygon shadow rendered on the generating shadow plane 152.

Operation of the drop shadowing process according to the third embodiment will be described below with reference to FIGS. 26 through 28.

In steps S401-S404 shown in FIG. 26, the various setting processing unit 102 generates an object information table 110, registers information relative to the layout of objects in the object information table 110, registers the world coordinates of the screen 176, and registers the type of the light source 52 and the world coordinates of the light source 52, as with steps S101-S104 carried out by the various setting processing unit 102 in the drop shadowing process according to the first embodiment.

In step S405, the coordinate setting unit 124 sets up the layout of the virtual plane 50 and the 1st-nth background virtual planes based on the position of the light source 52 stored in the array variable area Z2 and the layout information of objects registered in the object information table 110, calculates world coordinates of the virtual plane 50 and the 1st-nth background virtual planes, and stores the calculated world coordinates in predetermined array variable areas Z4, Z11-Z1n.

In step S406, the light source coordinate calculating unit 126 calculates light source coordinates of the virtual plane 50 and the 1st-nth background virtual planes based on the world coordinates of the light source 52 and the virtual plane 50 stored in the array variable areas Z2, Z4, and stores the Z coordinates of the calculated world coordinates in predetermined array variable areas Z5, Z21-Z2n.

The rendering list generating unit 104 performs the same processing as with the drop shadowing process according to the first embodiment. Therefore, the processing performed by the rendering list generating unit 104 will not be described below.

Then, in step S501 shown in FIG. 27, the shadow plane initializing unit 160 of the rendering unit 106 reads initial data Di from the initial data file 178, and renders the initial data Di in the shadow plane that is used (the reference shadow plane 150, the generating shadow plane 152, and the background shadow plane 192) to initialize these shadow planes 150, 152, 192.

In step S502, the rendering unit 106 stores an initial value "FF" in a register R which is used to save the object number i, an initial value "0" in an index register k which is used to search the packets 114, and an initial value "0" in an index register n which is used to search the background virtual planes, for thereby initializing the register R and the index registers k, n.

In step S503, the packet reading unit 162 reads a packet 114 at a point (kth) indicated by the index register k from the rendering list 116. In step S504, the packet reading unit 162 reads the object number i from the read packet 114.

In step S505, the object determining unit 166 determines whether the present object number i is the same as the previous object number or not, by determining whether the value of the index register i is the same as the value of the register R or not.

If the present object number i is different from the previous object number, then control proceeds to step S506 in which the table record reading unit 164 reads the i record from the object information table 110.

In step S507, the shadow plane rendering unit 168 copies texture data relative to a polygon shadow rendered in the generating shadow plane 152 onto the reference shadow plane 150.

In step S508, the bilinear processing unit 190 effects low-pass filtering on the texture data relative to the polygon shadow rendered in the generating shadow plane 152.

In step S509, the object determining unit 166 stores the object number i in the register R. Thereafter, the rendering unit 106 increments the value of the index register n by "+1".

After the processing in step S510 is finished or if the present object number i is the same as the previous object number in step S505, control goes to step S511 shown in FIG. 28 in which the texture expressing processing unit 154 performs a normal texture expressing process. Specifically, the texture expressing processing unit 154 performs a texture expressing process such as shading, texture mapping, etc. based on the screen coordinates of the present polygon and the initial address of a texture table 180.

In step S512, the polygon shadow display determining unit 170 determines whether a polygon shadow can be displayed on the object or not based on a polygon shadow display attribute of the light source processing attributes registered in the corresponding record in the object information table 110.

If a polygon shadow can be displayed, then control goes to step S513 in which the polygon shadow display determining unit 170 determines whether the polygon shadow is displayed for the first time or not, based on whether the object number i is "0" or not.

If not for the first time, then control goes to step S514 in which the shadow plane rendering unit 168 renders, on the background shadow plane 192, a polygon shadow formed when a polygon shadow projected onto the virtual plane 50 (a polygon shadow rendered on the reference shadow plane 150) is projected onto the nth background virtual plane virtually disposed behind the object, based on the Z coordinate of the virtual plane 50 and the Z coordinate of the nth background virtual planes.

In step S515, the bilinear processing unit 190 effects low-pass filtering on the polygon shadow rendered on the background shadow plane 192, thereby blurring the polygon shadow depending on the distance from the light source 52.

In step S516, the texture mapping unit 156 of the texture expressing processing unit 154 carries out interpolation according to rendering based on the polygon shadow rendered on the reference shadow plane 150, the polygon shadow rendered on the background shadow plane 192, and the light source coordinates of the vertexes of the polygon, and maps the polygon shadow projected onto the polygon by way of texture mapping.

At this time, as shown in FIG. 29, texture mapping is carried out such that the shape of the polygon shadow gradually changes, along the depth of a polygon 200, from the shape of a polygon shadow 204 rendered on the reference shadow plane 150 to the shape of a polygon shadow 206 rendered on the nth background shadow plane 202n, and the color of the shadow on the polygon 200 gradually changes, along the depth of the polygon 200, from the color of the polygon shadow 204 rendered on the reference shadow plane 150 to the color of the polygon shadow 206 rendered on the nth background shadow plane 202n.

If for the first time in step S513, then control goes to step S517 in which the texture mapping unit 156 maps the polygon shadow rendered on the reference shadow plane 150 onto the polygon to be processed, by way of texture mapping, while referring to the projected coordinates of the polygon onto the virtual plane 50.

After the processing in step S516 or step S517 or if a polygon shadow cannot be displayed, then control goes to step S518 in which the shadow plane rendering unit 168 renders the polygon shadow of the present polygon in combination with the previous polygon shadow on the generating shadow plane 152, based on the projected coordinates of the present polygon onto the virtual plane 50, and paints the combined shadow with black (R, G, B, α)=(0, 0, 0, 100%).

In step S519, the hidden surface removal processing means 172 writes the data of the present polygon in the rendering area 34b while carrying out hidden surface removal according to Z-buffering, based on the screen coordinates of the present polygon.

In step S520, the rendering unit 106 increments the value of the index register k by "+1". Then, in step S521, the end determining unit 174 determines whether the processing on all the packets 114 has been ended or not. If the processing on all the packets 114 has not been ended, then control goes back to step S503 to perform the normal texture expressing process, the texture mapping of the polygon shadow, and the hidden surface removal with respect to the polygon registered in a next packet 114.

If the processing on all the packets 114 registered in the rendering list 116 has been ended in step S521, then the sequence of operation of the rendering unit 106 comes to an end.

The processing in steps S503-S519 is repeated to offer the following advantages: With respect to the polygons of the object Ob1 that is positioned closest to the light source 52, only the initial data Di is written on the reference shadow plane 150. If the initial data Di represents transparency, then no polygon shadow is rendered on the polygons of the object Ob1.

On the polygons of the object Ob2 that is the second object from the light source 52, there is rendered a polygon shadow of all the polygon shadows of the first object Ob1 from the light source, which is present in the range represented by the projected coordinates of the polygon of the object Ob1. When the processing on the second object Ob2 is finished, the polygon shadow of the first object Ob1 is rendered on the second object Ob2. At this time, the color of the polygon shadow projected onto the object Ob2 is expressed as gradually changing along the depth of the object Ob2 by the rendering (trilinear processing) in step S516.

Similarly, on an object Ob3 that is the third object from the light source 52, there is rendered a combination of the polygon shadow of the first object Ob1 and the polygon shadow of the second object Ob2. The color of the polygon shadow is also expressed as gradually changing along the depth of the object Ob3.

In the drop shadowing process according to the third embodiment, as described above, when a polygon shadow rendered on the generating shadow plane 152 is expressed on an object, the polygon shadow before it is subject to low-pass filtering and the polygon shadow after it is subject to low-pass filtering are interpolated according to rendering depending on the light source coordinates of the object to be processed, for thereby controlling the blur of the polygon shadow. Therefore, the polygon shadow can easily be expressed in a more realistic manner.

A drop shadowing process according to a fourth embodiment of the present invention will be described below with reference to FIG. 30.

In the drop shadowing process according to the fourth embodiment, as shown in FIG. 30, an extended light source 210 such as a flame is expressed on objects Ob1, Ob2, Ob3. Such an expression is realized by projecting, in advance, the extended light source 210 onto the virtual plane 50.

Specifically, a projected image 212 of the extended light source 210 may be preset as the initial data Di which is used by the rendering unit 106 according to the first and second embodiments shown in FIG. 9 or the rendering unit 106 according to the third embodiment shown in FIG. 25.

In the rendering unit 106 in the drop shadowing process according to the third embodiment, for example, the shadow plane initializing unit 160 renders the initial data Di on the reference shadow plane 150, the generating shadow plane 152, and the background shadow plane 192 in step S501 shown in FIG. 27, and then paints the polygon shadow on the object with black, thus modulating the extended light source 210 as light, in steps S503-S519. The polygon shadow and the extended light source 210 are subject to low-pass filtering depending on the distance from the extended light source 210 in step S515.

In an initial stage P0, only the projected image 212 of the extended light source 210 is rendered on the generating shadow plane 152. When the processing of the object Ob1 is finished at a stage P1, a projected image $212a$ of the extended light source 210 which has been subjected to low-pass filtering and an umbra 214 of the object Ob1 are rendered on the generating shadow plane 152. When the processing of the object Ob2 is finished at a stage P2, a projected image $212b$ of the extended light source 210 which has been subjected to low-pass filtering twice, a shadow $214a$ of the object Ob1 which has been subjected to low-pass filtering once, and an umbra 216 of the object Ob2 are rendered on the generating shadow plane 152.

Modulating the extended light source 210 as light signifies multiplying the polygon color after light source calculations based on the tilt of an ordinary normal line and texture mapping, by the extended color rendered on the reference shadow plane 150.

In the drop shadowing process according to the fourth embodiment, since the projected image 212 of the extended light source 210, such as a flame, is preset as the initial data Di for the shadow planes 150, 152, 192, and the extended light source 210 is reflected and shadows are cast on an object, the projected image of the extended light source 210 and shadows produced by the extended light source 210 can easily be expressed.

In the above embodiments, the hidden surface removal is carried out by Z-buffering. However, the hidden surface removal may be carried out by Z-sorting based on a screen coordinate system.

The image processing method, the image processing apparatus, the recording medium, and the program according to the present invention offer the following advantages:

(1) It is possible to express easily shadows with respect to a plurality of objects arranged in a complex layout or a shadow with respect to an object having a complex shape.

(2) The expression of a shadow with respect to an object can selectively be performed.

(3) Various effects, such as blurring, etc., can easily be applied to a shadow expressed with respect to an object.

(4) Of various effects on shadows, blurring can easily be controlled for easily expressing a more realistic shadow.

(5) A projected image of an extended light source such as a flame and a shadow produced by the extended light source can easily be expressed.

Although certain preferred embodiments of the present invention have been shown and described in detail, it should be understood that various changes and modifications may be made therein without departing from the scope of the appended claims.

What is claimed is:

1. A method of processing an image, comprising:
   orienting a plurality of three-dimensional image objects in a three-dimensional space such that at least some of the objects are spaced apart from one another;
   orienting at least one virtual plane among, but not touching, the objects;
   projecting a shadow of a first one of the objects onto the virtual plane based on a viewpoint representing a light source; and
   mapping the projected shadow onto at least one other of the objects that is farther from the viewpoint representing the light source than the first object.

2. A method according to claim 1, further comprising defining an attribute indicating whether to permit the shadow of the first object to be mapped onto the at least one other object; and selectively mapping the shadow of the first object onto the at least one other object based on the attribute.

3. A method according to claim 1, further comprising:
   establishing a shadow plane to serve as a texture plane in correspondence with the virtual plane;
   rendering the shadow of the first object on the shadow plane; and
   mapping the shadow rendered on the shadow plane onto the at least one other object by way of texture mapping.

4. A method according to claim 3, wherein the step of mapping the shadow rendered on the shadow plane onto the at least one other object is performed by way of texture mapping onto the virtual plane based on projected coordinates of the at least one other object.

5. A method according to claim 3, wherein the step of mapping the shadow rendered on the shadow plane onto the at least one other object is performed by way of texture mapping with respect to each of a plurality of polygons defining the at least one other object.

6. A method according to claim 3, further comprising:
   determining coordinates of the objects with respect to the viewpoint representing the light source;
   determining projected coordinates of the objects onto the virtual plane successively in accordance with a direction away from the viewpoint representing the light source; and
   rendering the shadow formed by the first object on the shadow plane based on the projected coordinates each time texture mapping onto the at least one other object is finished.

7. A method according to claim 6, further comprising:
   determining the coordinates of the objects and the projected coordinates of the objects onto the virtual plane with respect to each of a plurality of polygons defining the objects;
   registering the determined coordinates in a rendering list successively in accordance with the direction away from the viewpoint representing the light source; and
   successively reading the registered coordinates from the rendering list for rendering the shadow of the first object on the shadow plane.

8. A method according to claim 6, further comprising low-pass filtering the shadow of the first object rendered on the shadow plane depending on at least a distance of the first object from the light source to apply a blur to the shadow rendered on the shadow plane.

9. A method according to claim 8, further comprising interpolating the shadow of the first object rendered on the shadow plane when it is mapped on the at least one other object to control the blur thereof, the step of interpolating being performed based on: (i) the shadow of the first object before it is subject to the low-pass filtering step; (ii) the shadow of the first object after it is subject to the low-pass filtering step; and (iii) the coordinates of the objects with respect to the viewpoint representing the light source.

10. A method according to claim 6, wherein the step of establishing a shadow plane includes the steps of establishing a reference shadow plane and a generating shadow plane, and the step of rendering the shadow of the first object onto the shadow planes includes the step of rendering the shadow of the first object onto the generating shadow plane, the method further comprising:
    copying the shadow of the first object rendered on the generating shadow plane onto the reference shadow plane when a shadow of a second object is to be processed;
    mapping the shadow of the first object on the reference shadow plane by way of texture mapping onto each of a plurality of polygons defining the at least one other object; and
    rendering the shadow of the second object on the generating shadow plane based on the projected coordinates of the objects on the virtual plane.

11. A method according to claim 10, further comprising low-pass filtering the shadow of the second object rendered on the generating shadow plane after the shadow of the first object is copied onto the reference shadow plane.

12. A method according to claim 11, further comprising:
    orienting a background virtual plane behind the at least one other object with respect to the viewpoint representing the light source;
    establishing a background shadow plane to serve as a texture plane corresponding to the background virtual plane;
    projecting a shadow of a given object onto the virtual plane and projecting the shadow of the virtual plane onto the background virtual plane;
    rendering the shadow of the background virtual plane onto the background shadow plane;
    mapping the shadow of the given object on the at least one other object by way of texture mapping; and
    interpolating the shadow of the given object based on the shadow of the given object rendered on the reference shadow plane, the shadow of the given object rendered on the background shadow plane, and the coordinates of the objects with respect to the viewpoint representing the light source.

13. A method according to claim 3, further comprising:
    establishing an extended light source;
    projecting reflections of the extended light source onto the virtual plane;
    rendering the reflections of the extended light source onto the shadow plane; and
    mapping the reflections of the extended light source to form a shadow on the at least one other object.

14. An apparatus for processing an image, comprising:
    a geometry unit operable to orient a plurality of three-dimensional image objects in a three-dimentional space such that a least some of the objects are spaced apart from one another;
    a setting unit operable to establish at least one virtual plane among, but not touching, the object; and
    a rendering unit operable to project a shadow of a first one of the objects onto the virtual plane based on a viewpoint representing a light source, and to map the projected shadow onto at least one other of the objects that is farther from the viewpoint representing the light source than other first object.

15. An apparatus according to claim 14, wherein the setting unit is further operable to define an attribute indicating whether to permit the shadow of the first object to be mapped onto the at least one other object, and the rendering unit is further operable to selectively map the shadow of the first object onto the at least one other object based on the attribute.

16. An apparatus according to claim 14, wherein the rendering unit is further operable to establish a shadow plane to serve as a texture plane in correspondence with the virtual plane, to render the shadow of the first object on the shadow plane, and to map the shadow rendered on the shadow plane onto the at least one other object by way of texture mapping.

17. An apparatus according to claim 16, wherein the rendering unit comprises a mapping unit operable to map the shadow rendered on the shadow plane onto the at least one other object by way of texture mapping onto the shadow plane based on projected coordinates of the at least one other object.

18. An apparatus according to claim 16, wherein the rendering unit comprises a mapping unit operable to map the shadow rendered on the shadow plane onto the at least one other object by way of texture mapping with respect to each of a plurality of polygons defining the at least one other object.

19. An apparatus according to claim 16, wherein:
the rendering unit comprises a coordinate calculating unit operable to determine coordinates of the objects with respect to the viewpoint representing the light source, and to determine projected coordinates of the objects onto the virtual plane successively in accordance with a direction away from the viewpoint representing the light source; and
the rendering unit is further operable to render the shadow formed by the first object on the shadow plane based on the projected coordinates each time texture mapping onto the at least one other object is finished.

20. An apparatus according to claim 19, wherein:
the rendering unit comprises a rendering list generating unit operable to determine the coordinates of the objects and the projected coordinates of the objects onto the virtual plane with respect to each of a plurality of polygons defining the objects, and to register the determined coordinates in a rendering list successively in accordance with the direction away from the viewpoint representing the light source; and
the rendering unit is further operable to successively read the registered coordinates from the rendering list for rendering the shadow of the first object on the shadow plane.

21. An apparatus according to claim 19, wherein the rendering unit is further operable to low-pass filter the shadow of the first object rendered on the shadow plane depending on at least a distance of the first object from the light source to apply a blur to the shadow rendered on the shadow plane.

22. An apparatus according to claim 21, wherein the rendering unit is further operable to interpolate the shadow of the first object rendered on the shadow plane when it is mapped on the at least one other object to control the blur thereof, the step of interpolating being performed based on: (i) the shadow of the first object before it is subject to low-pass filtering; (ii) the shadow after it is subject to low-pass filtering; and (iii) the coordinates of the objects with respect to the viewpoint representing the light source.

23. An apparatus according to claim 19, wherein:
the shadow plane includes a reference shadow plane and a generating shadow plane, the shadow of the first object being rendered on the generating shadow plane; and
the rendering unit is further operable to (i) copy the shadow of the first object rendered on the generating shadow plane onto the reference shadow plane when a shadow of a second object is to be processed, (ii) map the shadow of the first object on the reference shadow plane by way of texture mapping onto each of a plurality of polygons defining the at least one other object, and (iii) render the shadow of the second object on the generating shadow plane based on the projected coordinates of the objects on the virtual plane.

24. An apparatus according to claim 23, wherein the rendering unit is further operable to low-pass filter the shadow of the second object rendered on the generating shadow plane after the shadow of the first object is copied onto the reference shadow plane.

25. An apparatus according to claim 24, wherein:
the shadow plane includes a background shadow plane to serve as a texture plane corresponding to a background virtual plane oriented behind the at least one other object with respect to the viewpoint representing the light source; and
the rendering unit is further operable to (i) project a shadow of a given object onto the virtual plane, (ii) project the shadow of the virtual plane onto the background virtual plane, (iii) render the shadow of the background virtual plane onto the background shadow plane, (iv) map the shadow of the given object on the at least one other object by way of texture mapping, and (v) interpolate the shadow of the given object based on the shadow of the given object rendered on the reference shadow plane, the shadow of the given object rendered on the background shadow plane, and the coordinates of the objects with respect to the viewpoint representing the light source.

26. An apparatus according to claim 16, wherein the rendering unit is further operable to establish an extended light source, to project reflections of the extended light source onto the virtual plane, to render the reflections of the extended light source onto the shadow plane, and to map the reflections of the extended light source to form a shadow on the at least one other of the objects.

27. A recording medium operable to store a program capable of causing a system to carry out acts comprising:
(a) orienting a plurality of three-dimensional image objects in a three-dimensional space such that at least some of the objects are spaced apart from one another;
(b) orienting at least one virtual plane among a plurality of objects representing three-dimensional objects;
(c) projecting a shadow of a first one of the objects onto the virtual plane based on a viewpoint representing a light source; and
(d) mapping the projected shadow onto at least one other of the objects that is farther from the viewpoint representing the light source than the first object.

28. A recording medium according to claim 27, wherein step (a) comprises defining an attribute indicating whether to permit the shadow of the first object to be mapped onto the at least one other object, and step (b) comprises selectively mapping the shadow of the first object onto the at least one other of the objects based on the attribute.

29. A recording medium according to claim 27, wherein step (b) comprises:
establishing a shadow plane to serve as a texture plane in correspondence with the virtual plane;
rendering the shadow of the first object on the shadow plane; and
mapping the shadow rendered on the shadow plane onto the at least one other object by way of texture mapping.

30. A recording medium according to claim 29, wherein step (c) further comprises mapping the shadow rendered on the shadow plane onto the at least one other object by way of texture mapping onto the virtual plane based on projected coordinates of the at least one other object.

31. A recording medium according to claim 29, wherein step (c) further comprises mapping the shadow rendered on the shadow plane onto the at least one other object by way of texture mapping with respect to each of a plurality of polygons defining the at least one other object.

32. A recording medium according to claim 29, wherein:
step (b) further comprises determining coordinates of the objects with respect to the viewpoint representing the light source, and determining projected coordinates of the objects onto the virtual plane successively in accordance with a direction away from the viewpoint representing the light source; and step (c) further comprises rendering the shadow formed by the first object on the shadow plane based on the projected coordinates each time texture mapping onto the at least one other object is finished.

33. A recording medium according to claim 32, wherein:
step (b) further comprises determining the coordinates of the objects and the projected coordinates of the objects onto the virtual plane with respect to each of a plurality of polygons defining the objects, and registering the determined coordinates in a rendering list successively in accordance with the direction away from the viewpoint representing the light source; and
step (c) further comprises successively reading the registered coordinates from the rendering list for rendering the shadow of the first object on the shadow plane.

34. A recording medium according to claim 32, wherein step (c) further comprises low-pass filtering the shadow of the first object rendered on the shadow plane depending on at least a distance of the first object from the light source to apply a blur to the shadow rendered on the shadow plane.

35. A recording medium according to claim 34, wherein step (c) further comprises interpolating the shadow of the first object rendered on the shadow plane when it is mapped on the at least one other object to control the blur thereof, the step of interpolating being performed based on: (i) the shadow of the first object before it is subject to the low-pass filtering step; (ii) the shadow of the first object after it is subject to the low-pass filtering step; and (iii) the coordinates of the objects with respect to the viewpoint representing the light source.

36. A recording medium according to claim 29, wherein the shadow plane includes a reference shadow plane and a generating shadow plane, the shadow of the first object being rendered on the generating shadow plane, and step (c) further comprises: copying the shadow of the first object rendered on the generating shadow plane onto the reference shadow plane when a shadow of a second object is to be processed;
mapping the shadow of the first object on the reference shadow plane by way of texture mapping onto each of a plurality of polygons defining the at least one other of the objects; and
rendering the shadow of the second object on the generating shadow plane based on the projected coordinates of the objects on the virtual plane.

37. A recording medium according to claim 36, wherein step (c) further comprises low-pass filtering the shadow of the second object rendered on the generating shadow plane after the shadow of the first object is copied onto the reference shadow plane.

38. A recording medium according to claim 37, wherein step (c) further comprises:
orienting a background virtual plane behind the at least one other object with respect to the viewpoint representing the light source;
establishing a background shadow plane to serve as a texture plane corresponding to the background virtual plane;
projecting a shadow of a given object onto the virtual plane and projecting the shadow of the virtual plane onto the background virtual plane;
rendering the shadow of the background virtual plane onto the background shadow plane;
mapping the shadow of the given object on the at least one other object by way of texture mapping; and
interpolating the shadow of the given object based on the shadow of the given object rendered on the reference shadow plane, the shadow of the given object rendered on the background shadow plane, and the coordinates of the objects with respect to the viewpoint representing the light source.

39. A recording medium according to claim 29, wherein step (c) further comprises:
establishing an extended light source;
projecting reflections of the extended light source onto the virtual plane;
rendering the reflections of the extended light source onto the shadow plane; and
mapping the reflections of the extended light source to form a shadow on the at least one other object.

40. An apparatus for processing an image, comprising:
means for orienting a plurality of three-dimensional image objects in a three-dimensional space such that at least some of the objects are spaced apart from one another;
means establishing at least one virtual plane among, but not touching, the objects;
means for projecting a shadow of a first one of the objects onto the virtual plane based on a viewpoint representing a light source; and
means for mapping the projected shadow onto at least one other of the objects that is farther from the viewpoint representing the light source than the first object.

* * * * *